United States Patent
Yura et al.

(10) Patent No.: US 9,625,747 B2
(45) Date of Patent: Apr. 18, 2017

(54) METHOD FOR MANUFACTURING LIQUID CRYSTAL DISPLAY DEVICE

(71) Applicant: NITTO DENKO CORPORATION, Ibaraki-shi, Osaka (JP)

(72) Inventors: Tomokazu Yura, Ibaraki (JP); Akira Tawada, Ibaraki (JP); Satoru Koshio, Ibaraki (JP); Takuya Nakazono, Ibaraki (JP)

(73) Assignee: NITTO DENKO CORPORATION, Ibaraki-Shi, Osaka (JP)

( * ) Notice: Subject to any disclaimer, the term of this patent is extended or adjusted under 35 U.S.C. 154(b) by 119 days.

(21) Appl. No.: 14/388,583

(22) PCT Filed: Mar. 27, 2013

(86) PCT No.: PCT/JP2013/059004
§ 371 (c)(1),
(2) Date: Sep. 26, 2014

(87) PCT Pub. No.: WO2013/146883
PCT Pub. Date: Oct. 3, 2013

(65) Prior Publication Data
US 2015/0047766 A1    Feb. 19, 2015

(30) Foreign Application Priority Data

Mar. 30, 2012  (JP) .................................. 2012-081294
Mar. 27, 2013  (JP) .................................. 2013-065289

(51) Int. Cl.
G02F 1/1333    (2006.01)
G02B 5/30      (2006.01)
(Continued)

(52) U.S. Cl.
CPC ........ *G02F 1/1333* (2013.01); *B32B 37/1207* (2013.01); *B32B 38/10* (2013.01);
(Continued)

(58) Field of Classification Search
CPC .............. B32B 37/025; B32B 37/1207; B32B 38/0004; B32B 38/10; B32B 2041/04;
(Continued)

(56) References Cited

U.S. PATENT DOCUMENTS 6,113,811 A      9/2000  Kausch et al.
2007/0264447 A1*  11/2007  Oya ......................... B32B 7/02
                                                                428/1.31
(Continued)

FOREIGN PATENT DOCUMENTS

JP    9-507308 A      6/1995
JP    11-231129 A     8/1999
(Continued)

OTHER PUBLICATIONS

Written Opinion for PCT/JP2013/059004 dated May 14, 2013.
(Continued)

*Primary Examiner* — George Koch
(74) *Attorney, Agent, or Firm* — Hauptman Ham, LLP

(57) ABSTRACT

A method for manufacturing a liquid-crystal display device in which at least an absorptive polarizing film is arranged on a viewing side of a rectangular liquid-crystal display panel and at least the absorptive polarizing film and a reflective polarizing film are arranged on a non-viewing side thereof, the liquid-crystal display panel having a long side and a short side and of VA mode or IPS mode is provided.

20 Claims, 40 Drawing Sheets

(51) Int. Cl.
  *B32B 38/10* (2006.01)
  *G02F 1/1335* (2006.01)
  *B32B 37/12* (2006.01)
  *B32B 37/00* (2006.01)
  *B32B 38/00* (2006.01)
  *B32B 41/00* (2006.01)

(52) U.S. Cl.
  CPC ..... *G02B 5/3033* (2013.01); *G02F 1/133528* (2013.01); *G02F 1/133536* (2013.01); *B32B 37/025* (2013.01); *B32B 38/0004* (2013.01); *B32B 2041/04* (2013.01); *B32B 2307/718* (2013.01); *B32B 2309/10* (2013.01); *B32B 2309/105* (2013.01); *B32B 2457/20* (2013.01)

(58) Field of Classification Search
  CPC ........ B32B 2307/718; B32B 2309/105; B32B 2457/20; G02B 5/3033; G02F 1/1333; G02F 1/133528; G02F 1/133536
  USPC .................................................. 156/64, 249
  See application file for complete search history.

(56) References Cited

U.S. PATENT DOCUMENTS

2010/0186890 A1*  7/2010  Kitada .................. B32B 38/185
                                                      156/256
2010/0232018 A1*  9/2010  Kobayashi ................ B32B 7/12
                                                      359/488.01
2011/0083789 A1*  4/2011  Nakazono ............... B32B 41/00
                                                      156/64

FOREIGN PATENT DOCUMENTS

| JP | 2005-37417 A | 2/2005 |
|---|---|---|
| JP | 4361103 B2 | 3/2009 |
| JP | 2009-122641 A | 6/2009 |
| JP | 4307510 B1 | 8/2009 |
| JP | 2009-271516 A | 11/2009 |
| JP | 4551477 B2 | 11/2009 |
| JP | 4377961 B1 | 12/2009 |
| JP | 4377965 B1 | 12/2009 |
| JP | 2010-32900 A | 2/2010 |
| JP | 4451924 B1 | 4/2010 |
| JP | 2011-2596 A | 1/2011 |
| JP | 4669070 B2 | 1/2011 |

OTHER PUBLICATIONS

International Preliminary Report on Patentability for PCT/JP2013/059004 dated Oct. 1, 2014.
International Search Report mailed May 14, 2013 for PCT/JP2013/059004.

* cited by examiner

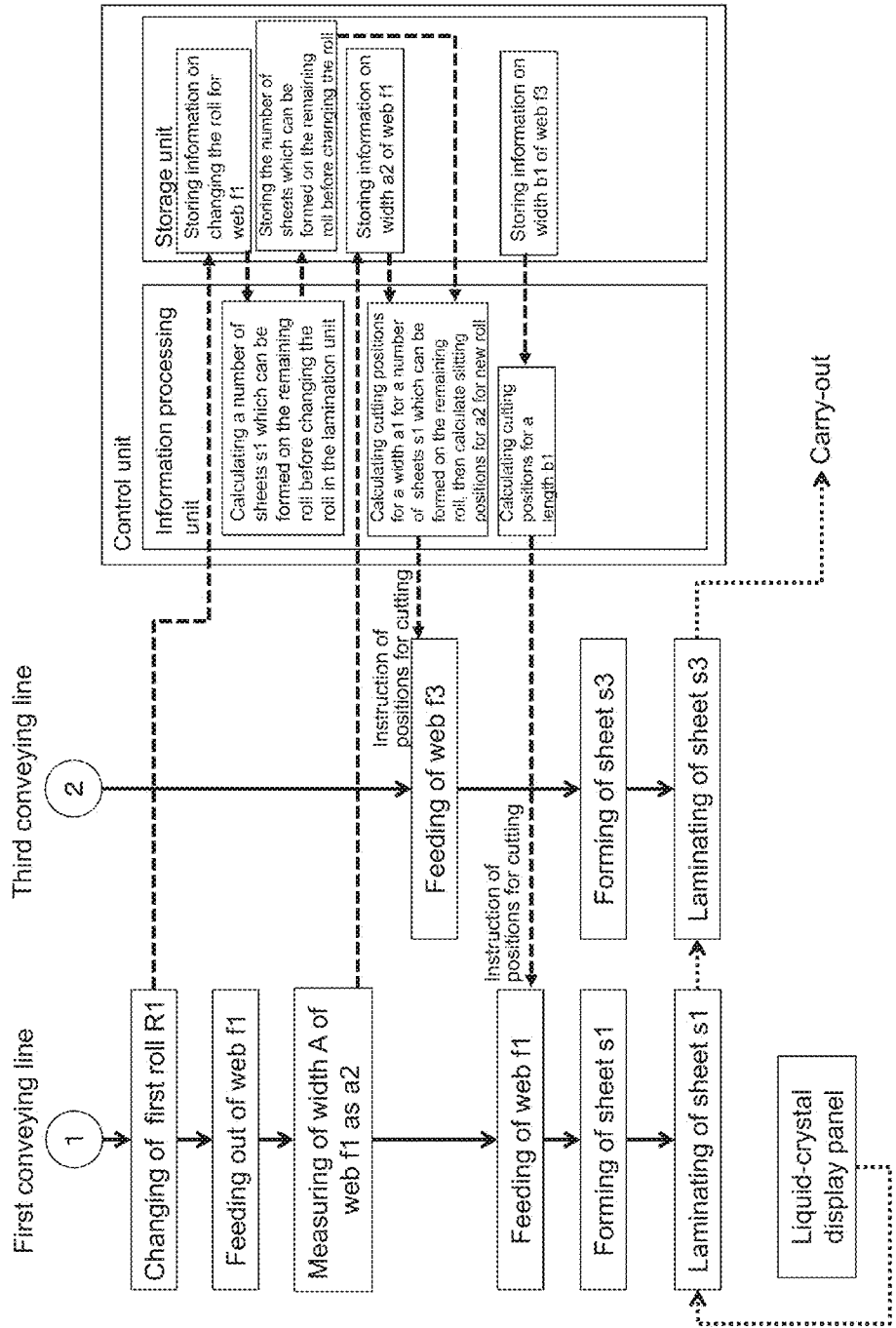

METHOD FOR MANUFACTURING LIQUID CRYSTAL DISPLAY DEVICE

CROSS REFERENCE TO RELATED APPLICATION

This application claims the priority of Japanese Patent Application No. 2012-081294, filed on Mar. 30, 2012, and Japanese Patent Application No. 2013-065289, filed on Mar. 27, 2013, in the JIPO (Japanese Intellectual Property Office). Further, this application is the National Phase application of International Application No. PCT/JP2013/059004 filed Mar. 27, 2013, which designates the United States and was published in Japanese.

TECHNICAL FIELD

The present invention relates to a method for manufacturing liquid-crystal display device. More specifically, the present invention relates to a method for manufacturing liquid-crystal display device comprising at least an absorptive polarizing film arranged on a viewing side of a rectangular-shaped liquid-crystal display panel having long sides and short sides and at least an absorptive polarizing film and a reflective polarizing film arranged on a non-viewing side thereof.

BACKGROUND ART

Liquid-crystal panels in Twisted Nematic (TN) mode, Vertical Alignment (VA) mode or In-Plane Switching (IPS) mode are used for liquid-crystal display device. When using a liquid-crystal display panel in TN mode, a polarlizer laminated to each of opposite surfaces of the liquid-crystal display panel is configured with a polarizing film sheet cut in an angle of 45° with respect to a stretching direction. Stretching directions of the polarlizers on each of the opposite surfaces of the liquid-crystal display panel are arranged as orthogonal to each other, i.e., in a crossed-Nicol arrangement. To this, optical film laminate sheets configured as that polarizing film sheets punched out into rectangular-shaped sheets which long sides or short sides thereof being oriented to 45° or 135° with respect to the stretching direction and superimposed with other film components are normally used.

On the other hand, in configurations where a liquid-crystal display panel in VA mode or IPS mode is used, a polarizing film sheet is formed by cutting in a direction orthogonal or parallel with respect to the stretching direction. Polarizing film sheets formed as such are laminated on each of the opposite surfaces of the liquid-crystal display panel so that an absorption axis of the polarizing film sheets on one side is orthogonal to that of the polarizing film sheets on the other side, i.e., in a crossed-Nicol arrangement. Thus, in configurations where a liquid-crystal display panel in VA mode or IPS mode is used, a long web of optical film laminate comprising a long web of polarizing film is cut to a size of the liquid-crystal display panel on a long web of carrier film to allow for forming a plurality of optical film laminate sheets on the carrier film, conveying the plurality of optical film laminate sheets to a lamination station for laminating with a plurality of liquid-crystal display panels in a state supported on the long web of the carrier film, releasing the plurality of optical film laminate sheets from the carrier film at the lamination station and sequentially laminate the plurality of optical film laminate sheets on each of the opposite surfaces of the liquid-crystal display panels. The plurality of optical film laminate sheets comprises so-called absorptive polarizing film sheets.

In a manufacturing system of liquid-crystal display device, a plurality of optical film laminate sheets to be sequentially laminated with a plurality of liquid-crystal display panels are conveyed to a lamination station in a state being supported on a long web of releasing film or a carrier film, peeled from the carrier film at the lamination station and continuously laminated with the liquid-crystal display panels. Since manufacturing system of liquid-crystal display device is a continuous lamination unit, it is referred in the following description as "a continuous lamination" system or "a roll-to-panel" ("RTP") system, in order to differentiate from an individual lamination system in which a plurality of optical film laminate sheets formed in a size of a liquid-crystal display panel is prepared, and each of the plurality of optical film laminate sheets is laminated one by one to each of the liquid-crystal display panels.

Specifications of Japanese Patent 4307510B (Patent Document 1), Japanese Patent 4451924B (Patent Document 2) and Japanese Patent 4669070B (Patent Document 3) disclose method and apparatus for manufacturing liquid-crystal display panels in which polarizing film sheets are laminated on each of opposite surfaces of the liquid-crystal display panels such that a transmission axis of the polarizing film sheets on one side is perpendicular to that of the polarizing film sheets on the other side. The manufacturing system shown as an example in FIG. 1 and FIG. 2 of the Patent Documents has a first lamination station and a second lamination station arranged apart in a longitudinal direction on a straight channel, and a feed line for feeding a long web of a first or a second optical film laminate comprising polarizing film toward the channel is provided at each of ends of the straight channel. In the first lamination station, a panel component carry-in line for conveying rectangular panel components from a direction orthogonal to the channel and a carry-out line for conveying the rectangular panel components laminated with the optical film laminate sheets comprising polarizing films to a direction orthogonal to the channel from the second lamination station are provided. Between the first and the second lamination stations, there is provided a means for rotating panel components respectively laminated with a first optical film laminate sheet on one side thereof in a state supported on a carrier film within a plane including the panel components.

Japanese Laid-Open Patent Publication JP2009-122641A (Patent Document 4) and Japanese Laid-Open Patent Publication JP2005-037417A (Patent Document 5) also discloses method and apparatus for manufacturing liquid-crystal display device in which polarizing film sheets are laminated on each of opposite surfaces of the liquid-crystal display panels such that a transmission axis of the polarizing film sheets on one side is perpencidular to that of the polarizing film sheets on the other side. For example, systems shown in FIG. 7 of Patent Document 4 or in FIG. 6 and FIG. 7 of Patent Document 5 comprise two channels orthogonal to each other. Rectangular liquid-crystal display panels are continuously conveyed with their long sides at front in a first channel of the two channels. In the first channel, optical film laminate sheets, formed by cutting a long web of optical film laminate with a configuration of other optical film laminated on a polarizing film into a size corresponding to a liquid-crystal display panel, are laminated on one side of liquid-crystal display panels conveyed along the channel. The liquid-crystal display panel, to which the optical film laminate sheet is laminated on one of the opposite surfaces thereof, is reversed upside down and then transferred to a second channel which is orthogonal to the first channel. In the second channel, the liquid-crystal display panels are continuously conveyed with their short sides at front, and optical film laminate sheets with a similar configuration as the above described optical film laminate sheets are laminated on the other side of the liquid-crystal display panels.

Any of the lamination units disclosed in the above described Patent Documents is configured to sequentially laminate one of two polarizing film sheets to each of opposite surfaces of a liquid-crystal display panel in two laminating steps such that a transmission axis of one of the two polarizing film sheets is orthogonal to that of the other.

On the other hand, Japanese Laid-Open Patent Publication JP2009-271516A (Patent Document 6) discloses a lamination unit for laminating an optical component to an optical display unit in three laminating steps. When referring to FIG. 3 of Patent Document 6, there is disclosed a lamination unit for sequentially laminating a first, a second and a third optical component to an optical display unit which may be configured as a liquid-crystal display panel. The first, the second and the third optical component are a polarizer and a pair of polarizer protection film for protecting the polarizer on the opposite surfaces of the optical display unit.

Patent Document 6 discloses a combination of a first, a second and a third optical component different from the above. Each of the first, the second and the third optical component is manufactured as a web of laminate having an optical component, an adhesive layer laminated on the optical component and a releasing film, and the web of laminate is prepared as a material wound in a roll shape. A conveying channel for conveying an optical display unit to one direction is provided in the lamination unit and a feed line for the first, the second and the third optical component is provided above the conveying channel, the releasing film is peeled from the web of laminate fed from the feed line, and each of the optical components is sequentially laminated to the optical display unit in three step process. The first, the second and the third optical component laminated in the three step process configure an optical film laminate which achieves desired optical performance when those optical components are laminated thereon.

In recent years, smartphones and tablet terminals are universally distributed as high-performance portable terminals with built-in battery. Those portable terminals are referred as slate-PCs, and in many cases, a middle-sized or small-sized liquid-crystal display device is used as an optical display device. A liquid-crystal display device to which a reflective polarizing film is used has been developed. This is because attention has been drawing to a benefit that a reflective polarizing film is able to enhance brightness of a display screen by switching reflected or absorbed light to transmitted light and is advantageous for efficient use of power charged in a battery. A Liquid-crystal display panel used for a middle-sized or small-sized liquid-crystal display device in general is configured to contain a liquid-crystal (LC) cell with a size of about 5 to 10 inches (120 to 250 mm), and a color filter (CF) is arranged on a viewing side of a LC cell and a thin-film transistor (TFT) is arranged on a non-viewing side thereof, thickness of a LC cell is about 0.5 mm and weight thereof is about 15 to 40 grams. On the contrary, a LC cell for a television has a size of 18 inches (450 mm) even for a small one, and the size exceeds 60 inches (1500 mm) for a large one. Thickness of such LC is 1.4 mm which is 3 times or more than that of a LC cell for a slate-PC, and weight is 300 to 3,500 grams.

Requirements for processing capacity of a manufacturing system of the middle-sized or small-sized liquid-crystal display device used for a slate-PC are different from those of a manufacturing system of liquid-crystal display device for a television. Difference in requirements may include accuracy and speed of laminating an optical film laminate sheet comprising a polarizing film to both of opposite surfaces of a liquid-crystal display panel, and ease of process for weight reduction. In addition, requirements to minimize contamination in a clean room are different from those a manufacturing system of liquid-crystal display device for a television as that it is necessary to minimize dead space and to maintain appropriate level of a processing table to facilitate processing table of a long web of optical film laminate in use. Further, when a reflective polarizing film is used, it is required to continuously perform a process of laminating a reflective polarizing film sheet on a surface of an absorptive polarizing film sheet laminated on a non-viewing side of a liquid-crystal display panel such that a transmission axis of the absorptive polarizing film sheet is parallel to that of the reflective polarizing film sheet.

A reflective polarizing film is also referred as a brightness-enhanced film. Structure and function of the reflective polarizing film are different from those of an absorptive polarizing film which is a general polarizing film. Specification of U.S. Pat. No. 6,113,811 (Patent Document 7) and PCT Japanese Publication JPH9-507308A (Patent Document 8) disclose manufacturing and function of a reflective polarizing film. As an aid to understand techniques of the present invention, manufacturing and function of a reflective polarizing film is outlined in the following.

A reflective polarizing film is manufactured by steps of: isothermally and simultaneously squeezing high-birefringent material which develops strong birefringence upon stretching and zero-birefringent material which scarcely develops birefringence upon stretching as a plurality of layers mutually overlapping; and stretching squeezed multi-layered materials to 3 to 5 times to a transverse direction orthogonal to a squeezing direction. Typically, a multi-layered material consisting of 100 or more alternating layers is formed and stretched to a thickness which causes optical interference between adjacent layers to make a thin long web of optical film. In such configured reflective polarizing film, a longitudinal direction i.e. a squeezing direction thereof is a transmission axis and a transverse direction i.e. a stretching direction thereof is a reflection axis. That is, orientation of a transmission axis of the above reflective polarizing film is opposite with respect to stretching direction to that of an absorptive polarizing film having an absorption axis corresponding to a reflection axis in longitudinal direction and a transmission axis in transverse direction.

Functions of a reflective polarizing film is described as follows. In light incident to a reflective polarizing film, component of the light along a transmission axis corresponding to about 50% of incident light transmits through the film and component of the light corresponding to the remaining 50% is reflected at an interface of alternatively arranged adjacent layers with different refraction index. The reflected light is again reflected at a next interface and component of light corresponding to about 25% of the reflected light transmits along the transmission axis. As such, in a configuration using a reflective polarizing film, as a result of repetition of transmission and reflection, utilization factor of light used is not 50% but close to 100% of light transmitting the reflective polarizing film. Although the reflective polarizing film is very expensive, it is recently heavily used because of significant enhancement of brightness.

As described in the above, a reflective polarizing film is totally different in structure and function from an absorptive polarizing film generally formed with a single layer of PVA film. In case where a reflective polarizing film is combined with an absorptive polarizing film for use in a liquid-crystal display device, there may be certain restrictions accompanied with manufacturing steps including lamination of the films to a liquid-crystal display panel because structure and function of the reflective polarizing film are different from those of the absorptive polarizing film. For example, when an absorptive polarizing film is combined with another absorptive polarizing film, there is no problem in sequentially laminating an absorptive polarizing film in a continuous step to each of opposite surfaces of a liquid-crystal display panel because a relationship between a stretching direction and an absorption axis or a transmission axis is identical between the two absorptive polarizing films, as shown in Patent Documents 1 to 5. But, when attempting to laminate an absorptive polarizing film to a reflective polarizing film such that transmission axes of those films match, it is difficult to continuously laminate because transmission axes of those films are inverse with respect to a stretching direction.

Thus, in case where a reflective polarizing film is laminated to an absorptive polarizing film to manufacture a long web of two-layered laminate, two long webs of optical film laminate comprising an absorptive polarizing film and a reflective polarizing film respectively are fed from respective rolls, and each of the optical film laminate is overlapped in direction orthogonal to each other to form a two-layered laminate laminated with an adhesive agent, and the two-layered laminate is cut to form a rectangular mother sheet.

Japanese Laid-Open Patent Publication JP2010-032900A (Patent Document 9) or Japanese Laid-Open Patent Publication JPH11-231129A (Patent Document 10) disclose a method for manufacturing a mother sheet consisting of rectangular multi-layered optical film laminate, and a method for manufacturing a plurality of optical film laminate sheets by punching out or cutting the mother sheet to a size of a liquid-crystal display panel. Use of the methods disclosed in the Patent Documents allows for preparing in advance many two-layered optical film laminate sheets in which a reflective polarizing film and an absorptive polarizing film sheet are overlapped for manufacturing steps where the two-layered optical film laminate sheets are laminated to liquid-crystal display panels. In this case, it is essential to prepare many two-layered optical film laminate sheets in advance for a lamination apparatus for manufacturing a liquid-crystal display device.

The prior art documents referred to in the above and the following descriptions are listed below.
Patent Document 1: Japanese Patent No. 4,307,510B
Patent Document 2: Japanese Patent No. 4,451,924B
Patent Document 3: Japanese Patent No. 4,669,070B
Patent Document 4: Japanese Laid-Open Patent Publication 2009-122641
Patent Document 5: Japanese Laid-Open Patent Publication 2005-037417A
Patent Document 6: Japanese Laid-Open Patent Publication 2009-271516A
Patent Document 7: U.S. Pat. No. 6,113,811
Patent Document 8: PCT Japanese Publication H9-507308A
Patent Document 9: Japanese Laid-Open Patent Publication 2010-032900A
Patent Document 10: Japanese Laid-Open Patent Publication H11-231129A
Patent Document 11: Japanese Patent No. 4,551,477B
Patent Document 12: Japanese Patent No. 4,377,961B
Patent Document 13: Japanese Patent No. 4,361,103B
Patent Document 14: Japanese Patent No. 4,377,965B

DISCLOSURE OF THE INVENTION

Problem to be Solved by the Invention

A main technical object of the present invention is to provide a method for manufacturing liquid-crystal display device comprising steps of: preparing three rolls of three different webs of optical laminate wound in a roll-shape; paying our each of webs of optical laminate from each of the three rolls for cutting to a desired longitudinal size; and sequentially or simultaneously laminating optical laminate film sheets obtained by cutting to the respective ones of a plurality of rectangular liquid-crystal display panels in VA mode or IPS mode. Another object of the present invention is to provide a method for manufacturing liquid-crystal display device comprising a step of overlappingly laminating reflective polarizing film sheets with a transmission axis in longitudinal direction, obtained by stretching a long multi-layered web film in a width-wise direction, onto the respective ones of absorptive polarizing film sheets already laminated to a non-viewing side of the rectangular liquid-crystal display panels.

More particularly, an object of the present invention is to provide a method for manufacturing liquid-crystal display device with the rectangular liquid-crystal display panel having long sides and short sides, the method comprising steps of: preparing three rolls of three different optical laminates wound in a roll-shape, i.e. two webs of optical laminate comprising an absorptive polarizing film and one web of optical laminate comprising a reflective polarizing film; feeding a web of optical laminate from each of the three rolls; laminating sheets formed by cutting one of the two webs of optical laminate comprising an absorptive polarizing film to a desired web-length-wise size corresponding to a size of either the long sides or the short sides of the liquid-crystal display panel to a non-viewing side of the liquid-crystal display panel; overlappingly laminating reflective polarizing film sheets similarly cut to the desired size in web-length-wise direction onto the absorptive polarizing film sheets already laminated onto the non-viewing side of the liquid-crystal display panel such that a transmission axis of the absorptive polarizing film sheets and that of the reflective polarizing film sheets are parallel to each other; and laminating sheets, formed by cutting the other one of the two webs of optical laminate comprising an absorptive polarizing film to a desired web-length-wise size corresponding to another one of the long sides or the short sides of the liquid-crystal display panel, to a viewing side of the liquid-crystal display panel such that a transmission axis of the absorptive polarizing film sheets on the viewing side is orthogonal to the transmission axis of the absorptive polarizing film sheets on the non-viewing side of the liquid-crystal display panel.

Means for Solving the Problem

A method for manufacturing liquid-crystal display device according to one embodiment of the present invention comprises steps of: preparing three different rolls consisting of a first roll and a second roll of two webs of optical laminate comprising an absorptive polarizing film wound in roll, each of the rolls respectively having a width corresponding to one of a long side and a short side of a liquid-crystal display panel in VA mode or IPS mode and a transmission axis in a direction orthogonal to longitudinal direction, and a third roll of a web of optical laminate comprising a reflective polarizing film wound in roll, the roll having a width corresponding to the one of the long side or the short side of the liquid-crystal display panel and a transmission axis in the longitudinal direction; feeding a web of optical laminate from one of the first or the second roll of the optical laminate having a width corresponding to other one of the long side or the short side of the liquid-crystal display panel and forming slit lines in a transverse direction orthogonal to the longitudinal direction in the fed web of the optical laminate at a first longitudinal interval corresponding to other one of the long side or the short side of the liquid-crystal display panel to form a first absorptive polarizing film sheet between two slit lines longitudinally adjacent; feeding another web of optical laminate from the other one of the first or the second roll of the optical laminate having a width corresponding to the other one of the long side or the short side of the liquid-crystal display panel and forming slit lines in a transverse direction orthogonal to the longitudinal direction in the fed web of the optical laminate at a second longitudinal interval corresponding to the one of the long side or the short side of the liquid-crystal display panel to form second absorptive polarizing film sheets between two slit lines longitudinally adjacent, and sequentially laminating the first absorptive polarizing film sheets onto a surface of a non-viewing side of sequentially conveyed liquid-crystal display panels and the second absorptive polarizing film sheets onto a surface of a viewing side thereof such that transmission axes of the first and the second absorptive polarizing film sheets are orthogonal to each other; and feeding a web of optical laminate from the third roll and forming slit lines in a transverse direction orthogonal to the longitudinal direction in the fed web of the optical laminate to form reflective polarizing film sheets between two longitudinally adjacent ones of the slit lines, and overlappingly laminating the reflective polarizing film sheets on to a surface of the first absorptive polarizing film sheets opposite to the one laminated to the surface of the non-viewing side of the liquid-crystal display panel such that transmission axes of the reflective polarizing film sheets and that of the absorptive polarizing film sheets are parallel to each other.

The first roll prepared therefor may be in a form comprising a long web of a first absorptive polarizing film with a width corresponding to one of a long side or a short side, e.g. a long side, of a liquid-crystal display panel and a transmission axis in a direction orthogonal to a longitudinal direction and a first carrier film laminated via an adhesive layer to one of the opposite surfaces of the first absorptive polarizing film, or, may be in a form comprising a surface protection film laminated via an adhesive layer to the other surface of the first absorptive polarizing film, the other surface being opposite to the one which the first carrier film is laminated thereto.

The second roll prepared therefor may be in a form comprising a long web of a second absorptive polarizing film with a width corresponding to the other one of a long side or a short side, e.g. a short side, of a liquid-crystal display panel and a transmission axis in a direction orthogonal to a longitudinal direction; and a second carrier film laminated via an adhesive layer to one of the opposite surfaces of the second absorptive polarizing film, or, may be in a form comprising a surface protection film laminated via an adhesive layer to the other surface of the second absorptive polarizing film, the other surface being opposite to the one which the first carrier film is laminated thereto.

The third roll prepared therefor may be in a form comprising a long web of a reflective polarizing film with a width corresponding to the other one of a long side or a short side, e.g. a short side, of a liquid-crystal display panel and a transmission axis in a direction of a longitudinal direction; and a third carrier film laminated via an adhesive layer to one of the opposite surfaces of the reflective polarizing film, or, may be in a form comprising a surface protection film laminated via an adhesive layer to the other surface of the reflective polarizing film, the other surface being opposite to the one which the third carrier film is laminated thereto.

The method for manufacturing liquid-crystal display device according to one embodiment of the present invention may comprise a step of peeling the surface protection film from the first absorptive polarizing film in the step of overlappingly laminating the reflective polarizing film to the first absorptive polarizing film integrally formed with the surface protection film.

The method for manufacturing liquid-crystal display device according to another embodiment of the present invention may further comprise a step of relatively positioning each of the first absorptive polarizing film sheets and the second absorptive polarizing film sheets to the liquid-crystal display panel and a step of relatively positioning the reflective polarizing film sheets to the liquid-crystal display panel, such that the long sides and the short sides of the liquid-crystal display panel, the first and the second absorptive polarizing film sheets, and the reflective polarizing film sheets match with each other in top-bottom direction.

As a further embodiment of the present invention, in the method for manufacturing liquid-crystal display device, the first and the second absorptive polarizing films, which an adhesive layer is formed on one or both surfaces thereof in the prepared first and the second rolls, may be which have been inspected for inherent defect or defects. When such a roll is used, the method according to the present invention further comprises: in the step of laminating the first absorptive polarizing film sheets, a step of, while forming first absorptive polarizing film sheets between adjacent ones of slit lines in a length-wise direction of a first web of optical laminate, forming a slit line on upstream side of conveying direction at a position with a predetermined distance from the defect or defects and determining a sheet formed between the formed slit line and a slit line on downstream side immediately before the formed slit line as a first defective sheet; in the step of laminating the second absorptive polarizing film sheets, a step of, while forming second absorptive polarizing film sheets between adjacent ones of slit lines in a length-wise direction of a second web of optical laminate, forming a slit line on upstream side of conveying direction at a position spaced for a predetermined distance from the defect or defects and determining a sheet formed between the formed slit line and a slit line on downstream side immediately before the formed slit line as a second defective sheet; in the step of laminating the first absorptive polarizing film sheets, a step of, when a first defective sheet is formed, removing the first defective sheet without laminating to a non-viewing side of a liquid-crystal display panel; and in the step of laminating the second absorptive polarizing film sheets, a step of, when a second defective sheet is formed, removing the second defective sheet without laminating to a viewing side of the liquid-crystal display panel.

The method for manufacturing liquid-crystal display device according to other embodiment of the present invention comprises a step of preparing three different rolls consisting of:

a first roll of a first web of optical laminate with slit lines comprising first absorptive polarizing film sheets formed between adjacent ones of slit lines with a size corresponding to a first longitudinal interval corresponding to a short side of a liquid-crystal display panel in a length-wise direction of the first web of optical laminate having a width corresponding to a long side of the liquid-crystal display panel in VA-mode or IPS mode, a second roll of a second web of optical laminate with slit lines comprising second absorptive polarizing film sheets formed between adjacent ones of slit lines with a size corresponding to a second interval corresponding to a long side of the liquid-crystal display panel in a length-wise direction of the second web of optical laminate having a width corresponding to a short side of the liquid-crystal display panel, and a third roll of a third web of optical laminate with slit lines comprising reflective polarizing film sheets formed between adjacent ones of slit lines with a size corresponding to the second interval corresponding to a long side of the liquid-crystal display panel in a length-wise direction of the third web of optical laminate having a width corresponding to a short side of the liquid-crystal display panel;

characterized in that the method further performing:

by using the prepared three rolls, a step of sequentially laminating the first absorptive polarizing film sheets having a transmission axis orthogonal to a longitudinal direction and configuring the first web of optical laminate with slit lines fed from the first roll to a non-viewing side of the sequentially conveyed liquid-crystal display panel and the second absorptive polarizing film sheets having a transmission axis orthogonal to a longitudinal direction and configuring the second web of optical laminate with slit lines fed from the second roll to a viewing side of the sequentially conveyed liquid-crystal display panel such that the transmission axes of the first and the second absorptive polarizing film sheets are orthogonal to each other; and a step of overlappingly laminating the reflective polarizing film sheets having a transmission axis in a longitudinal direction and configuring the third web of optical laminate with slit lines being fed from the third roll to a surface of the first absorptive polarizing film sheets laminated to the non-viewing side of liquid-crystal display panel, the surface being opposite to the side of the liquid-crystal display panel, such that the transmission axes of the reflective polarizing film sheets and the first absorptive polarizing film sheets are parallel to each other.

The prepared first roll may be a roll of a first web of optical laminate with slit lines comprising first absorptive polarizing film sheets with a size corresponding to a first longitudinal interval formed between adjacent ones of slit lines in a length-wise direction of a first optical laminate or first absorptive polarizing film sheets with which a surface protection film sheets integrally formed thereon, by forming slit lines in an orthogonal direction with respect to a longitudinal direction to a depth at least reaching to a surface of the adhesive layer from a surface of the first optical laminate opposite to a first carrier film at the first longitudinal interval corresponding to one of a long side or a short side, e.g. a short side, of a liquid-crystal display panel in the first web of optical laminate comprising a long web of a first absorptive polarizing film with a width corresponding to the other of the long side or the short side, e.g. the long side, of the liquid-crystal display panel and the first carrier film laminated via an adhesive layer to the first absorptive polarizing film, or, the first carrier film further laminated via an adhesive layer to the other surface of the first absorptive polarizing film.

The prepared second roll may be a roll of a second web of optical laminate with slit lines comprising second absorptive polarizing film sheets with a size corresponding to a second longitudinal interval formed between adjacent ones of slit lines in a length-wise direction of a second optical laminate or second absorptive polarizing film sheets with which a surface protection film sheets integrally formed thereon, by forming slit lines in an orthogonal direction with respect to a longitudinal direction to a depth at least reaching to a surface of the adhesive layer from a surface of the second optical laminate opposite to a second carrier film at the second longitudinal interval corresponding to one of a long side or a short side, e.g. a long side, of a liquid-crystal display panel in the second web of optical laminate comprising a long web of a second absorptive polarizing film with a width corresponding to other one of the long side or the short side, e.g. the short side, of the liquid-crystal display panel and the second carrier film laminated via an adhesive layer to the second absorptive polarizing film, or, the second carrier film further laminated via an adhesive layer to the other surface of the second absorptive polarizing film.

The prepared third roll may be a roll of a third web of optical laminate with slit lines comprising reflective polarizing film sheets with a size corresponding to the second longitudinal interval formed between adjacent ones of slit lines in a length-wise direction of a third optical laminate or reflective polarizing film sheets with which a surface protection film sheets integrally formed thereon, by forming slit lines in an orthogonal direction with respect to a longitudinal direction to a depth at least reaching to a surface of the adhesive layer from a surface of the third optical laminate opposite to a third carrier film at the second longitudinal interval in the third web of optical laminate comprising a long web of a reflective polarizing film with a width corresponding to other one of the long side or the short side, e.g. the short side, of the liquid-crystal display panel and the third carrier film laminated via an adhesive layer to the reflective polarizing film, or, the third carrier film further laminated via an adhesive layer to the other surface of the reflective polarizing film.

As one of other embodiments of the present invention, the method for manufacturing liquid-crystal display device may further comprise a step for peeling the surface protection film from the first absorptive polarizing film sheets in the step of overlappingly laminate the reflective polarizing film sheets to the first absorptive polarizing film sheets to which the surface protection film is laminated via an adhesive layer.

As one of other embodiments of the present invention, the method for manufacturing liquid-crystal display device may further comprise a step of relatively positioning each of the first absorptive polarizing film sheets and the second absorptive polarizing film sheets to the liquid-crystal display panel and a step of relatively positioning the reflective polarizing film sheets to the liquid-crystal display panel, such that the long sides and the short sides of the liquid-crystal display panel, the first and the second absorptive polarizing film sheets, and the reflective polarizing film sheets match with each other in top-bottom direction.

As another embodiment of the present invention, the first and the second rolls to be prepared in the method for manufacturing liquid-crystal display device may be a first and a second web of optical laminate with slit lines which are already inspected for defects contained in first and second absorptive polarizing film sheet which an adhesive layer is formed on one or both surfaces thereon. When such a roll is used, the first and the second web of optical laminate with slit lines to be prepared include sheets, which have been previously inspected for defect or defects contained in either of first and second absorptive polarizing film sheets laminated via an adhesive layer to a first and a second carrier film, a first and a second absorptive polarizing film before forming first and second absorptive polarizing film sheets and/or an adhesive layer formed on one or both of opposite surfaces of the first and the second absorptive polarizing film and have been formed based on the defect or the defects between another slit line formed at a position on upstream side of conveying direction with a predetermined distance from each defect and a slit line on downstream side immediately before the another line, as first and/or second defective sheets. The method may further comprise, in the step of laminating the first absorptive polarizing film sheets, a step of, when the first defective sheet included in the first web of optical laminate with slit lines is conveyed, removing the first defective sheet without laminating to a non-viewing side of a liquid-crystal display panel; and in the step of laminating the second absorptive polarizing film sheets, a step of, when the second defective sheet included in the second web of optical laminate with slit lines is conveyed, removing the second defective sheet without laminating to a viewing side of the liquid-crystal display panel.

The first, the second and the third roll are mounted in respective one of lamination units comprising respective one of a first, a second or a third lamination station. Use of the lamination units allows for continuously sequentially laminating film sheets formed with desired length-wise size in each of the webs of optical laminate or film sheets of desired length-wise size to surfaces of viewing side and non-viewing side of the liquid-crystal display panel, while sequentially feeding the three rolls. The lamination units may be apparatus for implementing one or other embodiments of the present invention for manufacturing a liquid-crystal display device. The lamination unit is configured with: a first channel including a carry-in line for sequentially feeding the liquid-crystal display panels at one end and a first feed part of a web of optical laminate or a web of optical laminate with slit lines mounted with for example a first roll at the other end; and a second channel including a second feed part of a web of optical laminate or a web of optical laminate with slit lines mounted with for example a second roll at one end and a third feed part of a web of optical laminate or a web of optical laminate with slit lines mounted with for example a third roll at the other end, and the lamination unit may further comprise a control unit for controlling feeding of the first, the second and the third roll to be linked with conveying the liquid-crystal display panel into the carry-in line.

BRIEF DESCRIPTION OF THE DRAWINGS

FIG. 40 is a flow of controlling each of steps of calculating a number of first absorptive polarizing film sheets which can be formed in a remaining first roll connected to a new first roll and of reflecting a measured width of a first web of optical laminate of the new first roll to corresponding ones of reflective polarizing film sheets formed from a third web of optical laminate of a third roll in use, when a first roll and a third roll used as a pair or a set are not simultaneously changed, e.g. the first roll of a first conveying line 1000 is changed and the third roll is still in use, in the first conveying line 1000 and the third conveying line 3000 configuring a lamination unit shown in FIG. 39.

BEST MODE FOR CARRYING OUT THE INVENTION

Figure 1:
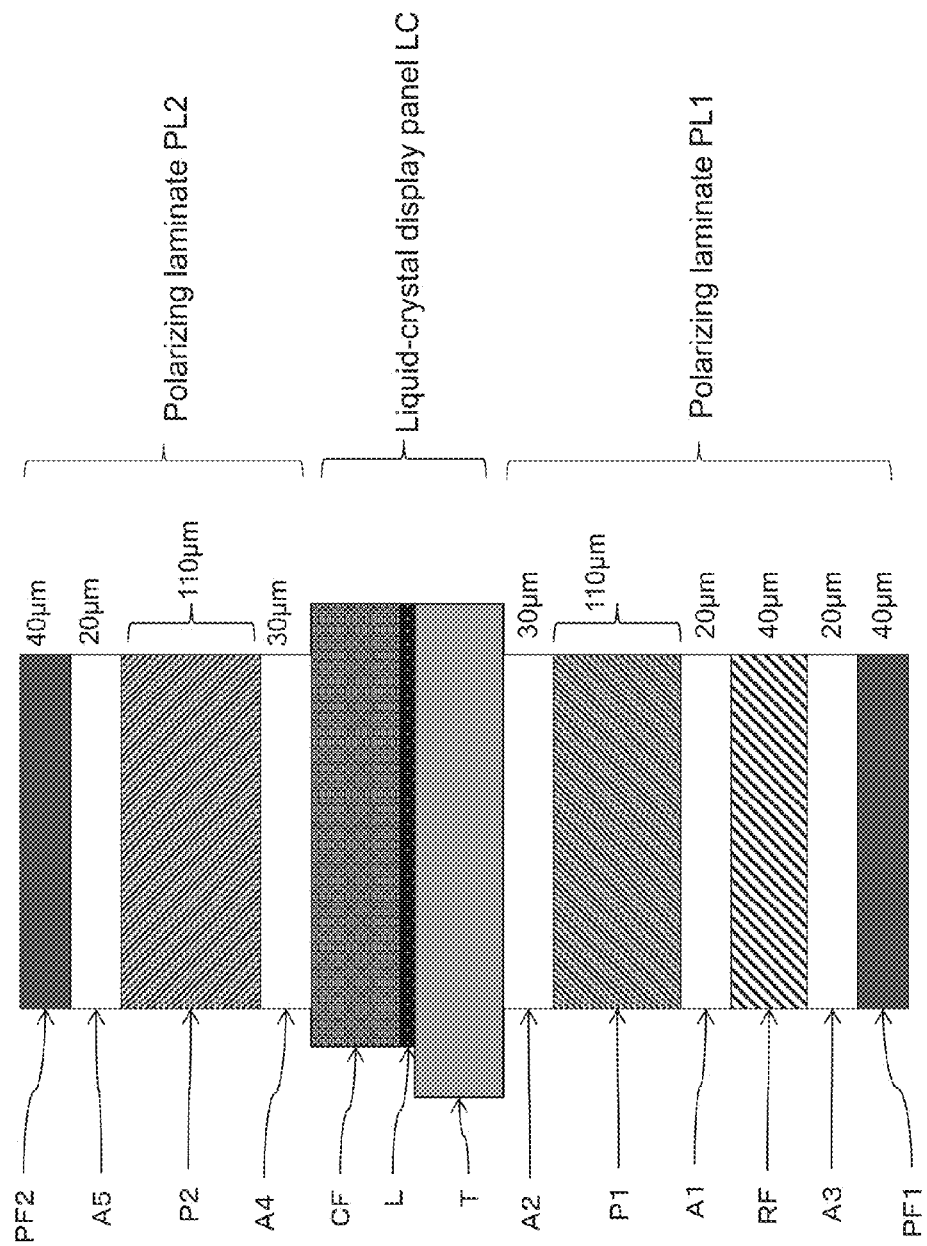
FIG. 1 is a cross sectional view showing a structure of a liquid-crystal display device.

FIG. 1 shows a typical structure of a liquid-crystal display device used in slate PCs. The liquid-crystal display device comprises a liquid-crystal display panel LC consisting of a liquid-crystal layer L, a color filter substrate CF bonded to one of opposite surfaces of the liquid-crystal layer L and a thin-film transistor substrate T bonded to the other of opposite surfaces of the liquid-crystal layer L, in which a side of the thin-film transistor of the liquid-crystal display panel LC is a non-viewing side. A non-viewing side polarizing laminate PL1 is bonded to the thin-film transistor substrate T of the liquid-crystal display panel LC and a viewing side polarizing laminate PL2 is bonded to the color filter substrate CF of the liquid-crystal display panel LC. The non-viewing side polarizing laminate PL1 has a non-viewing side polarizing film P1 configured with a normal absorptive polarizing film and a reflective polarizing film RP bonded via an adhesive layer A1 to the non-viewing side polarizing film P1. A surface of the non-viewing side polarizing film P1 opposite to the reflective polarizing film RP is bonded via an adhesive layer A2 to the thin-film transistor substrate T of the liquid-crystal display panel LC. A surface protection film PF1 is normally bonded via an adhesive layer A3 to a surface of the reflective polarizing film RP opposite to the non-viewing side polarizing film P1. The viewing side polarizing laminate PL2 has a viewing side polarizing film P2, and one of opposite surfaces of the viewing side polarizing film P2 is bonded via an adhesive layer 4 to the liquid-crystal display panel LC and a surface protection film PF2 is bonded via an adhesive layer A5 to the other of opposite surfaces of the viewing side polarizing film P2. The viewing side polarizing film P2 is configured with a normal absorptive polarizing film.

When manufacturing a layer-structured liquid-crystal display device shown in FIG. 1, at least on a non-viewing side of a liquid-crystal display panel LC, it is necessary to firstly laminate an absorptive polarizing film to the non-viewing side of the liquid-crystal display panel LC sequentially conveyed to a lamination station and then to overlappingly laminate a reflective polarizing film on the absorptive polarizing film such that transmission axes of them are parallel to each other. It is difficult to achieve a step of laminating the absorptive polarizing film and the reflective polarizing film by continuously feeding them from respective rolls formed in a long web shape, because a relationship between a longitudinal direction and a transmission axis of the absorptive polarizing film is inverse to that of the reflective polarizing film.

In case of middle-sized or small-sized liquid-crystal display device used in slate PCs, a liquid-crystal display panel LC used in such device is small and light because a size of the LC is about ⅓ to ⅕ and a weight of the LC is less than 1/20 of those of a large liquid-crystal display device. A roll of a web of optical laminate comprising a polarizing film to be laminated to a liquid-crystal display panel LC is also small in width and ⅓ to 1/10 in weight. The roll of for example 500 mm in diameter is about 100 to 150 mm in width and 30 to 70 kg in weight. Roll length of such web of optical laminate is about 900 m. However, a middle-sized or small-sized liquid-crystal display device requires twice as much manufacturing speed i.e., cycle time and severer laminating accuracy, than those for a large liquid-crystal display device.

Figure 2:
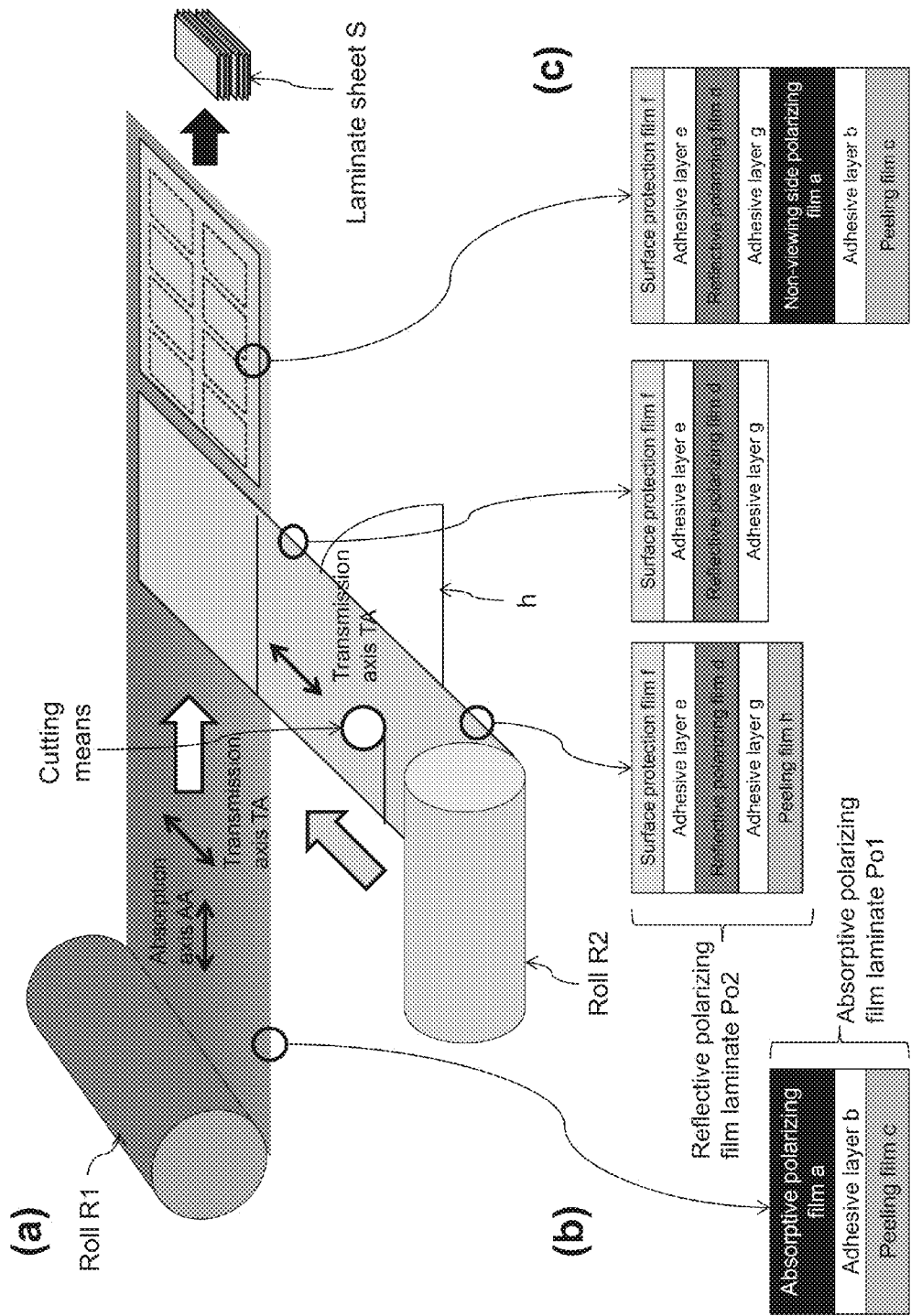
FIG. 2 is a perspective view showing a method of manufacturing a plurality of two-layered laminate sheet S by cutting, as a mother sheet, two-layered laminate formed from two mother-rolls of an optical film laminate comprising an absorptive polarizing film and an optical film laminate comprising a reflective polarizing film to a size of a liquid-crystal display panel.

In order to address such requirements, an approach shown in FIG. 2 is conventionally adopted. FIG. 2 is a schematic view showing a conventional method of forming optical film laminate sheets by cutting a polarizing laminate in which an absorptive polarizing film and a reflective polarizing film are overlapped such that their transmission axes are parallel to each other to a size corresponding to a liquid-crystal display panel LC.

In a conventional method shown in FIG. 2(a), a long web of conventional absorptive polarizing film laminate Po1 manufactured in a manufacturing step including longitudinal stretching step and a long web of reflective polarizing film laminate Po2 manufactured in a manufacturing step including transverse stretching step are prepared in a form of a roll R1 and R2, respectively. As shown in FIG. 2(b), the absorptive polarizing film laminate Po1 consists of an absorptive polarizing film a and a releasing film c bonded via an adhesive layer b to the absorptive polarizing film a. On the other hand, the reflective polarizing film laminate Po2 has a reflective polarizing film d and a surface protection film f normally bonded via an adhesive layer e to the reflective polarizing film d, and a releasing film h is bonded via an adhesive layer g to a surface of the reflective polarizing film d opposite to the surface protection film f. As shown in FIG. 2(a), the absorptive polarizing film a has an absorption axis AA in a longitudinal direction of the long web and accordingly a transmission axis TA in a transverse direction orthogonal to the absorption axis AA, and the reflective polarizing film d has a transmission axis TA in a longitudinal direction of the long web.

As shown in FIG. 2(a), the reflective polarizing film laminate Po2 fed from the roll R2 is conveyed to a direction orthogonal to the absorptive polarizing film laminate Po1 fed from the roll R1. Then, the releasing film h is peeled from the reflective polarizing film laminate Po2 such that the reflective polarizing film d overlaps via the adhesive layer g on the absorptive polarizing film a of the absorptive polarizing film laminate Po1. As a result, the reflective polarizing film d is bonded via the adhesive layer g to the absorptive polarizing film laminate Po1 to form a laminate shown in FIG. 2(c). Such obtained laminate is a rectangle which one side thereof has a width of the absorptive polarizing film laminate Po1 and the other side thereof has a width of the reflective polarizing film laminate Po2. This rectangular laminate may be cut to a size corresponding to a size of the liquid-crystal display panel LC to form multiple rectangular laminate sheets S.

Laminate sheets S as such formed are laminated to a surface of a liquid-crystal display panel LC while peeling the releasing film c one by one to form a liquid-crystal display device. A sheet of the optical film laminate PL1 laminated on a non-viewing side in FIG. 1 is formed by the above described steps and is configured to be laminated such that the absorption axis TA of the absorptive polarizing film P1 and the absorption axis TA of the reflective polarizing film RP are parallel to each other. In some embodiments, optical film laminate PL1 is referred to as optical laminate or polarizing laminate.

Figure 3:
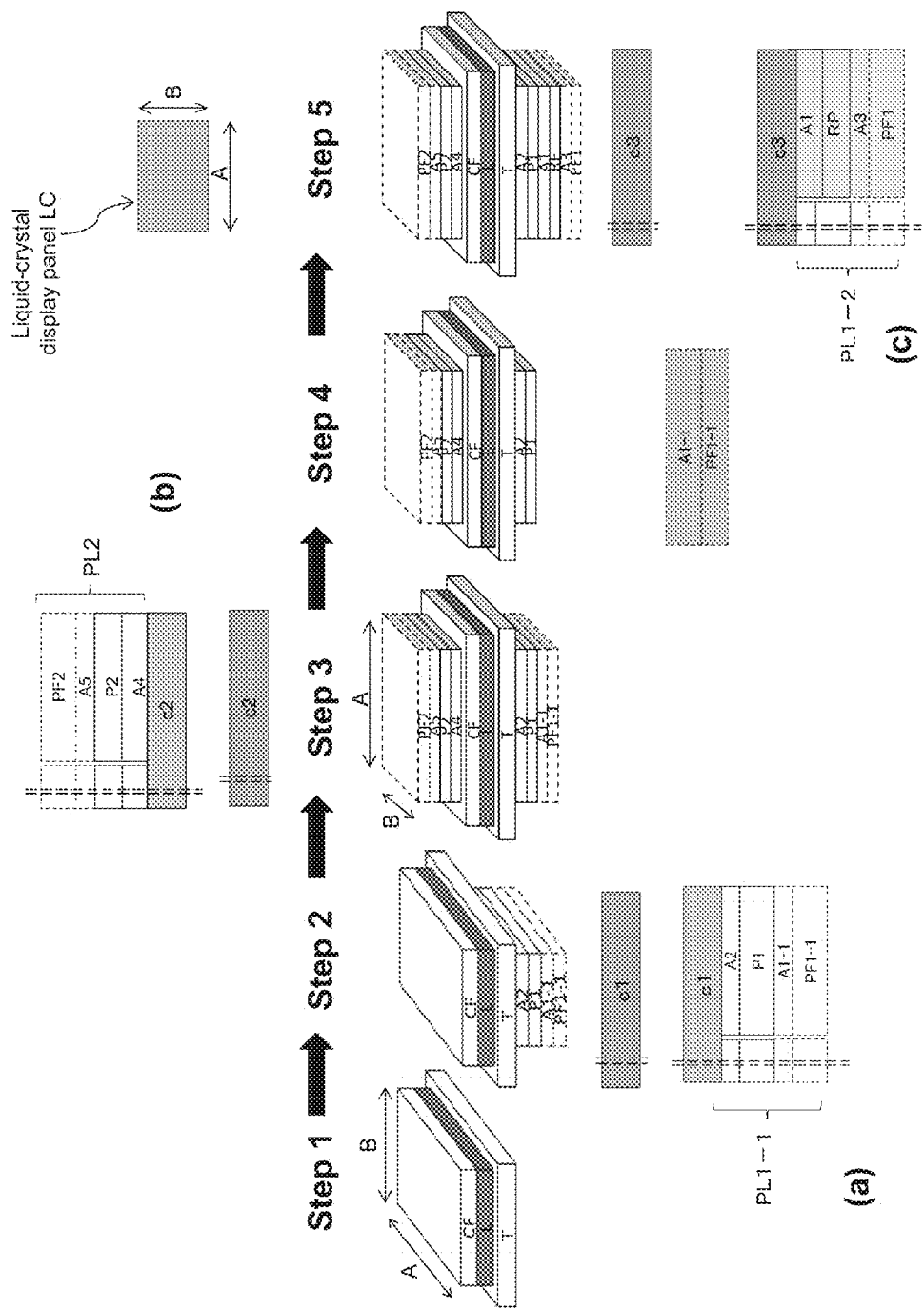
FIG. 3 is a schematic view showing one structure of first and second absorptive polarizing film sheets and reflective polarizing film sheets at each of steps configuring a method of manufacturing a liquid-crystal display device comprising a step of laminating first absorptive polarizing film sheets to a non-viewing side surface of a liquid-crystal display panel, a step of laminating second absorptive polarizing film sheets to a viewing side surface of a liquid-crystal display panel and a step of laminating reflective polarizing film sheets to the other surface of first absorptive polarizing film sheets laminated to a non-viewing side of a liquid-crystal display panel.

FIG. 3 schematically shows step 1 to step 5 of a method appropriate for manufacturing a liquid-crystal display device shown in FIG. 1 by preparing a roll of a long web of optical film laminate comprising an absorptive polarizing film and a roll of a long web of optical film laminate comprising a reflective polarizing film and paying each of webs of the optical laminate out from respective roll for laminating on a respective surface of a liquid-crystal display panel LC.

An optical film laminate PL1 arranged on a non-viewing side of a liquid-crystal display panel LC is divided into a polarizing laminate PL1-1 comprising an absorptive polarizing film P1 and a polarizing laminate PL1-2 comprising a reflective polarizing film RP, and the divided laminates are prepared as a roll R1 of a web of a first optical laminate f1 and a roll R3 of a web of a third optical laminate. The polarizing laminate PL1-1 shown in FIG. 3(a) comprises an adhesive layer A2 in the polarizing laminate PL1 and the absorptive polarizing film P1 on the non-viewing side shown in FIG. 1, and a carrier film c1 is bonded to the adhesive layer A2. The polarizing laminate PL1-2 shown in FIG. 3(c) comprises a reflective polarizing film RP in the polarizing laminate PL1 of the non-viewing side shown in FIG. 1, adhesive layers A1 and A3 on both surfaces thereof and a surface protection film PF1, and a carrier film c3 is bonded to the adhesive layer A1. A first web of optical laminate f1 configured by laminating the carrier film c1 on the polarizing laminate PL1 shown in FIG. 3(a) is fed from a first roll R1, cut to a predetermined length, peeled from the first carrier film c1 and bonded via the adhesive layer A2 to a thin-film transistor T side of the liquid-crystal display panel LC. Then, an adhesive layer A1-1 and a surface protection film PF1-1 are peeled from the polarizing laminate PL1-1. Similarly, the third carrier film c3 is peeled from a third web of optical laminate f3 configured by laminating the carrier film c3 to the polarizing laminate PL1-2 shown in FIG. 3(3), and the remaining laminated is bonded via the adhesive layer A1 to the absorptive polarizing film P1 on the non-viewing side to obtain a layered-structure on the non-viewing side of the liquid-crystal display device.

On the other hand, the polarizing laminate PL2 arranged on a viewing side of a liquid-crystal display device is prepared as a second roll R2 of a second web of optical laminate f2 configured by bonding a carrier film c2 to an adhesive layer A4 of the polarizing laminate PL2 shown in FIG. 3(b), and is cut to a predetermined length, peeled from the second carrier film c2 and laminated to the color filter substrate CF of the liquid-crystal display panel LC.

Adopting three-stage laminating steps allows for laminating two absorptive polarizing films and one reflective polarizing film to a liquid-crystal display panel LC by Roll-to-Panel method, which is more particularly explained in step 1 to step 5 shown in FIG. 3. Step 1 is a state where a liquid-crystal display panel LC is conveyed with a long side at front. In step 2, a first carrier film c1 is peeled from a web of optical laminate f1 and a polarizing laminate PL1-1 is laminated to a non-viewing side of the liquid-crystal display panel LC. Step 3 is a state where the liquid-crystal display panel LC is rotated for 90° and conveyed with a short side at front, and a second carrier film c2 is peeled from a web of optical laminate f2 and a polarizing laminate PL2 is laminated to a viewing side of the liquid-crystal display panel LC. After steps 1 through 3, transmission axes of absorptive polarizing films P1 and P2 laminated respectively to the non-viewing side and the viewing side of the liquid-crystal display panel LC are arranged as orthogonal to each other.

Step 4 is a state where sheets of an adhesive layer A1-1 and surface protection film PF1-1 are peeled from the polarizing laminate PL1-1. In step 5, a third carrier film c3 is peeled from a web of optical laminate f3 which is configured as laminating the carrier film c3 to a polarizing laminate PL1-2, and a remaining laminate, i.e. a laminate consisting of a reflective polarizing film RP, an adhesive layer A3 and a surface protection film PF1, is bonded via an adhesive layer A1 to the absorptive polarizing film P1 on the non-viewing side, thereby transmission axes of the absorptive polarizing film P1 and the reflective polarizing film RP overlappingly laminated to the non-viewing side are arranged as parallel to each other. Step 5 is a state where a layer-structured liquid-crystal display device shown in FIG. 1 is obtained.

Figure 4:
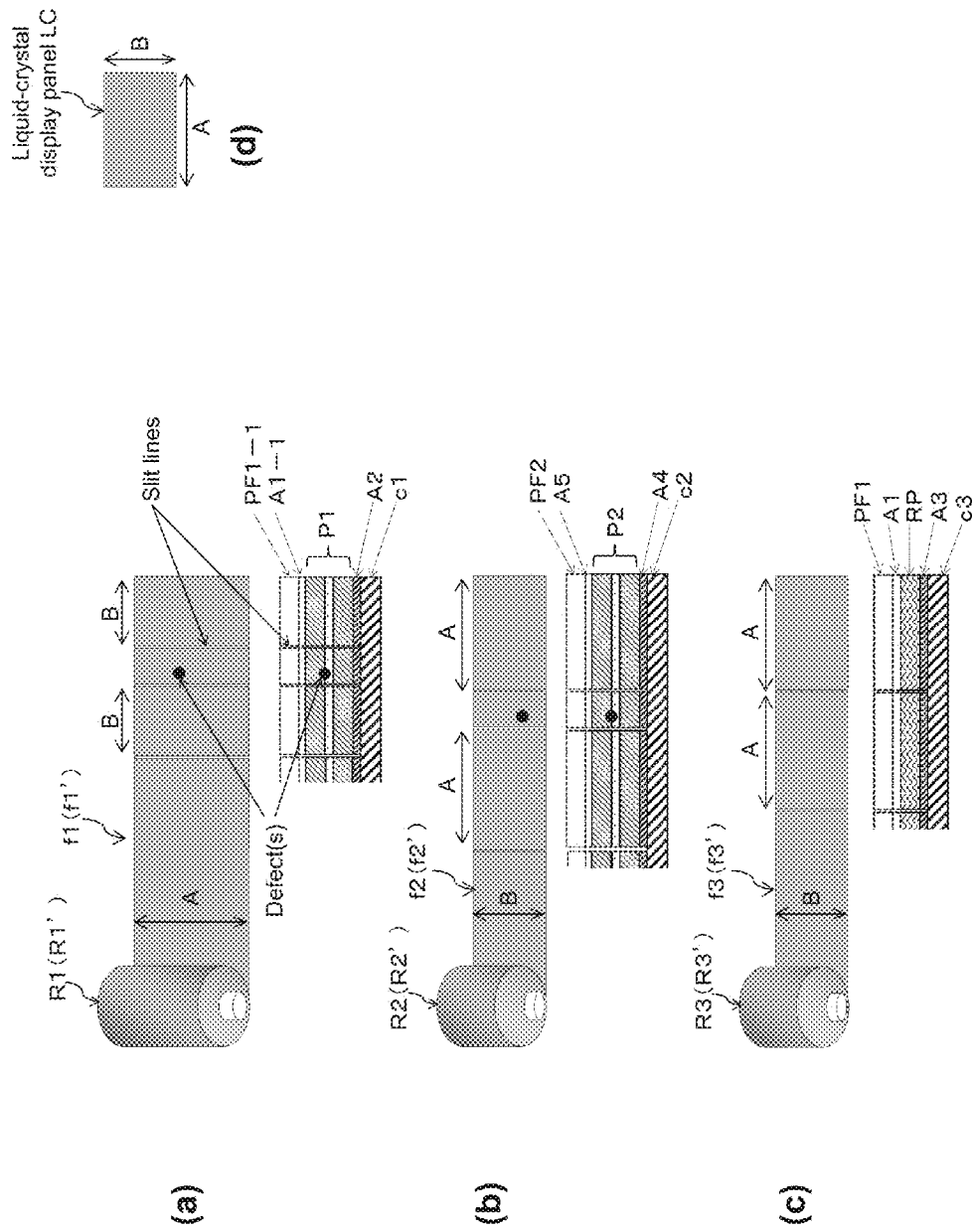
FIG. 4 shows a plan view and a side view of a first, a second and a third roll of web of optical laminate or a web of optical laminate with slit lines used in one or other embodiment of the present invention.

FIG. 4 is a schematic view showing a first roll R1, a second roll R2 and a third roll R3 of a first web of optical laminate f1, a second web of optical laminate f2 and a third web of optical laminate f3, or a first roll R1', a second roll R2' and a third roll R3' of a first web of optical laminate with slit lines f1', a second web of optical laminate with slit lines f2' and a third web of optical laminate with slit lines f3', mounted to lamination units which perform a method of the present invention. FIG. 4(d) shows a long side A and a short side B of a liquid-crystal display device.

FIG. 4(a) is an expanded view of a first web of optical laminate comprising an absorptive polarizing film, with a width A corresponding to a long side of a liquid-crystal display panel LC and slit lines to be formed in width-wise direction at a longitudinal interval B corresponding to a short side of the liquid-crystal display panel LC, or, a first web of optical laminate with slit lines with a width A corresponding to the long side of the liquid-crystal display panel LC and slit lines formed in width-wise direction at the longitudinal interval B corresponding to the short side of the liquid-crystal display panel LC, in particular, an expanded view of a first web of optical laminate f1 or a first web of optical laminate with slit lines f1' which has a carrier film c1 bonded to an adhesive layer A2 of a polarizing laminate PL1-1.

FIG. 4(b) is an expanded view of a second web of optical laminate comprising an absorptive polarizing film, with a width B corresponding to a short side of a liquid-crystal display panel LC and slit lines to be formed in width-wise direction at a longitudinal interval A corresponding to a long side of the liquid-crystal display panel LC, or, a second web of optical laminate with slit lines with a width B corresponding to the short side of the liquid-crystal display panel LC and slit lines formed in width-wise direction at the longitudinal interval A corresponding to the long side of the liquid-crystal display panel LC, in particular, an expanded view of a second web of optical laminate f2 or a second web of optical laminate with slit lines f2' which has a carrier film c2 bonded to an adhesive layer A4 of a polarizing laminate PL2.

FIG. 4(c) is an expanded view of a third web of optical laminate comprising a reflective polarizing film, with a width B corresponding to a short side of a liquid-crystal display panel LC and slit lines to be formed in width-wise direction at a longitudinal interval A corresponding to a long side of the liquid-crystal display panel LC, or, a third web of optical laminate with slit lines with a width B corresponding to the short side of the liquid-crystal display panel LC and slit lines formed in width-wise direction at the longitudinal interval A corresponding to the long side of the liquid-crystal display panel LC, in particular, an expanded view of a third web of optical laminate f3 or a third web of optical laminate with slit lines f3' which has a carrier film c3 bonded to an adhesive layer A1 of a polarizing laminate PL1-2.

Further, FIG. 4(a) and FIG. 4(b) show a defective sheet region defined by adjacent slit lines which contains a defect inherent in either of absorptive polarizing films P1, P2 and/or adhesive layers A1-1, A2, A4 and A5 formed on one side or both sides of the absorptive polarizing film. A defective sheet region shown in FIG. 4(a) corresponds to a first defective sheet with a width A corresponding to a long side of a liquid-crystal display panel and a length x1 (normally x1<B) defined between a slit line formed at a position on upstream side with respect to conveying direction with a predetermined distance from contained defect or defects and a slit line on downstream side immediately before said slit line. A defective sheet region shown in FIG. 4(b) corresponds a second defective sheet with a width B corresponding to a short side of a liquid-crystal display panel and a length x2 (normally x2<A) defined between a slit line formed at a position on upstream side with respect to conveying direction with a predetermined distance from contained defect or defects and a slit line on downstream side formed immediately before said slit line. Details of the defective sheets will be described later.

Embodiment 1

Figure 5:
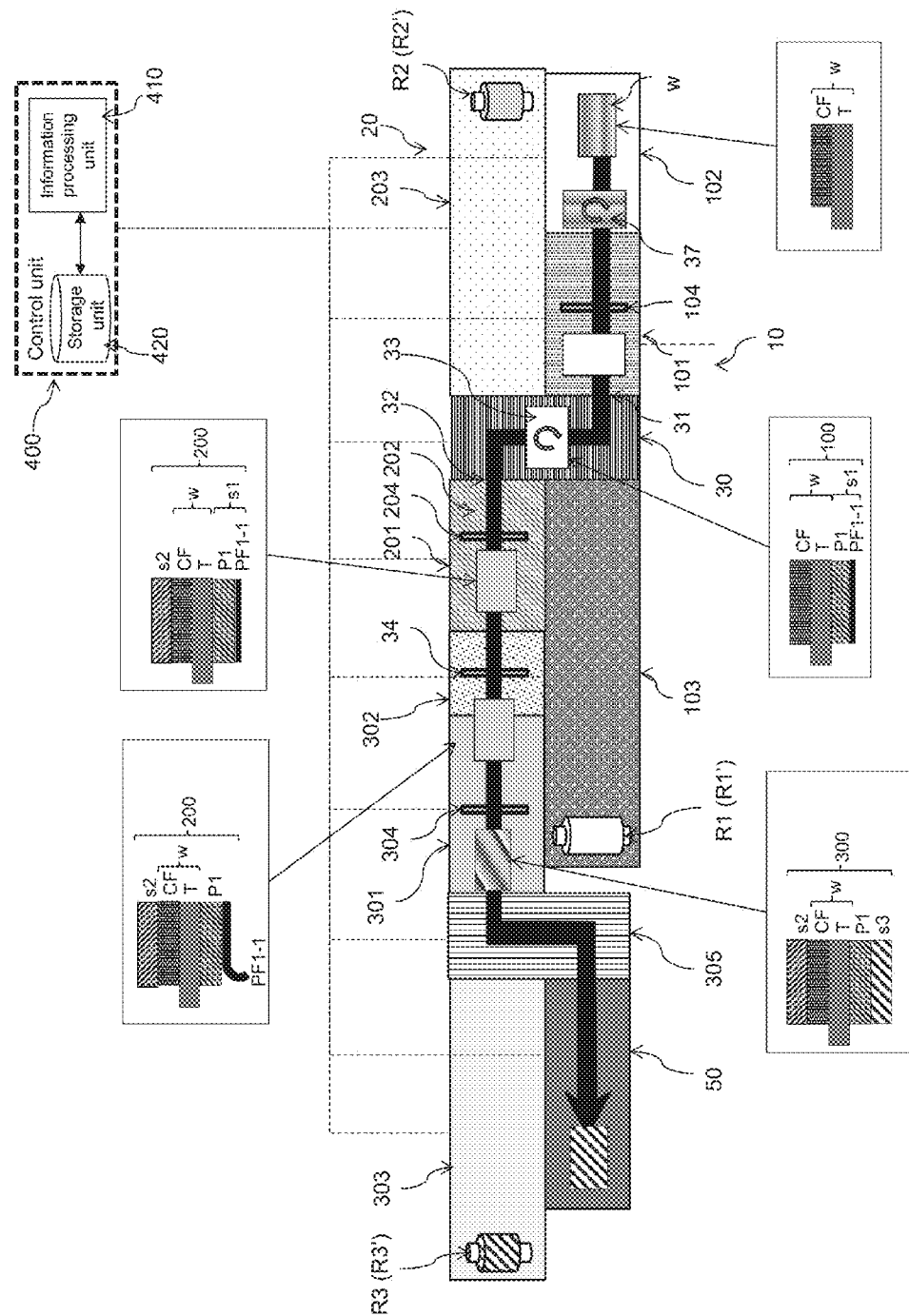
FIG. 5 is a plan view showing a lamination unit used in one or other embodiment of the present invention.
Figure 6:
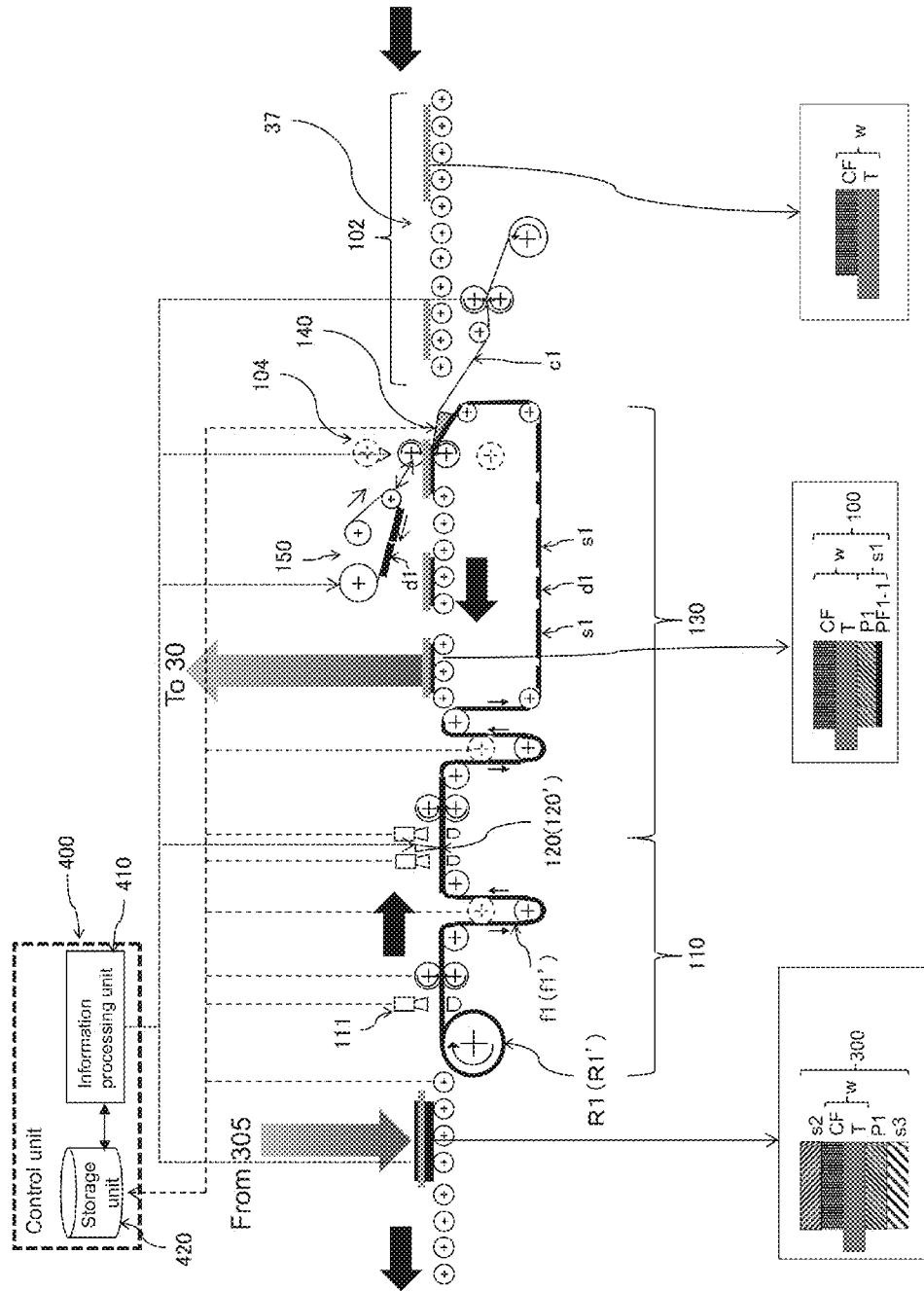
FIG. 6 shows a side view of a first channel of the lamination unit of FIG. 5.
Figure 7:
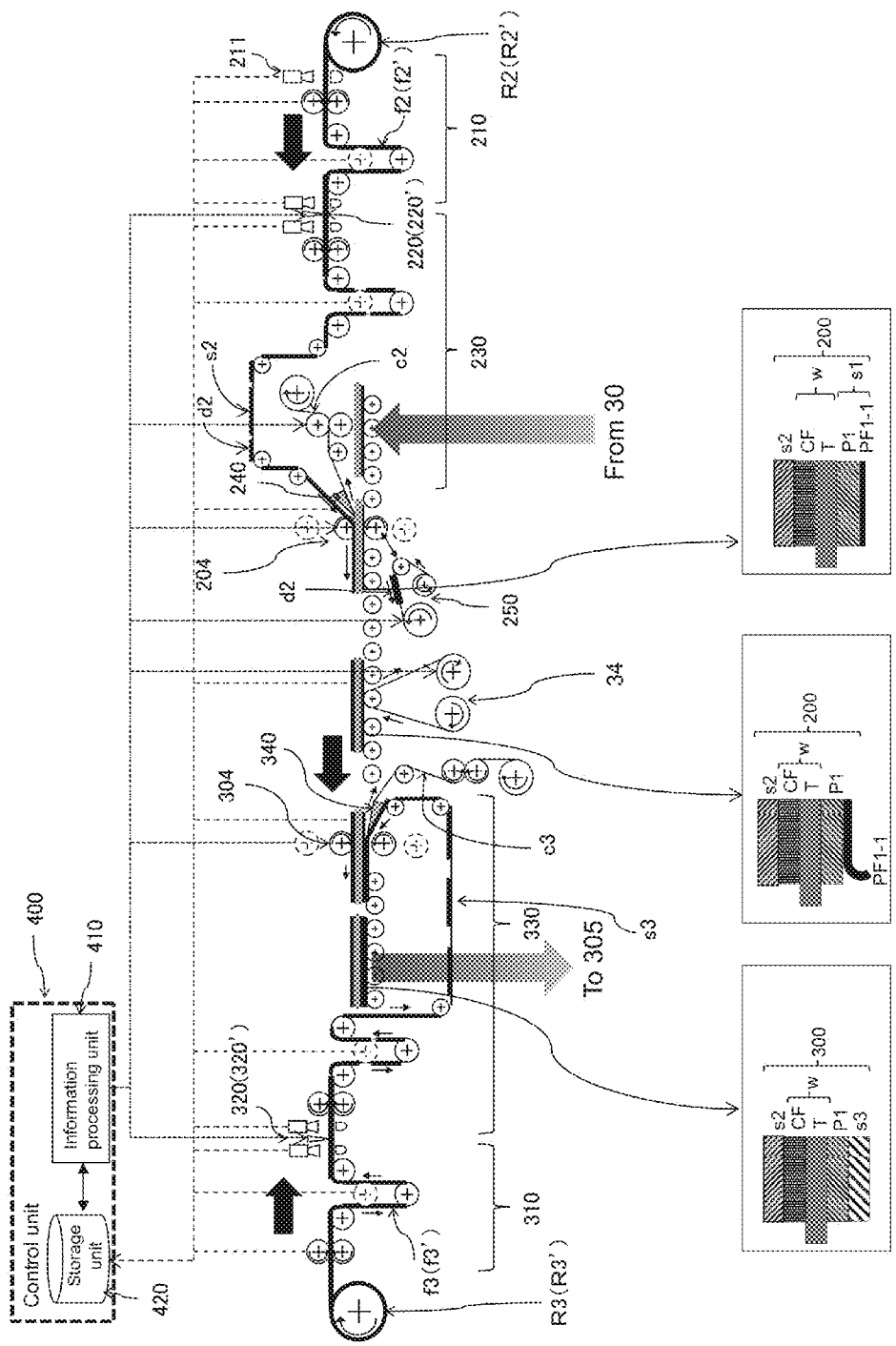
FIG. 7 shows a side view of a second channel of the lamination unit of FIG. 5.

A liquid-crystal display panel used for a liquid-crystal display device of a slate PC typically has, but not limited to, two glass substrates which a liquid-crystal layer L is filled therebetween, one of the two substrates on a viewing side is a color filter substrate CF comprising a layer of color filter (CF) and the other is a thin-film transistor substrate T comprising a thin-film transistor (TFT), and the liquid-crystal display panel is configured with a liquid-crystal cell (LC) with a size of 5 to 10 inches (120 to 250 mm), a thickness of about 0.5 mm and a weight of 15 to 40 g. Normally, sizes of the two glass substrates are different as that a long side and a short side of the glass substrate on TFT side is longer by a few millimeters than those of the glass substrate on CF side. Edges of about a few millimeters of long sides and short sides of the glass substrate on TFT side are, as well-known, used for arranging terminals etc for connection. FIG. 5 to FIG. 7 show liquid-crystal display panels LC (hereinafter LC is indicated with w) structured as a rectangular viewing side substrate and a rectangular non-viewing side substrate are overlappingly laminated.

FIG. 5 to FIG. 7 are schematic views of lamination units in a Roll-to-Panel (RTP) lamination system for a liquid-crystal display panel w implementing an embodiment of the present invention. FIG. 5 is a plan view of the lamination units where a thick arrow in the view indicates a conveyance channel of the liquid-crystal display panel w, and FIG. 6 and FIG. 7 are side views thereof.

A method for manufacturing a liquid-crystal display device executed at a lamination unit 1 comprises 3 steps including a step of sequentially laminating absorptive polarizing film sheets to a non-viewing side and a viewing side of a liquid-crystal display panel w and a step of overlappingly laminating reflective polarizing film sheets to respective ones of the absorptive polarizing film sheets laminated to the non-viewing side of the liquid-crystal display panel w. In particular, at a first and a second lamination station 101, 201, a first web and a second web of optical laminate f1, f2 are cut to a predetermined length to provide first and second absorptive polarizing film sheets s1, s2, the sheets s1, s2 corresponding to polarizing laminates PL1-1, PL2 shown in FIG. 3 are peeled from a first and a second carrier film c1, c2, and the sheets s1, s2 are sequentially laminated to respective one of the non-viewing side surface and the viewing side surface of the liquid-crystal display panel w conveyed to each of the stations. At a third lamination station 301, a third web of optical laminate f3 comprising a reflective polarizing film is cut to a predetermined length to provide reflective polarizing film sheets s3, the sheets s3 corresponding to a polarizing laminate PL1-2 shown in FIG. 3 are peeled from a third carrier film c3 and laminated to a surface of the absorptive polarizing film sheets s1 laminated at the first lamination station 101.

As shown in FIG. 6, a first web feeding mechanism 110 for feeding the first web of optical laminate f1 to the first lamination station 101 comprises a first defect inspection mechanism 111 which inspects a polarizing film P1 of the first web of optical laminate f1 and adhesive layers A1, A2 on respective surfaces thereof for any defect or defects. Information on position or positions of defect or defects detected by the inspection is transmitted to a control unit 400 having a storage unit 420 and a information processing unit. The first web feeding mechanism 110 is further provided with a first slit line formation mechanism 120 on downstream side of the first defect inspection mechanism 111 with respect to web feeding direction. The first slit line formation mechanism 120 forms, based on control signals from the control unit 400, slit lines in a direction orthogonal to a longitudinal direction, i.e. in a transverse direction of the first web of optical laminate f1 in an optical film laminate PL1-1 consisting of the adhesive layer A2 of the first web of optical laminate f1 and the polarizing film P1, or, the optical film laminate PL1-1 in which a surface protection film PF1-1 being laminated via the adhesive layer A1-1 to a surface of the polarizing film P1, to form a sheet s1 of the optical film laminate PL1-1, i.e. the first absorptive polarizing film sheet between two adjacent slit lines in conveying direction. An interval between two slit lines corresponds to a length B corresponding to a short side of the liquid-crystal display panel w to which the sheet s1 is laminated. But, when a defect or defects are present between two slit lines, it is preferable that the slit line formed on upstream side of the defect or the defects is formed at a position with a predetermined distance from the position of the defect or the defects. A defective sheet containing a defect or defects, normally smaller than the length B of the sheet s1, is formed between the two adjacent slit lines, which is referred as a first defective sheet d1.

The lamination unit 1 has two adjacent parallel straight channels 10, 20, and a size of the channels is, but not limited to, about 5 to 10 m in width and about 15 to 30 m in length. Preferably, the two channels are set to a height which an operator can visually identify a liquid-crystal display panel w being conveyed from a right end of the first channel 10 and further a liquid-crystal display device (hereinafter referred as "a laminate product") conveyed via the second channel 20 and carried out from a left end of a carry-out line 50. The height of the channels may be about 1.5 m and an overall height of the unit may be about 2.5 m. The unit is arranged in a clean room as well-known to those skilled in the art. In a clean room, it is preferable that the unit is covered with an operable door or a box-type vessel with a window to maintain high-level cleanness in order to eliminate, wherever possible, adhesion of dirt etc brought by workers and/or operators to an exposed surface of sheets to be laminated to both surfaces of the liquid-crystal display panel w. From the above view point, it is more preferable to arrange other channels in a direction orthogonal to the two channels 10, 20, to arrange the channels in a hierarchical structure, and to avoid the liquid-crystal display panel w passing over the optical film laminate, i.e., it is more preferable to have an optimum configuration where conveyance of the optical film laminate sheets s1, s2, and s3, conveyance of the liquid-crystal display panel w and the lamination stations 101, 201 and 301 for satisfying arrangement of the sheets and the panel have an optimal configuration that those are housed in the box-type vessel to allow exerting satisfying performance.

As described in the above, the lamination unit 1 for implementing as one embodiment of the present invention comprises a first channel 10 and a second channel 20 which are straight, adjacent and parallel. Taking a middle-size or a small-size liquid-crystal display device used for slate PCs as an example, the first channel 10 comprises a first lamination station 101 comprising a carry-in table, a laminating means 104 and a carry-out table, the first lamination station 101 being provided at a predetermined distance from one end of the channel 10 and preferably has a predetermined width, a panel conveying line 102 with a carry-in part, configured to convey the liquid-crystal display panel w to the station 101 and preferably has a same width as the carry-in table, and a first web feeding line 103 arranged at a side of the station 101 opposite to the panel conveying line 102 and preferably feeding a first web of optical laminate comprising a first polarizing film P1 (corresponds to a long web of optical film laminate PL1-1 shown in FIG. 3) to the station 101.

At an end of the panel conveying line 102, a panel cleaning line (not shown) of publicly known configuration may be connected. A rectangular liquid-crystal display panel w carried into the panel conveying line 102 is normally carried in via the panel cleaning line, and thus, it is preferable that the panel w is conveyed in a transverse posture where a short side of the panel w is orthogonal to a conveying direction and a non-viewing side facing downward. When the liquid-crystal display panel w is conveyed in a transverse posture where a short side of the panel w is orthogonal to a conveying direction, it is preferable to convey the panel w into the panel conveying line 102 after rotating the panel w to a longitudinal posture by a rotating means etc. A step of carrying the liquid-crystal display panel w into the panel conveying line 102 in a longitudinal posture and a non-viewing side facing downward is for efficient processing at the lamination unit 1, and the detail will be described later.

As shown in FIG. 6, a first web feeding mechanism 110 and a first slit line formation mechanism 120 are deployed in a first web feeding line 103. The first web feeding mechanism 110 operates to feed a first web of optical laminate f1 from a roll R1 of the first web of optical laminate comprising an absorptive polarizing film P1 and a first carrier film c1 to be laminated to a non-viewing side of a liquid-crystal display panel w. As previously described, the first slit line formation mechanism 120 forms slit lines in width-wise direction in the first web of optical laminate f1 fed from the roll R1 of the first web of optical laminate f1 at an in interval corresponding to a size of a short side of the liquid-crystal display panel w while leaving the first carrier film c1 uncut to form first absorptive polarizing film sheets s1 supported by the first carrier film c1 between two respective ones of adjacent slit lines in a conveying direction.

A first conveying mechanism 130 and a first peeling mechanism 140 are deployed on downstream side in the conveying direction of the first slit line formation mechanism 120. The first conveying mechanism 130 operates to convey the first absorptive polarizing film sheets s1 supported by the first carrier film c1 to the first lamination station 101. The first peeling mechanism 140 operates to peel the first absorptive polarizing film sheets s1 from the first carrier film c1 in the first lamination station 101. In addition, a first removing mechanism 150 which operates in coordination with the first peeling mechanism 140 may be deployed in the first peeling mechanism 140. The first removing mechanism 150 operates to remove first defective sheets d1 supported by the first carrier film c1 without laminating to the liquid-crystal display panel w.

The first web feeding line 103 is preferably, but not limited to, deployed at or below a height of a conveying table of the panel conveying line 102 which configures the first channel 10 because the first absorptive polarizing film sheets s1 are laminated to a non-viewing side of the liquid-crystal display panel w which a thin-film transistor substrate T is arranged thereon. In the first web feeding line 103, the first web feeding mechanism 110 for paying out the first web of optical laminate f1 from the roll R1, the first slit line formation mechanism 120, the first conveying mechanism 130 and the first peeling mechanism 140 are arranged along a straight channel.

The first absorptive polarizing film sheets s1 are peeled from the first carrier film c1 and then laminated to a lower surface on the non-viewing side of the liquid-crystal display panel w by the first laminating means 104 in the first lamination station 101 to form a first intermediate laminate 100. The first intermediate laminate 100 is configured as that the first absorptive polarizing film sheets s1 are laminated to the non-viewing side of the liquid-crystal display panel w which the thin-film transistor substrate T is arranged thereon.

The first intermediate laminate 100 is further conveyed to a second lamination station 201 where second absorptive polarizing film sheets s2 cut out from a second web of optical laminate f2 comprising an absorptive polarizing film P2 are laminated to a viewing side of the liquid-crystal display panel w which a color filter substrate CF is arranged thereon. A channel for conveying the first intermediate laminate 100 from the first lamination station 101 to the second lamination station 201 is formed in a first channel-to-channel transfer part 30 as shown in FIG. 5.

The first channel-to-channel transfer part 30 is arranged as that it receives a first intermediate laminate 100 at a receiving-side end 31 from a carrying-out table of a first lamination station 101, transfer the received first intermediate laminate 100 to a second channel 20, and transfers the intermediate laminate 100 at a transfer-side end 32 of the first channel-to-channel transfer part 30 to a carrying-in table of a second lamination station 201.

Similarly, taking a liquid-crystal display panel used for a liquid-crystal display device of a slate PC as an example, a second lamination station 201 is provided at a second channel 20, and an intermediate laminate 100 is received at the second lamination station 201 from a transfer-side end 32 of a first channel-to-channel transfer part 30. A second laminating means 204 is provided at the second lamination station 201, which laminates second absorptive polarizing film sheets s2 cut out from a second web of optical film laminate f2 comprising a second absorptive polarizing film P2 (corresponds to a long web of optical film laminate PL2 shown in FIG. 3) to the first intermediate laminate 100 to form a second intermediate laminate 200.

A part for receiving the first intermediate laminate 100 from the transfer-side end 32 may be configured with a receiving table of the second channel 20 or with a carry-in table of the second lamination station 201. The second channel 20 further has a second web feeding line 203 between one end of the second channel 20 and the second lamination station 201, which is parallel to a panel conveying line 102 provided in the first channel 10 and configured to feed a second web of optical laminate f2 from one end of the second channel 20 to the second lamination station 201.

As shown in FIG. 7, a second web feeding mechanism 210 and a second slit line formation mechanism 220 are deployed in the second web feeding line 203. The second web feeding mechanism 210 operates to feed the second web of optical laminate f2 from the roll R2 of the second web of optical laminate f2. The second web feeding line 203 comprises a second defect inspection mechanism 211, and the second slit line formation mechanism 220 is deployed on downstream side in the web feeding direction of the second defect inspection mechanism 211. The second slit line formation mechanism 220 forms slit lines in width-wise direction in the second web of optical laminate f2 fed from the roll R2 of the second web of optical laminate f2 at an in interval corresponding to a size of a long side of the liquid-crystal display panel w while leaving the second carrier film c2 uncut to form second absorptive polarizing film sheets s2 supported by the second carrier film c2 between two respective ones of adjacent slit lines in a conveying direction.

A second conveying mechanism 230 and a second peeling mechanism 240 are deployed on the downstream side in the conveying direction of the second slit line formation mechanism 220. The second conveying mechanism 230 operates to convey the second web of optical laminate f2 to the second lamination station 201. The second peeling mechanism 240 operates to peel the second absorptive polarizing film sheets s2 from the second carrier film c2 in the second lamination station 201.

The second web feeding line 203 is preferably, but not limited to, deployed at or above a height of a conveying table of the second lamination station 201 which configures the second channel 20 because the second absorptive polarizing film sheets s2 are laminated to a viewing side of the liquid-crystal display panel w which a color filter CF is arranged thereon. In the second web feeding line 203, the second web feeding mechanism 210 for feeding the second web of optical laminate f2 from the roll R2, the second slit line formation mechanism 220, the second conveying mechanism 230 and the second peeling mechanism 240 are preferably arranged along a straight channel. In addition, a second removing mechanism 250 which operates in coordination with the second peeling mechanism 240 may be deployed in the second peeling mechanism 240. The second removing mechanism 250 operates to remove second defective sheets d2 supported by the second carrier film c2 without laminating to the first intermediate laminate 100.

At the second lamination station 201, the first intermediate laminate 100 conveyed thereto is laminated to respective one of the second absorptive polarizing film sheets s2 peeled from the second carrier film c2 by the second laminating means 204. The second absorptive polarizing film sheets s2 is laminated to a top surface on a viewing side of the liquid-crystal display panel w to form a second intermediate laminate 200 described in the above.

The second intermediate laminate 200 is, but not limited to, what the second absorptive polarizing film sheets s2 are laminated to a viewing side of the liquid-crystal display panel w which the color filter CF arranged thereon in an orientation of arrangement of the absorptive polarizing film P2, such that an absorption axis of the second absorptive polarizing film sheets s2 is orthogonal to a short side of the liquid-crystal display panel w, thereby an absorption axis of the absorptive polarizing film P1 included in the first absorptive polarizing film sheets s1 laminated on the non-viewing side and an absorption axis of the absorptive polarizing film P2 included in the second absorptive polarizing film sheets s2 laminated on the viewing side are orthogonal to each other.

In the liquid-crystal display panel w configuring the second intermediate laminate 200, since the absorption axis of the first absorptive polarizing film sheets s1 laminated on the non-viewing side and the absorption axis of the absorptive polarizing film P2 included in the second absorptive polarizing film sheets s2 laminated on the viewing side are orthogonal to each other, it is preferable to, but not limited to, further provide a rotating means 33 for rotating the first intermediate laminate 100 by 90° in a line for conveying the first intermediate laminate 100 from the first lamination station 101 via the first channel-to-channel transfer part 30 to the second lamination station 201, so that the orientation of the first intermediate laminate 100 is one required for forming the second intermediate laminate 200 at the second lamination station 201.

The second intermediate laminate 200 is further conveyed via a second intermediate conveying line 302 to a third lamination station 301 in the second channel 20. In the third lamination station 301, reflective polarizing film sheets s3 cut out from a third web of optical laminate f3 comprising a reflective polarizing film RP, i.e. a long web of optical film laminate PL1-2 shown in FIG. 3, are laminated to a surface, opposite to the liquid-crystal display panel w, of an absorptive polarizing film included in the first absorptive polarizing film sheets s1 laminated to the non-viewing side of the liquid-crystal display panel w configuring the second intermediate laminate 200.

It is preferable that the surface, opposite to the liquid-crystal display panel w, of an absorptive polarizing film included in the first absorptive polarizing film sheets s1 laminated to the non-viewing side of the liquid-crystal display panel w is protected with a surface protection film PF1-1. When the first absorptive polarizing film sheets s1 has such configuration, the surface protection film PF1-1 is peeled together with an adhesive layer from the absorptive polarizing film P2 before reflective polarizing film sheets s3 are laminated thereto. It is preferable that a peeling means 34 for peeling the surface protection film PF1-1 together with the adhesive layer is provided in the second channel 20 to allow for continuously laminating the reflective polarizing film sheets s3 comprising the reflective polarizing film RP, as is clear from FIG. 3.

As is clear from FIG. 5 and FIG. 7, the second channel 20 comprises a third lamination station 301 on a side of the second lamination station 201 opposite to the second web feeding line 203. In the third lamination station 301, the second intermediate laminate 200 and the reflective polarizing film sheets s3 are laminated to each other by the third laminating means 304 to form laminate products 300. The second channel 20 further has, between the second lamination station 201 and the third lamination station 301, a second intermediate conveying line 302 for conveying the second intermediate laminate 200 from the second lamination station 201 to the third lamination station 301, and a third web feeding line 303 configured to feed a third web of optical laminate f3 to the third lamination station 301 in a direction opposite to the second lamination station 201.

As shown in FIG. 7, the third web feeding mechanism 310 and the third slit line formation mechanism 320 are arranged in this order with respect to a feeding direction of the third web of optical laminate f3 in the third web feeding line 303. The third web feeding mechanism 310 operates to feed a third web of optical laminate f3 from a roll R3 of the third web of optical laminate f3 comprising a reflective polarizing film RP to be laminated to a non-viewing side of the liquid-crystal display panel w configuring the second intermediate laminate 200. The third slit line formation mechanism 320 forms slit lines in width-wise direction in the third web of optical laminate f3 fed from the roll R3 of the third web of optical laminate f3 at an in interval corresponding to a size of a long side of the liquid-crystal display panel w while leaving the third carrier film c3 uncut to form reflective polarizing film sheets s3 supported by the third carrier film c3 between two respective ones of adjacent slit lines in a conveying direction.

A third conveying mechanism 330 for conveying the third web of optical laminate f3 having the third carrier film c3 to the third lamination station 301 and a third peeling mechanism 340 for peeling the reflective polarizing film sheets s3 from the third carrier film c3 in the third lamination station 301 are deployed on the downstream side in the conveying direction of the third slit line formation mechanism 320.

The third web feeding line 303 is preferably, but not limited to, deployed at or below a height of a conveying table of the third lamination station 301 which configures the second channel 20 because the reflective polarizing film sheets s3 are laminated to a non-viewing side of the liquid-crystal display panel w which a thin-film transistor substrate T is arranged thereon. In the third web feeding line 303, the third web feeding mechanism 310 for feeding the third web of optical laminate f3 from the roll R3, the third slit line formation mechanism 320, the third conveying mechanism 330 and the third peeling mechanism 340 are arranged along the second channel 20.

The reflective polarizing film sheets s3 are peeled from the third carrier film c3 and then overlappingly laminated to a surface, opposite to the liquid-crystal display panel w, of the first absorptive polarizing film sheets s1 laminated to the non-viewing side of the liquid-crystal display panel w by the third laminating means 304 in the third lamination station 301 to form laminate products 300.

In the laminate products 300, the first absorptive polarizing film sheets s1 and the reflective polarizing film sheets s3 are overlapplingly laminated on the non-viewing side of the liquid-crystal display panel w such that an absorption axis of the absorptive polarizing film P1 included in the first absorptive polarizing film sheets s1 and a reflection axis of the reflective polarizing film RP included in the reflective polarizing film sheets s3 are parallel to each other.

The laminate products 300 formed in the third lamination station 301 are then carried out from the lamination unit 1 via a product carry-out line 305. The laminate products 300 are preferably transferred toward the first channel 10, conveyed to a channel 50 configured along the first channel 10 to carry out products to a direction opposite to the first web feeding line 103 and carried out from the lamination unit 1.

As shown in FIG. 6 and FIG. 7, absorptive polarizing films P1, P2 in the first and the second web of optical laminate f1, f2 are what already inspected for presence of any defect or defects. When the first and the second web of optical laminate f1, f2 comprising the absorptive polarizing films P1, P2 are fed from the rolls R1, R2 and the first and the second absorptive polarizing film sheets s1, s2 are formed thereon in a state supported on the first and the second carrier films c1, c2, the first and the second slit line formation mechanism 120, 220 forms slit lines in the first and the second web of optical laminate f1, f2 while leaving the first and the second carrier film c1, c2 uncut, based on a position a defect at a position in an upstream side in the conveying direction of the first and the second web of optical laminate f1, f2 with a predetermined distance from the defect, thereby the first and the second defective sheet d1, d2 are formed between another slit line and a slit line immediately before the another slit line. For this, the removing mechanism 150, 250 including the first and the second removing means for removing the first and the second defective sheet d1, d2 without laminating to the liquid-crystal display panel 2 may further be provided in the lamination unit 1.

Types of mechanism disclosed in the specification and the drawings of Japanese Patent No. 4,551,477B (Patent Document 11) or Japanese Patent No. 4,377,961B (Patent Document 12) may be adopted to the first removing mechanism 150 shown in FIG. 6. Type of mechanism disclosed in the specification and the drawings of Japanese Patent No. 4,361, 103B (Patent Document 13) may be adopted to the second removing mechanism 250 shown in FIG. 7.

As previously described, it is preferable to use the first and the second web of optical laminate f1, f2 comprising the absorptive polarizing film P1, P2 already inspected for presence of any defect. Since a defect such as a scratch or a dent inherent in the absorptive polarizing film gives no small influence to an image formed on the liquid-crystal display device, the absorptive polarizing film containing such defect should be removed normally before laminating to the liquid-crystal display panel w. On the other hand, since a function of the reflective polarizing film RP is to improve efficiency of use of light by repeated transmissions and reflections, influence of a defect such as a scratch or a dent inherent in the reflective polarizing film RP to image formation is small. Thus, the third web of optical laminate f3 comprising a reflective polarizing film RP not yet inspected for presence of any defect may be used.

Figure 17:
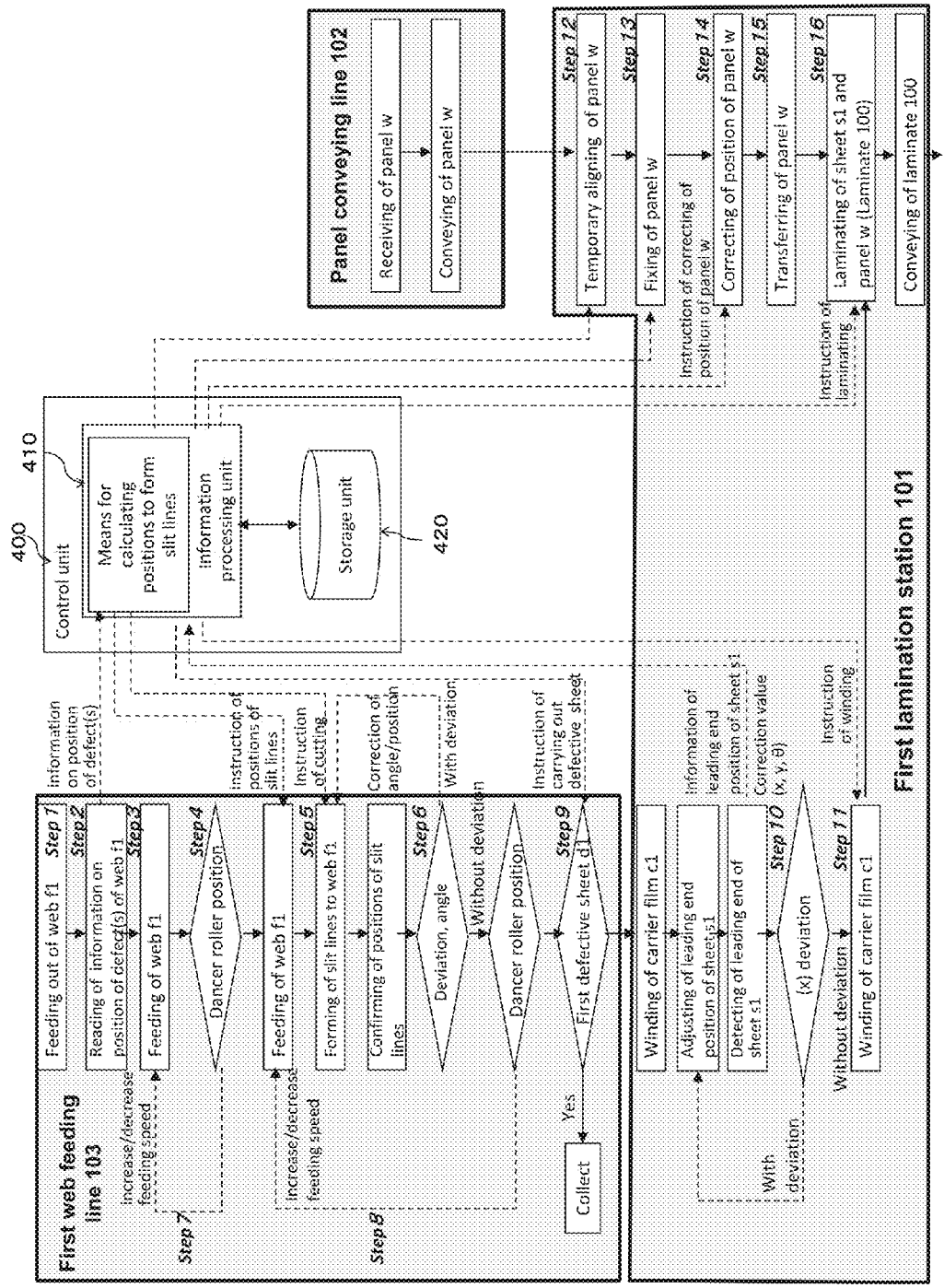
FIG. 17 shows a control flow of a step of separating a first absorptive polarizing film sheet of a first web of optical laminate and a first defective sheet and a step of laminating a separated first absorptive polarizing film sheet to a non-viewing side surface of a liquid-crystal display panel in a lamination unit used in one embodiment of the present invention shown in FIG. 5, FIG. 8, FIG. 11 and FIG. 14.
Figure 18:
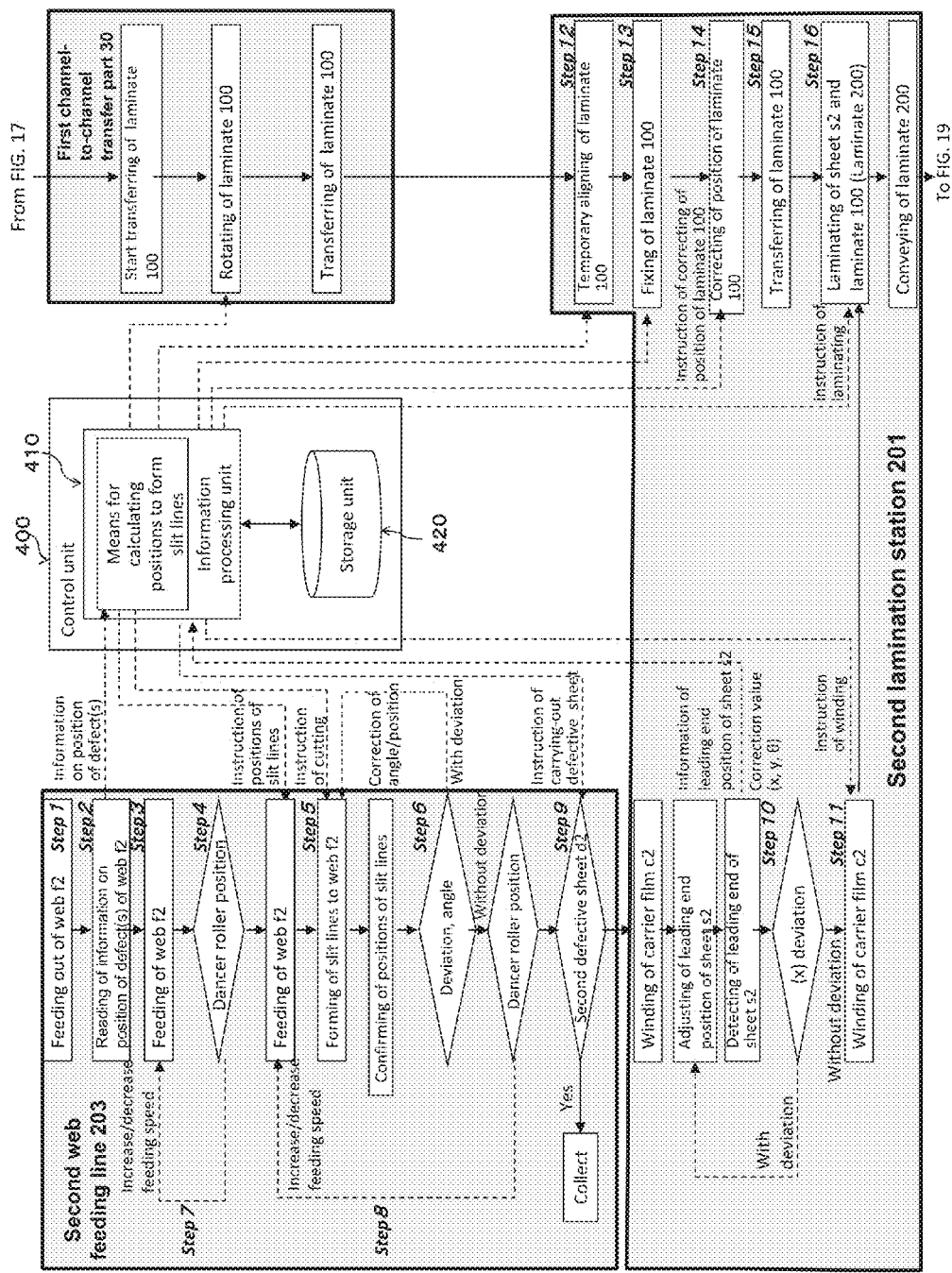
FIG. 18 shows a control flow of a step of separating a second absorptive polarizing film sheet of a second web of optical laminate and a second defective sheet and a step of laminating a separated second absorptive polarizing film sheet to a viewing side surface of a liquid-crystal display panel in a lamination unit used in one embodiment of the present invention shown in FIG. 5, FIG. 8, FIG. 11 and FIG. 14.

FIG. 17 and FIG. 18 show control flows of a step of separating the first and the second absorptive polarizing film sheets s1, s2 of the first and the second web of optical laminate f1, f2 to be laminated to respective surface of the liquid-crystal display panel w and the first and the second defective sheets d1, d2 to be removed without laminating to the liquid-crystal display panel w, and a step of sequentially laminating the first and the second absorptive polarizing film sheets s1, s2 to the liquid-crystal display panel w. As shown in FIG. 5 to FIG. 7 and FIG. 17 to FIG. 19, operation of all of elements configuring the lamination unit 1 for implementing the present invention is controlled by an information processing unit 410 included in a control unit 400.

Various data used for controlling operations of components configuring the lamination unit 1, such as, for example, information on position of a defect or defects inherent in the first and the second web of optical laminate f1, f2 and/or deviation of a leading end of the first, the second or the third web of optical laminate f1, f2, f3, is stored in a storage unit 420 included in the control unit 400 and is written into/read out from the storage unit 420 according to necessity. Operation of the components configuring the lamination unit 1 is controlled by the information processing unit 410 and data is stored in the storage unit 420 in all embodiments of the present invention.

In the step of separating the first absorptive polarizing film sheets s1 and the first defective sheets d1 configuring the first web of optical laminate f1, the inspected first web of optical laminate f1 given with information on position of a defect or defects is fed to the first web feeding line 103 in step 1. Then, the information on position of a defect or defects is read in step 2. Positions of slit lines for the first absorptive polarizing film sheets s1 and positions of slit lines for the first defective sheets d1 are instructed in step 5. Positions of slit lines are adjusted in step 6 to step 8. The first slit line formation mechanism 120 shown in FIG. 6 starts operation based on the instructions. Each of the sheets of the first web of optical laminate f1 is judged to be a first absorptive polarizing film sheet s1 or a first defective sheet d1 in step 9, and when a sheet is judged to be a first defective sheet d1, the first removing mechanism 150 operates to peel the first defective sheet d1 from a first carrier film c1 and collects the peeled first defective sheet d1 without laminating to the liquid-crystal display panel w. On the other hand, when a sheet is judged to be a first absorptive polarizing film sheet s1 in step 9, the first web of optical laminate f1 is further fed to and conveyed to the first lamination station 101. The first absorptive polarizing film sheets s1 in a state supported on the first carrier film c1 are peeled from the first carrier film c1 by operating the first peeling mechanism 140 and the first carrier film c1 is accordingly wound in the first lamination station 101 in step 11. The peeled first absorptive polarizing film sheets s1 are position-adjusted with respective ones of the liquid-crystal display panels w conveyed via the panel conveying line 102 to the first lamination station 101 and then laminated to a surface of the non-viewing side of each of the liquid-crystal display panels w from underside thereof in step 16.

In the step of separating the second absorptive polarizing film sheets s2 and the second defective sheets d2 configuring the second web of optical laminate f2, the inspected second web of optical laminate f2 given with information on position of a defect or defects is fed to the second web feeding line 203 in step 1. Then, similarly as in the above described step, the information on position of each of defects is read in step 2. Positions of slit lines for the second absorptive polarizing film sheets s2 and positions of slit lines for the second defective sheets d2 are instructed in step 5. Positions of slit lines are adjusted in step 6 to step 8. The second slit line formation mechanism 220 shown in FIG. 7 starts operation based on the instructions. Each of the sheets of the second web of optical laminate f2 is judged to be a second absorptive polarizing film sheet s2 or a second defective sheet d2 in step 9, and when a sheet is judged to be a second defective sheet d2, the second removing mechanism 250 operates to peel the second defective sheet d2 from a second carrier film c2 and collects the peeled second defective sheet d2 without laminating to the liquid-crystal display panel w. On the other hand, when a sheet is judged to be a second absorptive polarizing film sheet s2 in step 9, the second web of optical laminate f2 is further fed and conveyed to the second lamination station 201. The second absorptive polarizing film sheets s2 are position-adjusted in the second lamination station with respective ones of the first intermediate laminates 100 which are rotated by 90° at the first channel-to-channel transfer part 30 and conveyed to the second lamination station 201 and then laminated to a surface of the viewing side of each of the liquid-crystal display panels w from topside thereof in step 16.

Figure 19:
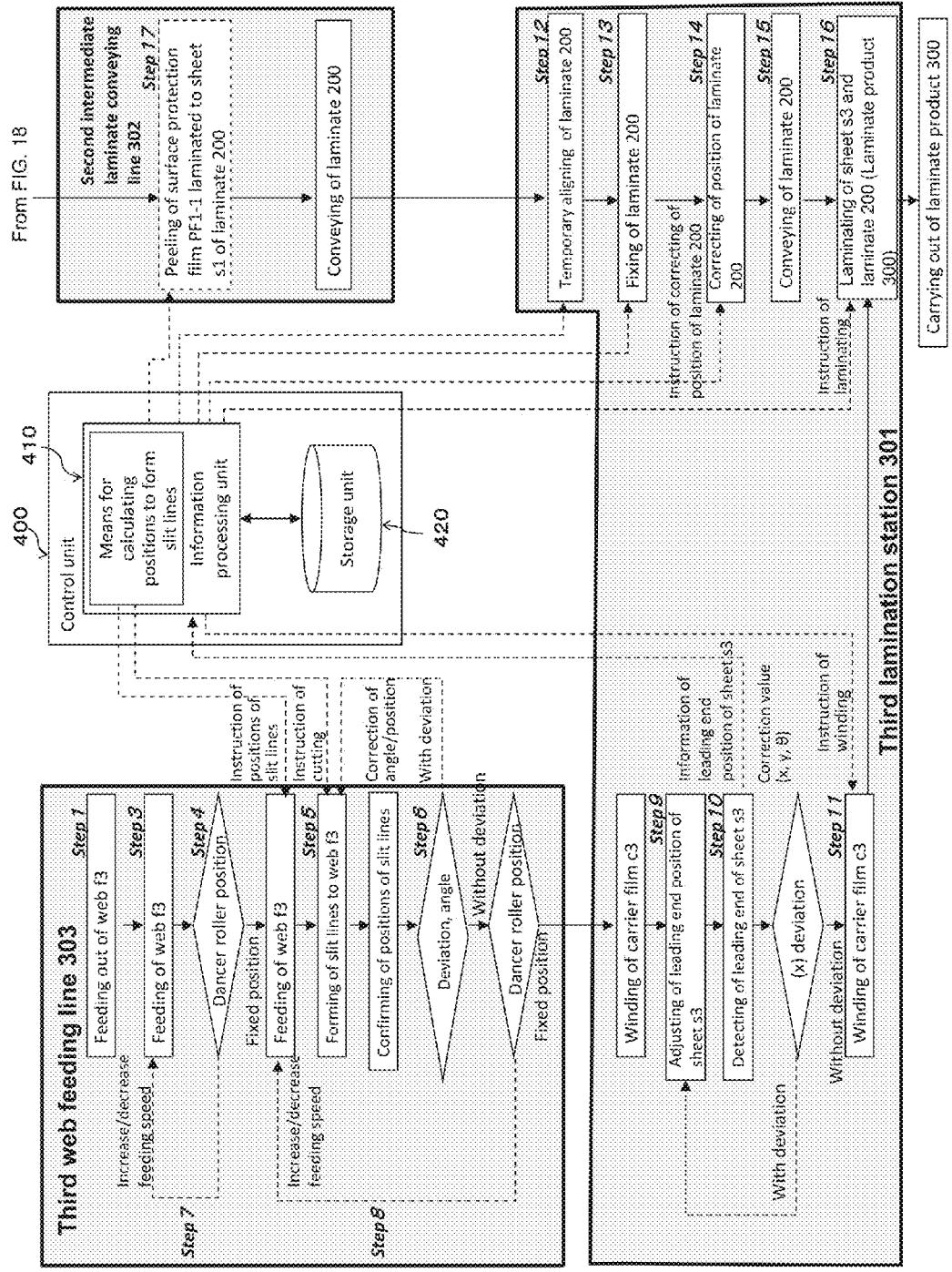
FIG. 19 shows a control flow of a step of laminating reflective polarizing film sheets of a third web of optical laminate to an exposed surface of first absorptive polarizing film sheets laminated to a non-viewing side of liquid-crystal display panels in a lamination unit used in one embodiment of the present invention shown in FIG. 5, FIG. 8, FIG. 11 and FIG. 14.

FIG. 19 shows a control flow of a step of laminating reflective polarizing film sheets s3 configuring a third web optical laminate f3 to a second intermediate laminate 200. As shown in FIG. 5 and FIG. 7, the first and the second absorptive polarizing film sheets s1, s2 are sequentially laminated, respectively, to surfaces of a non-viewing side and a viewing side of the liquid-crystal display panels w of the second intermediate laminates 200 which are then conveyed from the second lamination station 201 via a second intermediate laminate conveying line 203 to a third lamination station 301. When a surface protection film is laminated to each of absorptive polarizing films P1, P2 and a reflective polarizing film RP included in, respectively, the first, the second and the third web of optical laminate f1, f2, f3, a step of laminating the reflective polarizing film sheets s3 to the second intermediate laminate 200 requires a step of peeling a surface protection film PF1-1 together with an adhesive layer A1-1 from the first absorptive polarizing film sheets s1 laminated to the non-viewing side of the liquid-crystal display panels w with a peeling means 34 in the second intermediate conveying line 302, i.e. a step 17, as shown in FIG. 19.

As shown FIG. 19, the third web of optical laminate f3 is fed in a third web feeding line 303 in step 1. Feed length of the third web of optical laminate f3 is adjusted and positions of slit lines for reflective polarizing film sheets s3 are then instructed in step 3 and step 4. A third slit line formation mechanism 320 shown in FIG. 7 starts operation based on the instructions in step 5. The third slit line formation mechanism 320 is operated to confirm positions of slit lines formed in the third carrier film c3 and the third web of optical laminate f3 is conveyed to the third lamination station 301 in step 6 to step 8. The reflective polarizing film sheets s3 are peeled from the third carrier film c3 in the third lamination station 301 in step 9 to step 11. The peeled reflective polarizing film sheets s3 are position-adjusted with the second intermediate laminate 200 conveyed via the second intermediate laminate conveying line 302 to the third lamination station 301 and then overlappingly laminated to an exposed surface of respective ones of the first absorptive polarizing film sheets s1 on the non-viewing side of the liquid-crystal display panels w from underside thereof in step 16. What is produced from the above is a laminate product 300 manufactured through three stages of laminating steps.

Lamination unit 1 shown in each of FIG. 5 to FIG. 7 is an example where a first, a second and a third slit line formation mechanism 120, 220, 320 corresponding to a first, a second and a third roll R1, R2, R3 of a a first, a second and a third web of optical laminate f1, f2, f3 mounted to each of a first, a second and a third web feeding line 103, 203, 303 are provided therein.

Embodiment 2

Lamination unit 1 shown in each of FIG. 5 to FIG. 7 may also use a first, a second and a third roll R1', R2', R3' of a first, a second and a third web of optical laminate with slit lines f1', f2', f3' which slit lines are formed therein in manufacturing steps of each of the rolls, as a unit 1 for implementing other embodiments of the present invention.

In the lamination unit 1 for implementing other embodiments of the present invention, a first, a second and a third web feeding line 103, 203, 303 comprises a first, a second and a third web feeding mechanism 110, 210, 310; a first, a second and a third conveying mechanism 130, 230, 330; and a first, a second and a third peeling mechanism 140, 240, 340 for feeding a first, a second and a third web of optical laminate with slit lines f1', f2', f3'.

The first web feeding mechanism 110 operates to feed a first web of optical laminate with slit lines f1' from a roll R1' of the first web of optical laminate with slit lines f1'. The first conveying mechanism 130 operates to convey the first web of optical laminate with slit lines f1' fed from the roll R1' of the first web of optical laminate with slit lines f1' to a first lamination station 101. The first peeling mechanism 140 operates to peel first absorptive polarizing film sheets s1 in a state supported on a first carrier film c1 from the first carrier film c1 in the first lamination station 101. The first absorptive polarizing film sheets s1 are peeled from the first carrier film c1 and then laminated to a surface on the non-viewing side of the liquid-crystal display panels w from underside thereof by a first laminating means 104 in the first lamination station 101 to form first intermediate laminates 100.

The second web feeding mechanism 210 operates to feed a second web of optical laminate with slit lines f2' from a roll R2' of the second web of optical laminate with slit lines f2'. The second conveying mechanism 230 operates to convey the second web of optical laminate with slit lines f2' fed from the roll R2' of the second web of optical laminate with slit lines f2' to a second lamination station 201. The second peeling mechanism 240 operates to peel second absorptive polarizing film sheets s2 in a state supported on a second carrier film c2 from the second carrier film c2 in the second lamination station 201. The second absorptive polarizing film sheets s2 are peeled from the second carrier film c2 and then laminated to a surface on the viewing side of the liquid-crystal display panels w from topside thereof by a second laminating means 204 in the second lamination station 201 to form second intermediate laminates 200.

The third web feeding mechanism 310 operates to feed a third web of optical laminate with slit lines f3' from a roll R3' of the third web of optical laminate with slit lines f3'. The third conveying mechanism 330 operates to convey the third web of optical laminate with slit lines f3' fed from the roll R3' of the third web of optical laminate with slit lines f3' to a third lamination station 301. The third peeling mechanism 340 operates to peel reflective polarizing film sheets s3 in a state supported on a third carrier film c3 from the third carrier film c3 in the third lamination station 301. The reflective polarizing film sheets s3 are peeled from the third carrier film c3 and then overlappingly laminated to a surface on the non-viewing side of the liquid-crystal display panels w from underside thereof by a third laminating means 304 in the third lamination station 301 to form third intermediate laminates 300.

As will be later described in detail, it is preferable to provide a first, a second and a third slit line position-reading mechanism 120', 220', 320' for reading each of positions of slit lines in the first, the second and the third web of optical laminate with slit lines f1', f2', f3' in places corresponding to a first, a second and a third slit line formation mechanism 120, 220, 320 arranged in the lamination unit 1 in which the first, the second and the third web of optical laminate f1, f2, f3 are used.

Optical film laminates PL1-1, PL2 comprising, respectively, an absorptive polarizing film P1, P2 shown in FIG. 3 may be used in this embodiment of the present invention. However, a first and a second web of optical laminate with slit lines f1', f2' shown in FIG. 4, in which slit lines are formed in manufacturing step of the rolls R1', R2' based on information on inspected positions of defects and first and second absorptive polarizing film sheets s1, s2 and first and second defective sheets d1, d2 are formed between respective ones of adjacent slit lines in a state supported on a first and a second carrier film c1, c2, are used as the first and the second roll R1', R2' used in the lamination unit 1. In this regard, it is different from a case where a first and a second web of optical laminate f1, f2 are used. A third web of optical laminate with slit lines f3', in which slit lines are formed in manufacturing step of the rolls R3' and reflective polarizing film sheets s3 are formed between respective ones of adjacent slit lines in a state supported on a third carrier film c3, is used as the third roll R3' used in the lamination unit 1. This becomes an optical film laminate PL1-2 comprising a reflective polarizing film RP.

For manufacturing rolls of a first, a second and a third web of optical laminate with slit lines separated into absorptive polarizing film sheets without any defects and defective sheets with a defect or defects formed to a size of a liquid-crystal display panel w by respective ones of adjacent slit lines formed in width-wise direction shown in FIG. 4, a method and an apparatus for manufacturing disclosed in, for example, the specification and the drawings of Japanese Patent No. 4,377,965B (Patent Document 14) may be adopted.

Figure 20:
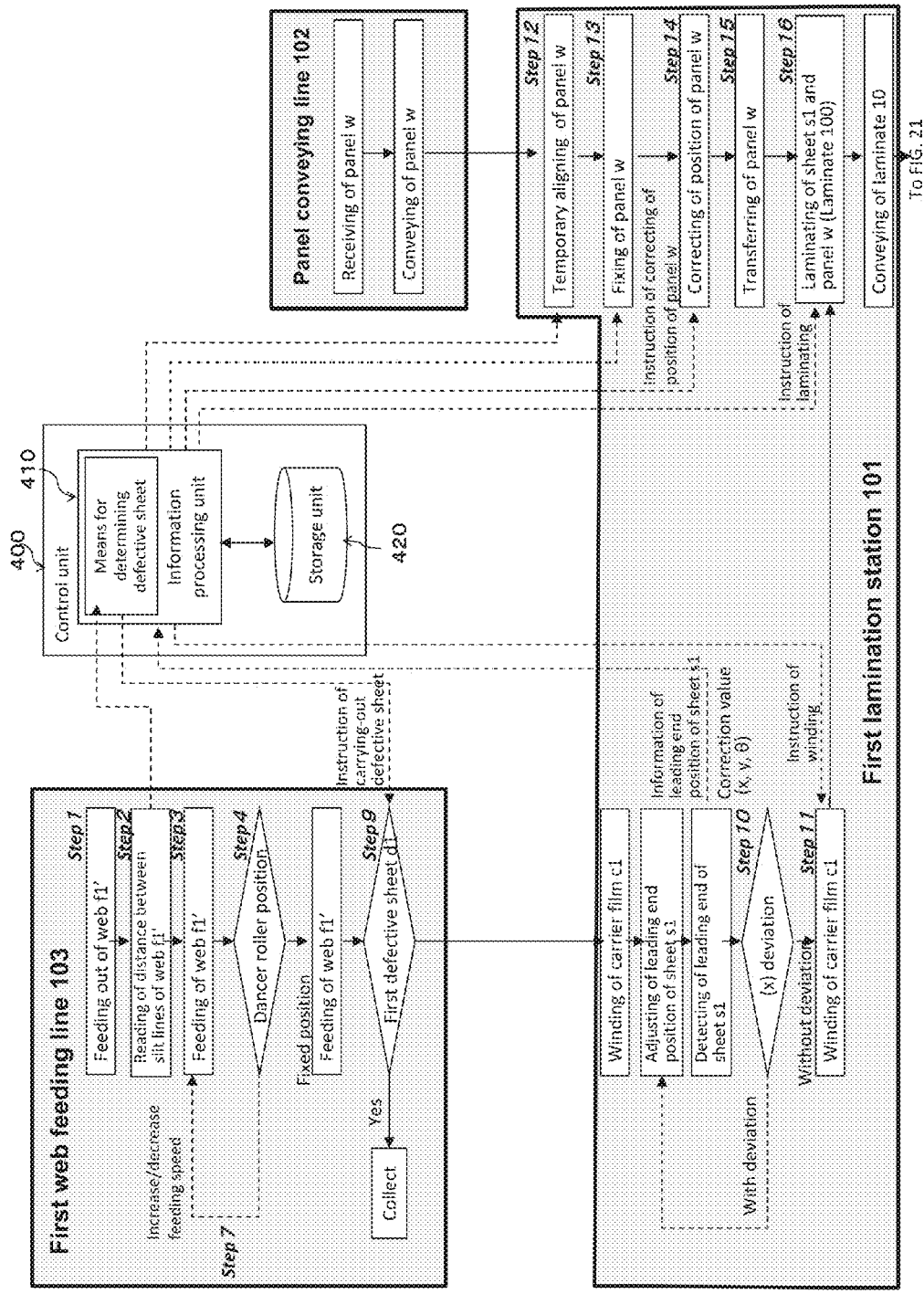
FIG. 20 shows a control flow of a step of inspecting first absorptive polarizing film sheets of a first web of optical laminate with slit lines for a first defective sheet and a step of laminating inspected first absorptive polarizing film sheets to a non-viewing side surface of liquid-crystal display panels in a lamination unit used in one embodiment of the present invention shown in FIG. 5, FIG. 8, FIG. 11 and FIG. 14.
Figure 21:
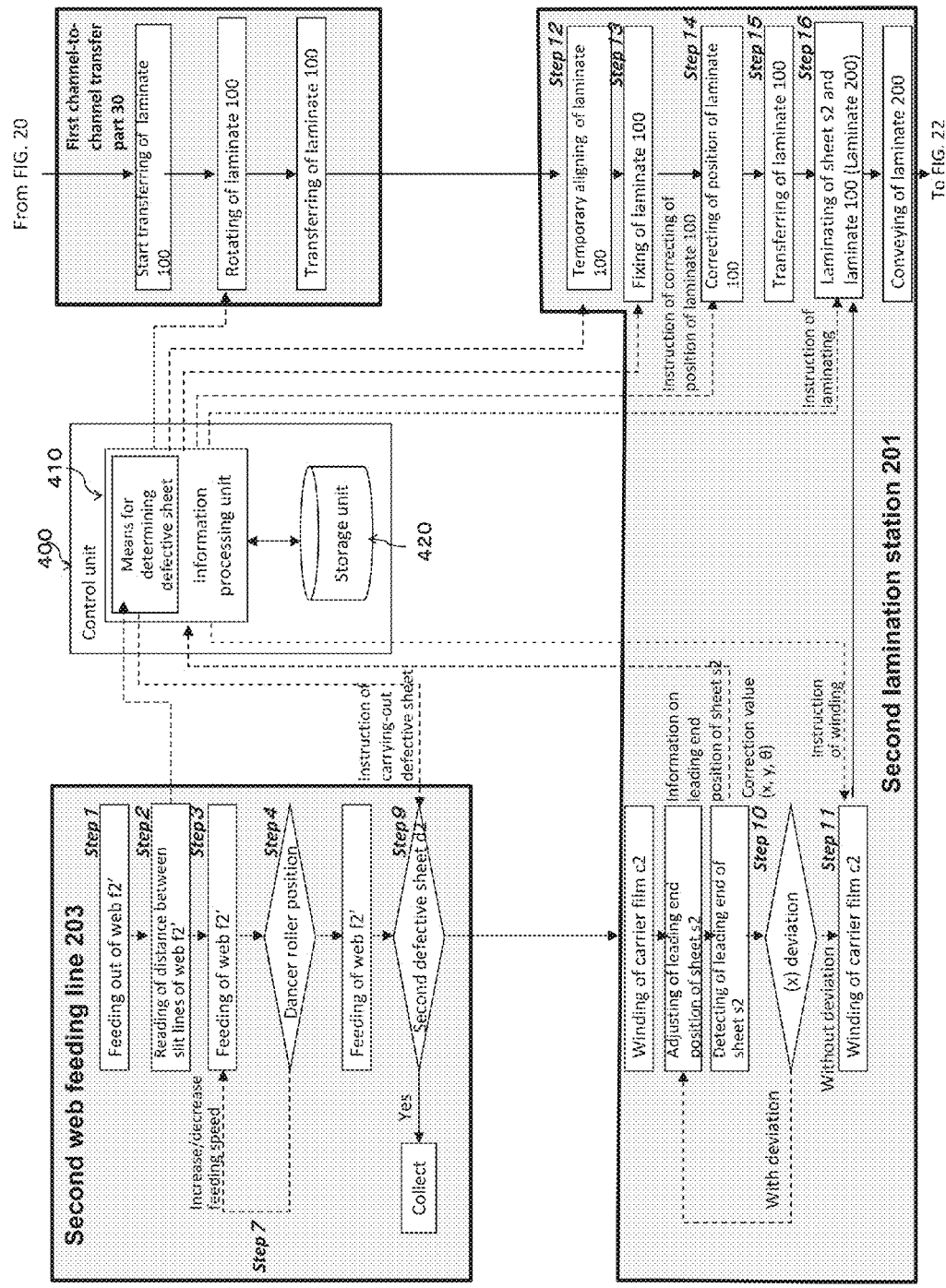
FIG. 21 shows a control flow of a step of inspecting second absorptive polarizing film sheets of a first web of optical laminate with slit lines for a second defective sheet and a step of laminating inspected second absorptive polarizing film sheet to a non-viewing side surface of liquid-crystal display panels in a lamination unit used in one embodiment of the present invention shown in FIG. 5, FIG. 8, FIG. 11 and FIG. 14.

FIG. 20 and FIG. 21 show control flows of a step of separating the first and the second absorptive polarizing film sheets s1, s2 and the first and the second defective sheets d1, d2 in a state supported on the first and the second carrier film c1, c2 between respective ones of adjacent slit lines in the first and the second web of optical laminate with slit lines f1', f2' in which the slit lines are formed leaving only the first and the second carrier film c1, c2 uncut, and a step of sequentially laminating the first and the second absorptive polarizing film sheets s1, s2 to the liquid-crystal display panels w in the manufacturing step of the first and the second roll R1', R2'. As shown in FIG. 5 to FIG. 7 and FIG. 20 to FIG. 22, operation of all of elements configuring the lamination unit 1 for implementing the present invention is controlled by an information processing unit 410 included in a control unit 400.

Various data used for controlling operations of components configuring the lamination unit 1, such as, for example, information on positions of slit lines in the first, the second and the third web of optical laminate with slit lines f1', f2', f3' and/or distance of longitudinal intervals between adjacent slit lines in the first, the second and the third web of optical laminate with slit lines f1', f2', f3', i.e. data for separating the first and the second absorptive polarizing film sheets s1, s2 and the reflective polarizing film sheets s3 and the first and the second defective sheets d1, d2, is stored in a storage unit 420 included in the control unit 400 and is written into/read out from the storage unit 420 according to necessity. Controlling operations of the components configuring the lamination unit 1 by the information processing unit 410 and storing data by the storage unit 420 are similarly done in all embodiments of the present invention.

In s step of separating first absorptive polarizing film sheets s1 and first defective sheets d1 configuring a first web of optical laminate with slit lines f1', the first web of optical laminate with slit lines f1' given with information on positions of slit lines and on distance of longitudinal intervals between adjacent slit lines is fed to a first web feeding line 103 in step 1. Then, the information on distance of longitudinal intervals, i.e. distance corresponding to a short side of a liquid-crystal display panels w is read in step 2.

Feeding length and speed of the first web of optical laminate with slit lines f1' are adjusted in step 3, step 4 and step 7. The slit line position-reading mechanism 120' shown in FIG. 6 operates based on instructions of the feeding length and speed. Each of sheets of the first web of optical laminate with slit lines f1' is judged to be a first absorptive polarizing film sheet s1 or a first defective sheet d1 in step 9, and when a sheet is judged to be a first defective sheet d1, a first removing mechanism 150 operates to peel the first defective sheet d1 from a first carrier film c1 and collects the peeled first defective sheet d1 without laminating to the liquid-crystal display panel w. On the other hand, when a sheet is judged to be a first absorptive polarizing film sheet s1 in step 9, the first web of optical laminate with slit lines f1' is further fed and conveyed to the first lamination station 101.

The first absorptive polarizing film sheets s1 in a state supported on the first carrier film c1 are peeled from the first carrier film c1 by operating a first peeling mechanism 140 and the first carrier film c1 is accordingly wound in the first lamination station 101 in step 11. The peeled first absorptive polarizing film sheets s1 are position-adjusted with respective ones of liquid-crystal display panels w conveyed via a panel conveying line 102 to the first lamination station 101 and then laminated to a surface of the non-viewing side of each of the liquid-crystal display panels w from underside thereof in step 16.

In the step of separating second absorptive polarizing film sheets s2 and second defective sheets d2 configuring a second web of optical laminate with slit lines f2', the second web of optical laminate with slit lines f2' is fed to a second web feeding line 203 in step 1, similarly as in the previously described step. Then, information on distance of each of longitudinal intervals, i.e. distance corresponding to a long side of a liquid-crystal display panels w is read in step 2. Feeding length and speed of the second web of optical laminate with slit lines f2' are adjusted in step 3, step 4 and step 7, similarly as in the previously described steps. A slit line position-reading mechanism 220' shown in FIG. 6 operates based on instructions of the feeding length and speed.

Each of sheets of the second web of optical laminate with slit lines f2' is judged to be a second absorptive polarizing film sheet s2 or a second defective sheet d2 in step 9, and when a sheet is judged to be a second defective sheet d2, a second removing mechanism 250 operates to peel the second defective sheet d2 from a second carrier film c2 and collects the peeled second defective sheet d2 without laminating to the liquid-crystal display panel w. On the other hand, when a sheet is judged to be a second absorptive polarizing film sheet s2 in step 9, the second web of optical laminate with slit lines f2' is further fed and conveyed to a second lamination station 101.

The second absorptive polarizing film sheets s2 in a state supported on the second carrier film c2 are peeled from the second carrier film c2 by operating a second peeling mechanism 240 and the second carrier film c2 is accordingly wound in the second lamination station 201 in step 11. The peeled second absorptive polarizing film sheets s2 are position-adjusted with respective ones of first intermediate laminates 100 configuring liquid-crystal display panels w conveyed after being rotated by 90° in a first channel-to-channel transfer part 30 to the second lamination station 201 and then laminated to a surface of the viewing side of each of the liquid-crystal display panels w from topside thereof in step 16.

Figure 22:
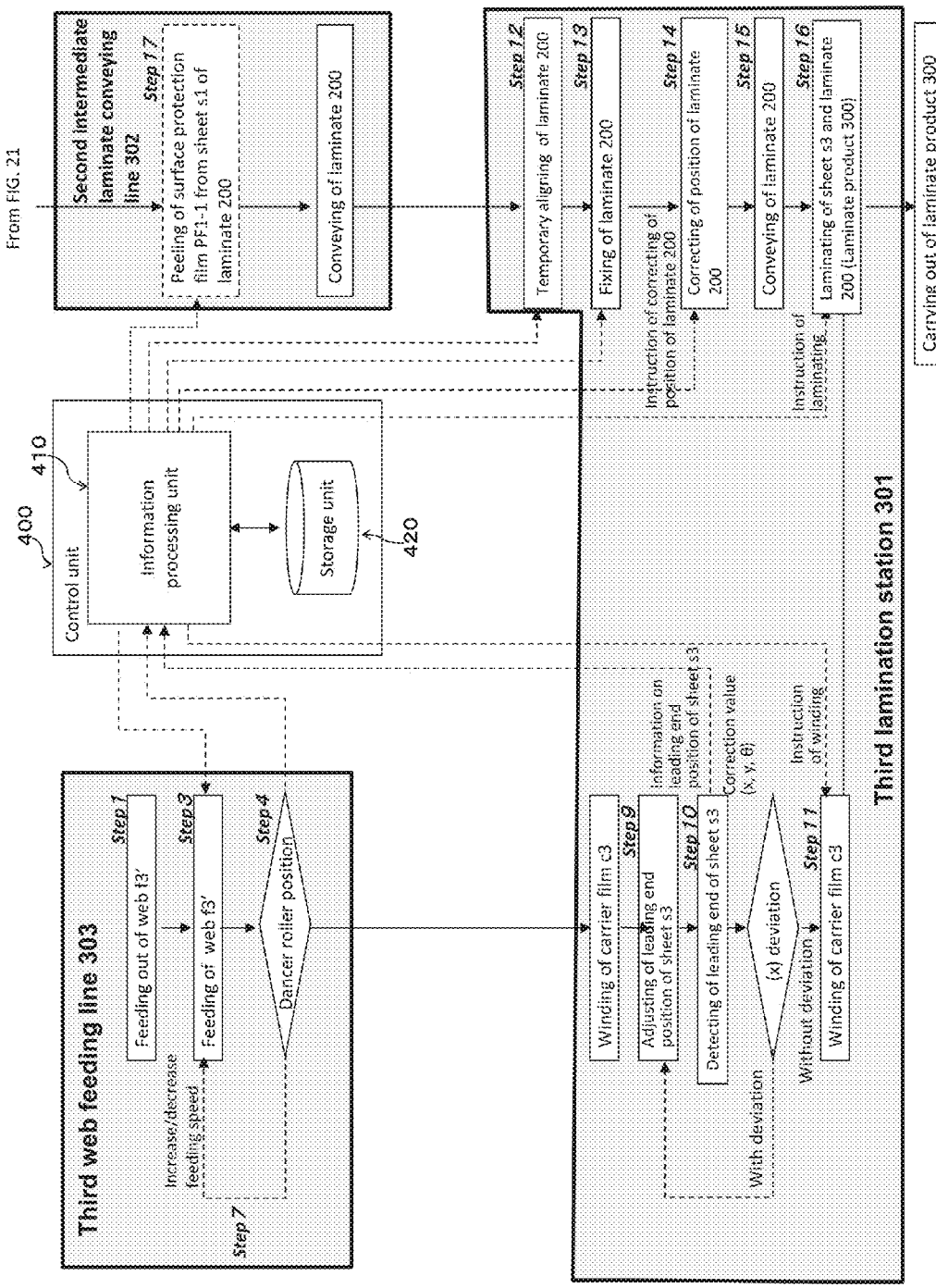
FIG. 22 shows a control flow of a step of laminating reflective polarizing film sheets of a third web of optical laminate with slit lines to an exposed surface of absorptive polarizing film sheets laminated to a non-viewing side of liquid-crystal display panels in a lamination unit used in one embodiment of the present invention shown in FIG. 5, FIG. 8, FIG. 11 and FIG. 14.

FIG. 22 shows a control flow of a step of laminating reflective polarizing film sheets of a third web of optical laminate with slit lines to second intermediate laminates 200. As shown in FIG. 5 and FIG. 7, the first and the second absorptive polarizing film sheets s1, s2 are sequentially laminated, respectively, to surfaces of a non-viewing side and a viewing side of the liquid-crystal display panels w of the second intermediate laminates 200 which are then conveyed from the second lamination station 201 via a second intermediate laminate conveying line 203 to a third lamination station 301. When a surface protection film is laminated to each of absorptive polarizing films P1, P2 and a reflective polarizing film RP included in, respectively, the first, the second and the third web of optical laminate with slit lines f1', f2', f3', a step of peeling a surface protection film PF1-1 together with an adhesive layer A1-1 with a peeling means 34 in the second intermediate conveying line 302, i.e. a step 17 shown in FIG. 22, is required as in a case where the first, the second and the third web of optical laminate f1, f2, f3 are used.

As shown FIG. 22, the third web of optical laminate with slit lines f3' is fed in a third web feeding line 303 in step 1. Feed length and speed of the third web of optical laminate with slit lines f3' are adjusted and thereby the third web of optical laminate with slit lines f3' is fed and then conveyed to the third lamination station 301 in step 3, step 4 and step 7. A third slit line position-reading mechanism 320' shown in FIG. 6 operates based on the instructions.

The reflective polarizing film sheets s3 in a state supported on a third carrier film c3 are peeled by operating a third peeling mechanism 340 from the third carrier film c3 and the third carrier film c3 is wound in the third lamination station 301 in step 11. The peeled reflective polarizing film sheets s3 are position-adjusted with the second intermediate laminates 200 conveyed via the second intermediate laminate conveying line 302 to the third lamination station 301 and then overlappingly laminated to an exposed surface of respective ones of the first absorptive polarizing film sheets s1 on the non-viewing side of the liquid-crystal display panels w from underside thereof in step 16. What is produced from the above is a laminate product 300 manufactured through continuously executed three stages of laminating steps.

As is clear from each of steps shown in FIG. 20 to FIG. 22, the first, the second and the third web of optical laminate with slit lines f1', f2', f3' are fed to the first, the second and the third web feeding line 103, 203, 303, respectively, based on information on distance of longitudinal interval of the first and the second absorptive polarizing film sheets s1, s2 and the reflective polarizing film sheets s3 in a state supported on each of the first, the second and the third carrier film c1, c2, c3 between respective ones of adjacent slit lines and on information on distance of longitudinal interval of the first and the second defective sheets d1, d2 similarly supported on the first and the second carrier film c1, c2.

Since the first, the second and the third web of optical laminate with slit lines f1', f2', f3' are used for the lamination unit 1, a first, a second, and a third slit line formation mechanism 120, 220, 320 are not needed. It is preferable that a first, a second, and a third slit line-position reading mechanism 120', 220', 320' are deployed to the lamination unit 1 in place of the slit line formation mechanism.

A first and a second removing mechanism 150, 250 deployed in the lamination unit 1 operates, as in a case where a first and a second web of optical laminate f1, f2 are used, to peel the first and the second defective sheets d1, d2 from the first and the second carrier film c1, c2, respectively, and to collect the peeled first and second defective sheets d1, d2 without laminating to the liquid-crystal display panels w. On the other hand, the first and the second absorptive polarizing film sheets s1, s2 peeled from respective one of the first and the second carrier film c1, c2 are position-adjusted with the liquid-crystal display panels w and then sequentially laminated, respectively, to the non-viewing side and the viewing side of the liquid-crystal display panels w.

As described in the above, in a lamination unit 1 used for Embodiments 1 and 1 of the present invention, a light and fragile liquid-crystal display panel w for middle-size or small-size liquid-crystal display device used for slate PCs for example, is conveyed via a panel conveying line 102 configuring a first channel 10 in an orientation which a long side thereof being orthogonal to a conveying direction to a first lamination station 101, and a first absorptive polarizing film sheet s1 is laminated to a non-viewing side of the liquid-crystal display panel w to form a first intermediate laminate 100.

The first intermediate laminate 100 is then rotated by 90° for only once in a first channel-to-channel transfer part 30 and conveyed in an orientation which a short side thereof being orthogonal to a conveying direction to a second lamination station 201 in a second channel 20. In the second lamination station 201, a second absorptive polarizing film sheet s2 is laminated to a viewing side of the liquid-crystal display panel w configuring the first intermediate laminate 100 such that absorption axes of absorptive polarizing films P1, P2 are orthogonal to each other, to form a second intermediate laminate 200.

The second intermediate laminate is further conveyed via a second intermediate laminate conveying line 302 in a second channel 20 to a third lamination station 301 in an orientation which a short side thereof being orthogonal to a conveying direction. In the third lamination station 301, a reflective polarizing film sheet s3 is overlappingly laminated to an exposed surface of the first absorptive polarizing film sheet s1 on the non-viewing side of the liquid-crystal display panel w configuring the second intermediate laminate 200 such that absorption axes of the absorptive polarizing films P1 and a reflective polarizing film RP are orthogonal to each other, to form a laminate product 300.

Other Lamination Units

As another lamination unit for implementing the present invention, a Roll-to-Panel type lamination unit which continuously executes three stages of steps of: appropriately performing an action to rotate a liquid-crystal display panel w by 90° which is conveyed in an orientation which a long side thereof being orthogonal to a conveying direction and a non-viewing side thereof facing downward and laminating a first absorptive polarizing film sheet s1 to a surface of the non-viewing side of the liquid-crystal display panel w from underside thereof without reversing the liquid-crystal display panel w upside down; reversing upside down and simultaneously rotating the liquid-crystal display panel w so that the liquid-crystal display panel w is oriented as a short side thereof being orthogonal to a conveying direction and a viewing side thereof facing downward and laminating a second absorptive polarizing film sheet s2 to a surface on a viewing side of the liquid-crystal display panel w from underside thereof; and again reversing the liquid-crystal display panel w upside down without changing orientation so that the non-viewing side of the liquid-crystal display panel w facing downward and overlappingly laminating a reflective polarizing film sheet s3 to an exposed surface of the first absorptive polarizing film sheet s1 on the liquid-crystal display panel w from underside thereof.

Figure 8:
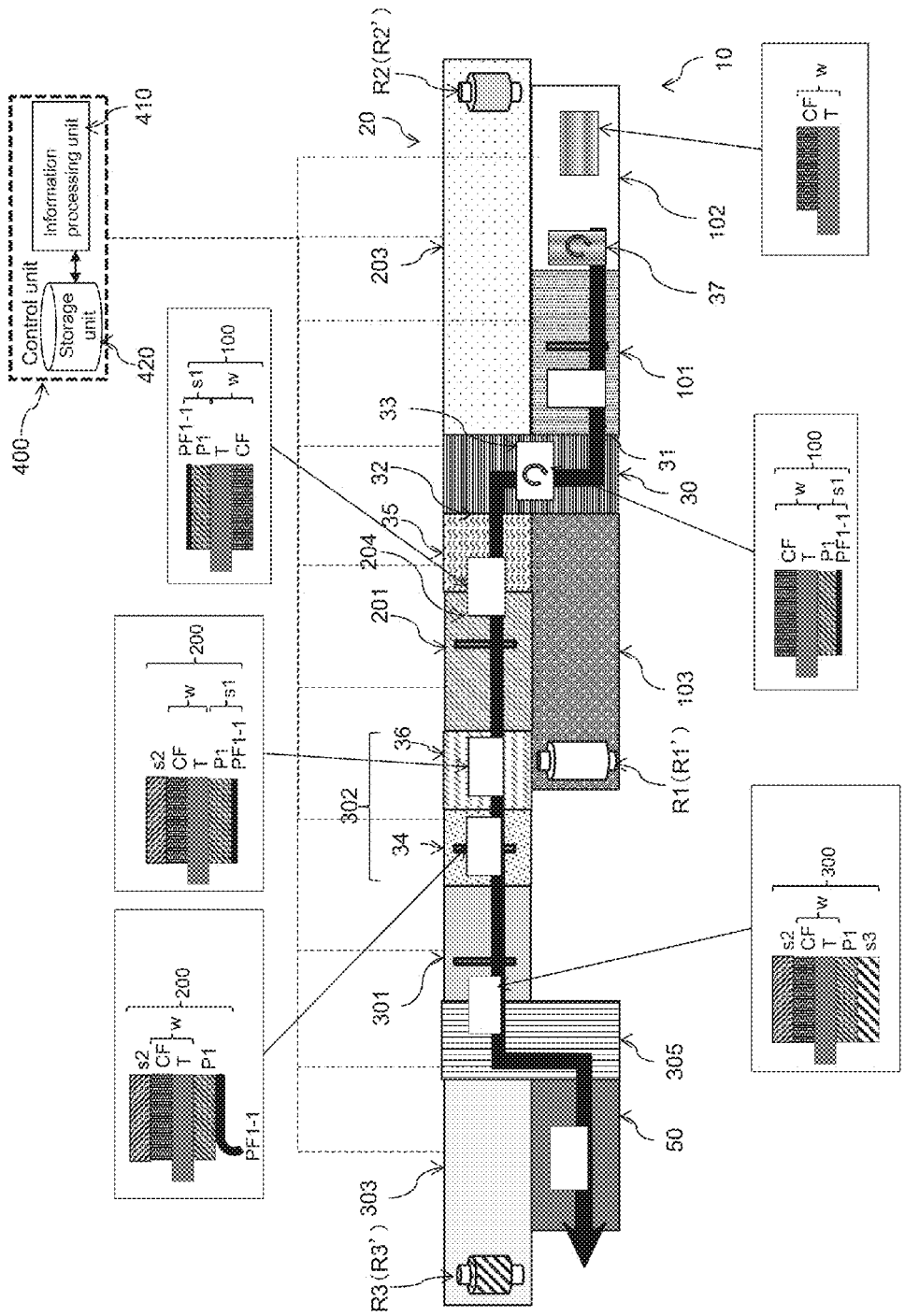
FIG. 8 is a plan view showing another lamination unit used in one or other embodiment of the present invention.
Figure 9:
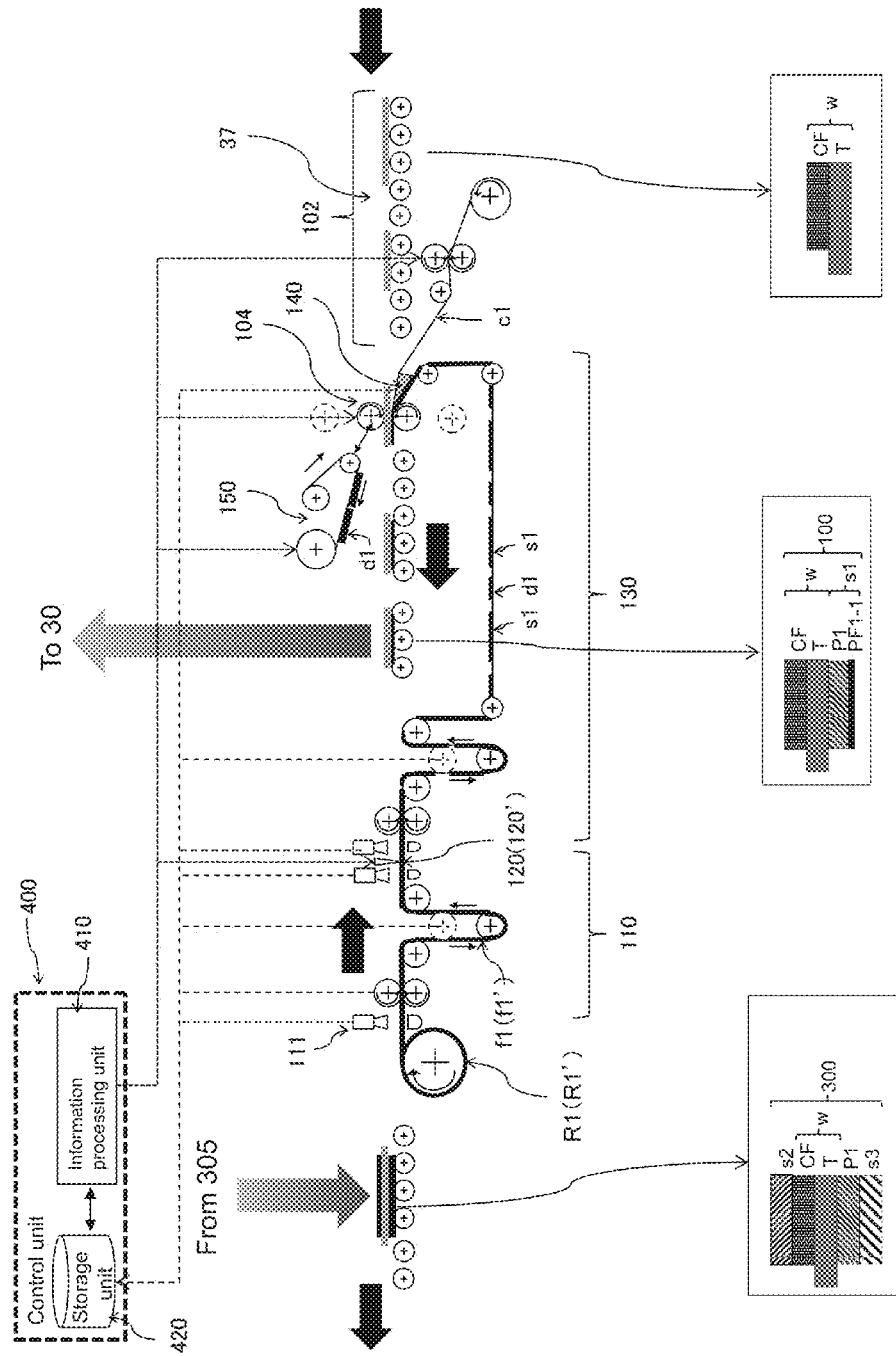
FIG. 9 shows a side view of a first channel of the lamination unit of FIG. 8.
Figure 10:
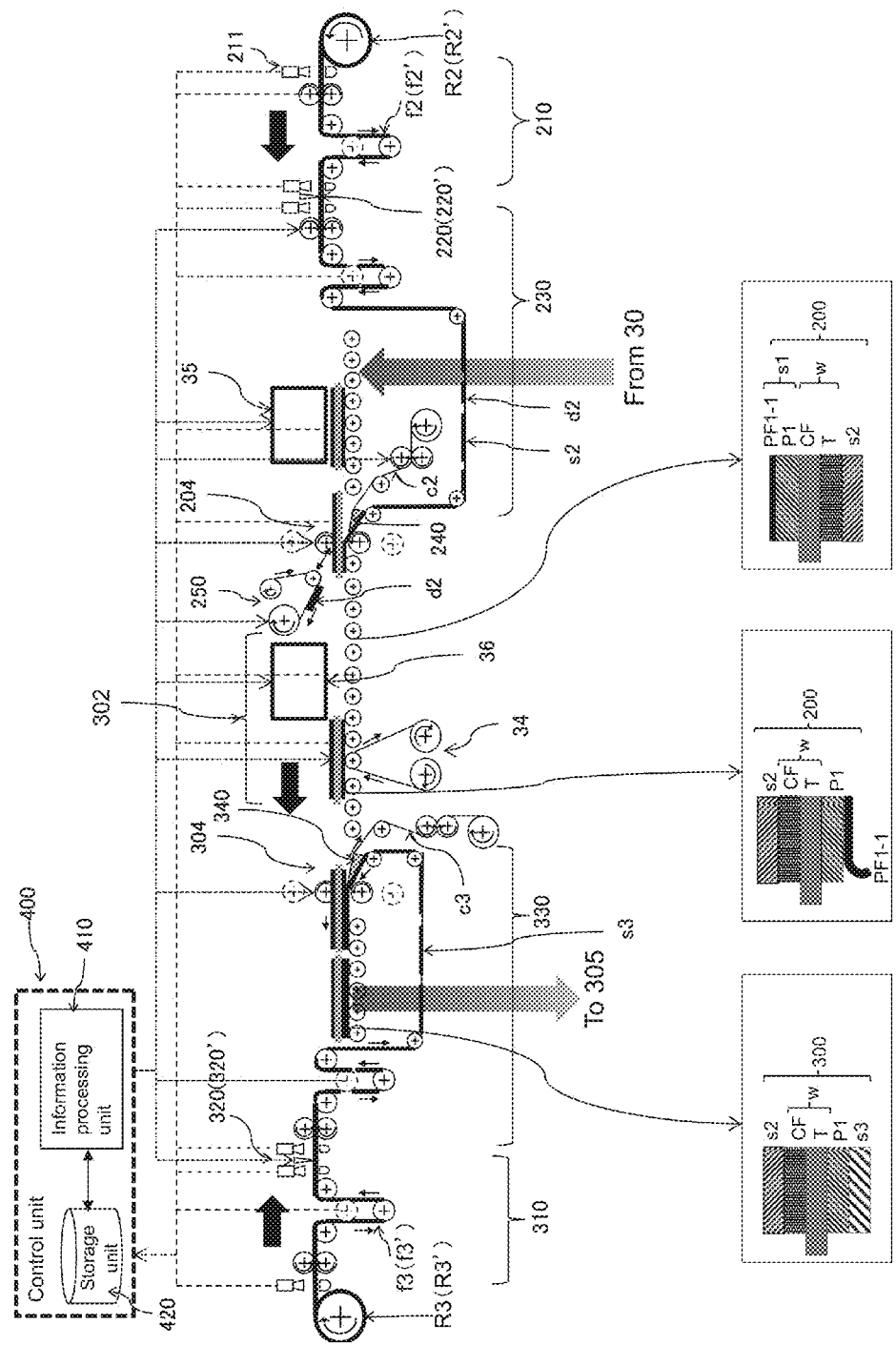
FIG. 10 shows a side view of a second channel of the lamination unit of FIG. 8.

The lamination unit shown in FIG. 8 to FIG. 10 is a unit for laminating all of the first and the second absorptive polarizing film sheet s1, s2 and the reflective polarizing film sheets s3 to the liquid-crystal display panels w from underside thereof, i.e. from underside of the first and the second channel 10, 20, and it may be regarded as another lamination unit 1 for implementing the present invention. Operation of all of elements configuring this lamination unit 1 is controlled by a control unit 400, similarly as in the previously described lamination unit 1.

In this lamination unit 1, a first reversing means 35 for reversing a first intermediate laminate 100 upside down to face a viewing side of a liquid-crystal display panel w downward is further deployed on downstream side with respect to conveying direction of a rotating means 33 for rotating the first intermediate laminate 100 by 90° in a line for conveying the first intermediate laminate 100 from a first lamination station 101 via a first channel-to-channel transfer part 30 to a second lamination station 201, and thereby a second absorptive polarizing film sheet s2 is laminated to a viewing side of the liquid-crystal display panel w configuring the reversed first intermediate laminate 100 from underside thereof to form a second intermediate laminate 200. A second reversing means 36 for again reversing the second intermediate laminate 200 upside down to face the non-viewing side of the liquid-crystal display panel w downward is further deployed on upstream side with respect to conveying direction of a peeling means 34 for peeling a surface protection film.

This lamination unit 1 has an advantage in that: since the first and the second intermediate laminate 100, 200 are reversed upside down in a respective conveying line of a first and a second intermediate laminate 100, 200 to allow for sequentially laminating all of first and second absorptive polarizing film sheets s1, s2 and reflective polarizing film sheets s3 to a viewing side and a non-viewing side of a liquid-crystal display panel w while each of the viewing and the non-viewing side is facing downward, all of a first, a second, a third web of optical laminate f1, f2, f3 or a first, a second, a third web of optical laminate with slit lines f1', f2', f3' may be mounted at or below a height of a conveying table of a first and a second channel 10, 20 to facilitate operation of workers; and since a first, a second an a third laminating means 104, 204, 304 allows for laminating all of first and second absorptive polarizing film sheets s1, s2 and reflective polarizing film sheets s3 to a viewing side and a non-viewing side of a liquid-crystal display panel w while each of the viewing and the non-viewing side is facing downward, adhesion of foreign item such as dirt may be prevented in those laminating steps.

Figure 11:
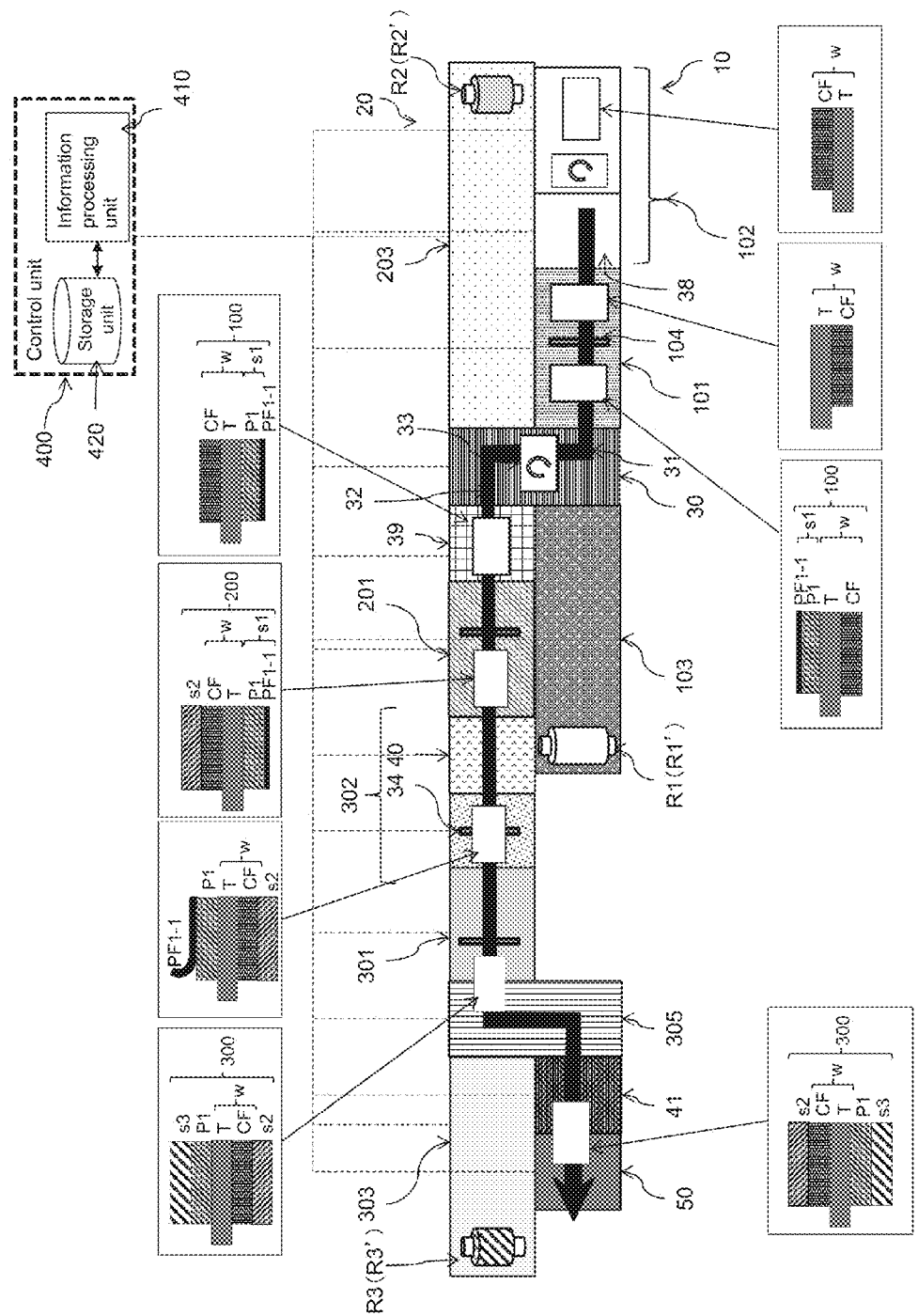
FIG. 11 is a plan view showing another lamination unit used in one or other embodiment of the present invention.
Figure 12:
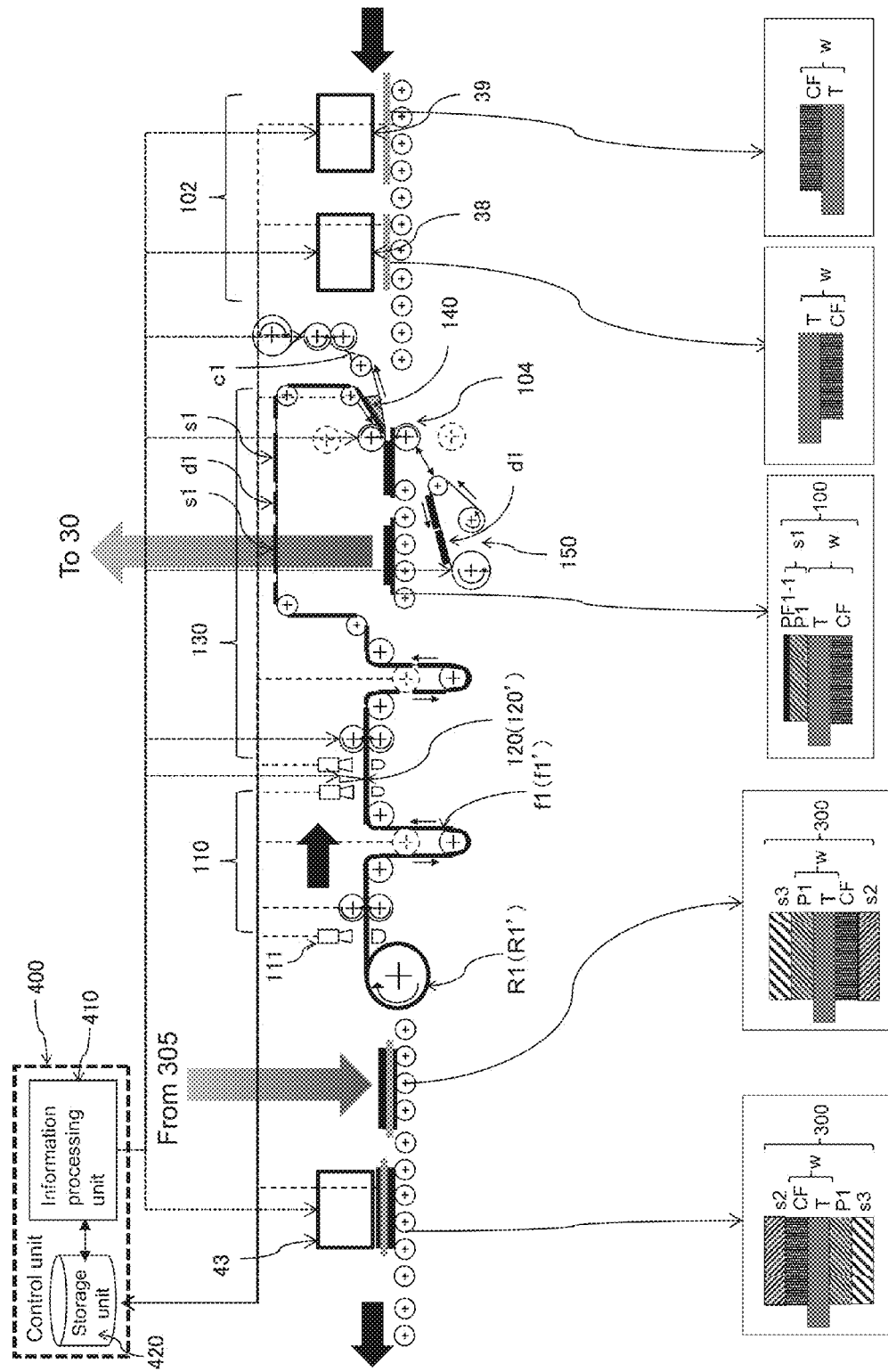
FIG. 12 shows a side view of a first channel of the lamination unit of FIG. 11.
Figure 13:
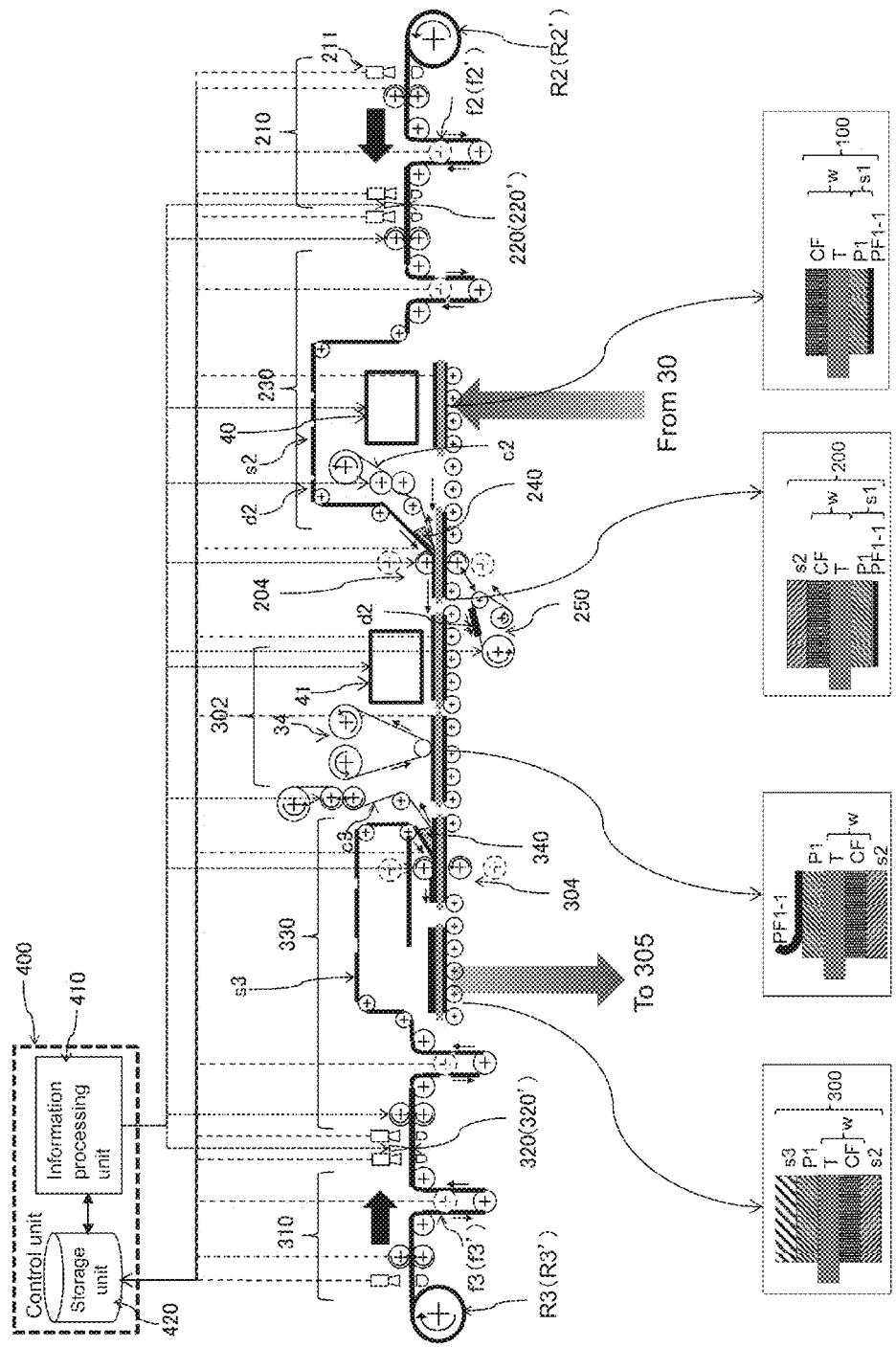
FIG. 13 shows a side view of a second channel of the lamination unit of FIG. 11.

The lamination unit shown in FIG. 11 to FIG. 13 is a unit for laminating all of the first and the second absorptive polarizing film sheet s1, s2 and the reflective polarizing film sheets s3 to the liquid-crystal display panels w from topside thereof, i.e. from topside of the first and the second channel 10, 20, and it may be regarded as another lamination unit 1 for implementing the present invention. Operation of all of elements configuring this lamination unit 1 is controlled by a control unit 400, similarly as in the previously described lamination unit 1.

In this lamination unit 1, a first reversing means 38 for reversing a liquid-crystal display panel w, being conveyed to a first lamination station 101 in an orientation which a long side thereof being orthogonal to a conveying direction upside down, to face a non-viewing side of the liquid-crystal display panel w downward is further deployed in a panel conveying line 102. A first absorptive polarizing film sheet s1 is laminated to a surface of the non-viewing side of the liquid-crystal display panel w in the first lamination station 101 to form a first intermediate laminate 100. A second reversing means 39 for again reversing the formed first intermediate laminate 100 upside down to face the viewing side of the liquid-crystal display panel w upward is further deployed on downstream side with respect to conveying direction of a rotating means 33 in a first channel-to-channel transfer part 30. By simultaneously reversing upside down and rotating the first intermediate laminate 100, the second absorptive polarizing film sheet s2 are laminated in a second lamination station 201 to a surface of the viewing side of the liquid-crystal display panel w configuring the first intermediate laminate 100 from topside thereof to form a second intermediate laminate 200. A third reversing means 40 is further deployed on upstream side, with respect to conveying direction of a liquid-crystal display panel w, of the peeling means 34 for peeling a surface protection film in the second intermediate laminate conveying line 302, and thereby the second intermediate laminate 200 is aging reversed upside down to face the non-viewing side of the liquid-crystal display panel w upward to allow for overlappingly laminating a reflective polarizing film sheet s3 on an exposed surface of respective one of first absorptive polarizing film sheets s1 from topside thereof.

This lamination unit 1 should perform rotating action of a liquid-crystal display panel w for at least three times or four times depending on necessity in conveying lines of a first and a second intermediate laminate 100, 200. As is clear from FIG. 12 and FIG. 13, since all of the first and the second absorptive polarizing film sheet s1, s2 and the reflective polarizing film sheets s3 are sequentially laminated to respective one of opposing surfaces of a liquid-crystal display panel w from topside thereof, i.e. from topside of a first and a second channel 10, 20 in all of a first, a second and a third web conveying line 103, 203, 303, this lamination unit 1 has an advantage as that it facilitates monitoring of each of laminating steps by an operator.

Figure 14:
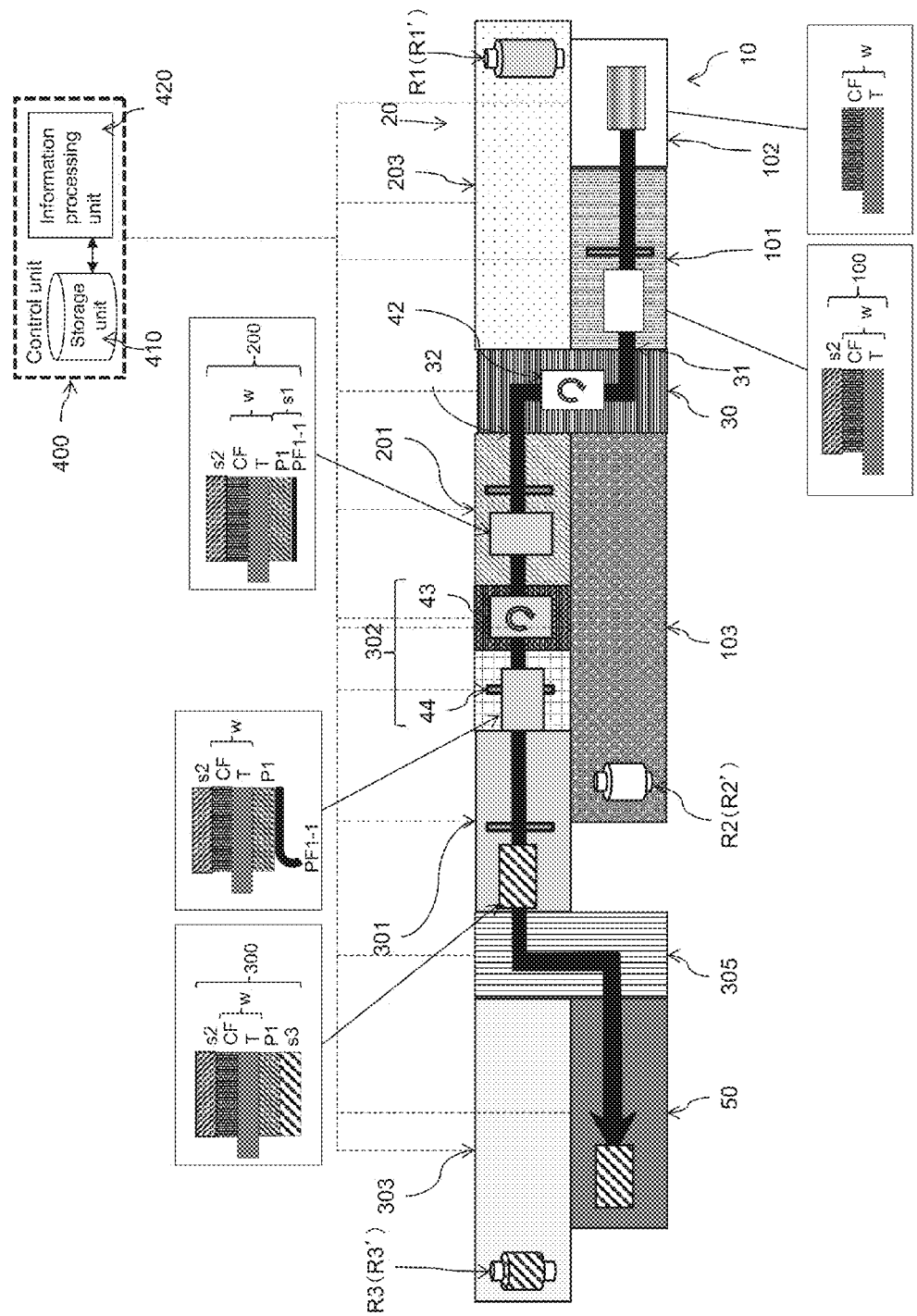
FIG. 14 is a plan view showing a further lamination unit used in one or other embodiment of the present invention.
Figure 15:
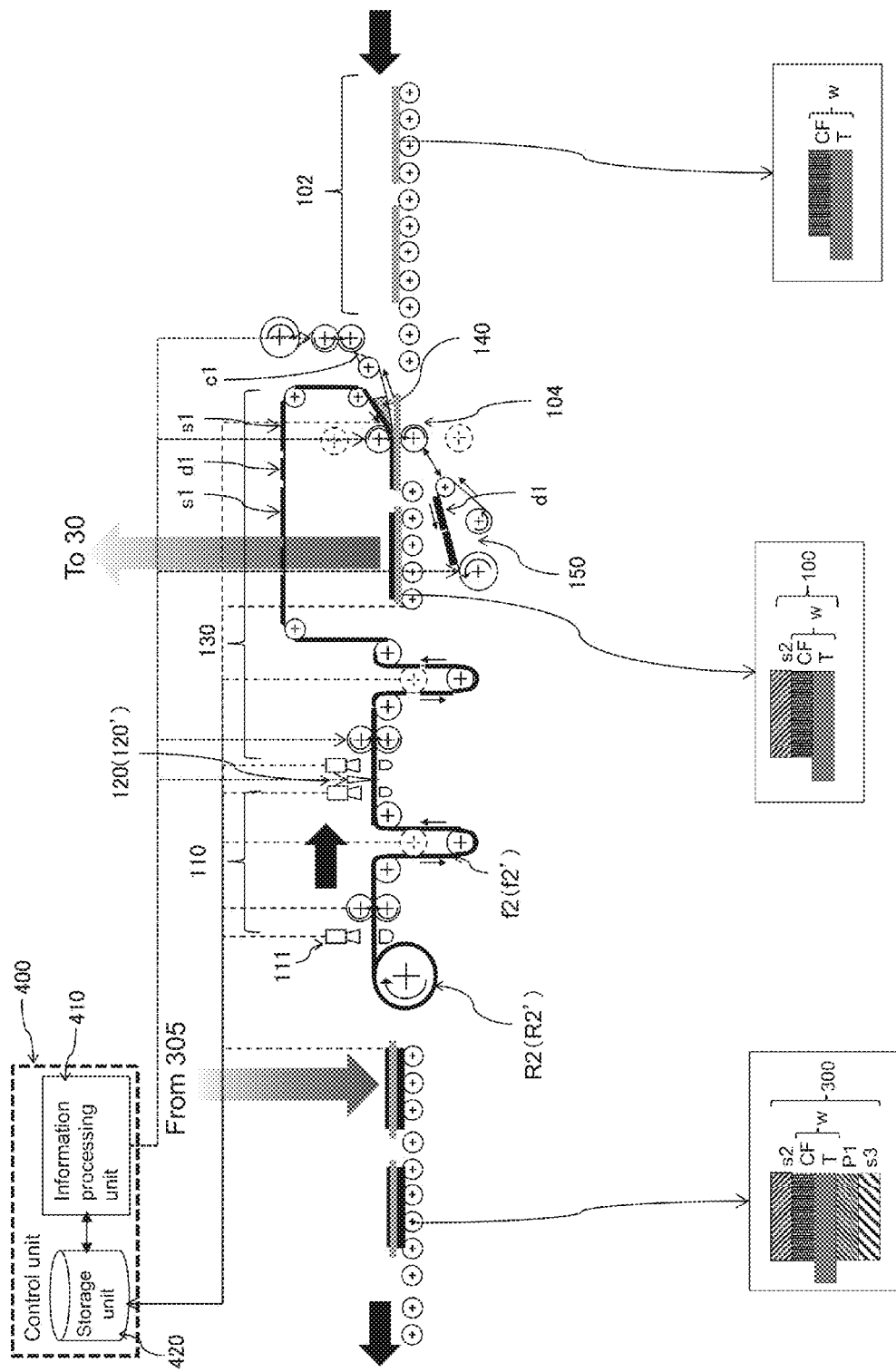
FIG. 15 shows a side view of a first channel of the lamination unit of FIG. 14.
Figure 16:
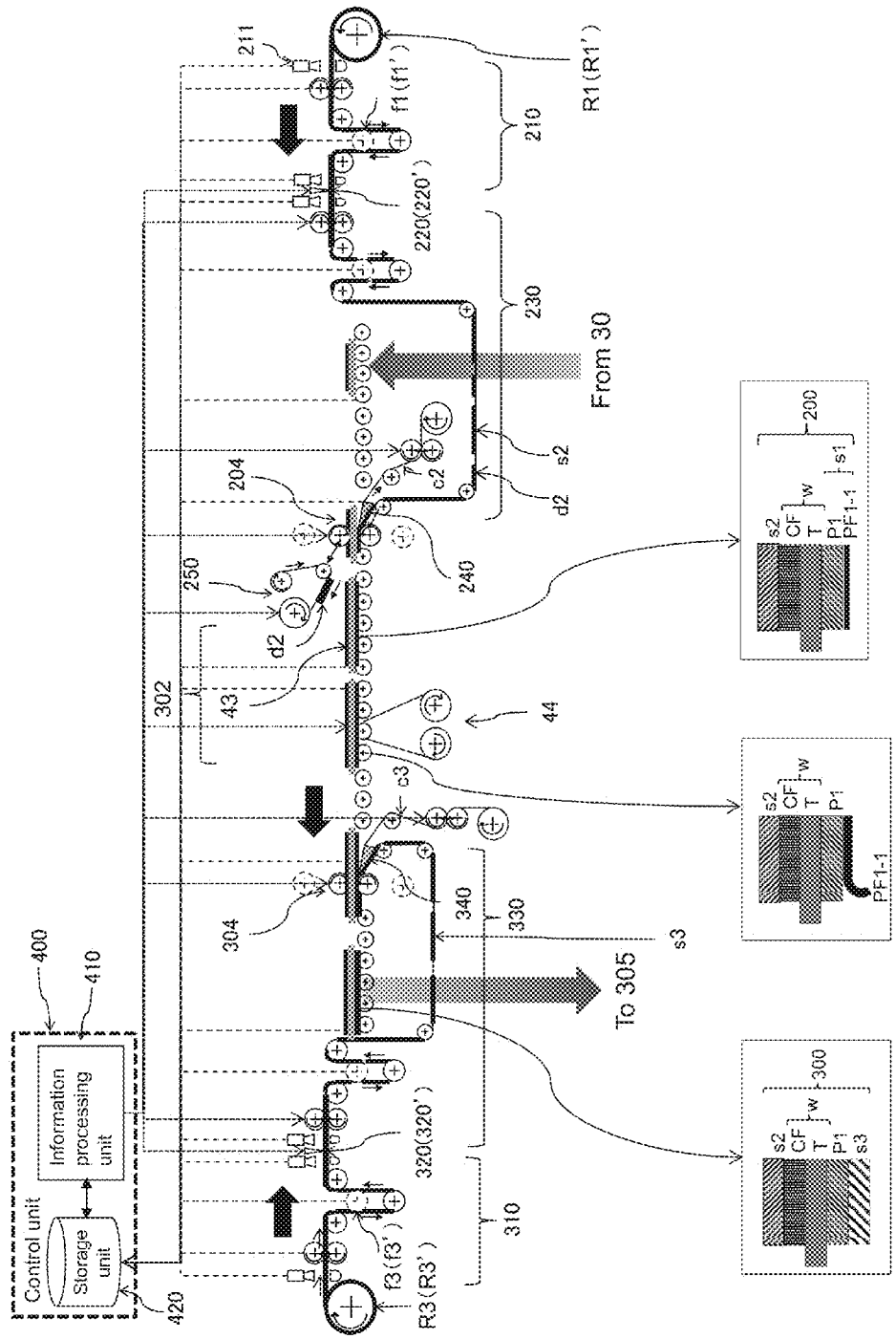
FIG. 16 shows a side view of a second channel of the lamination unit of FIG. 14.

The lamination unit 1 shown in FIG. 14 to FIG. 16 may continuously execute steps of sequentially laminating, starting from a first absorptive polarizing film sheet s1 on a viewing side of a liquid-crystal display panel w, then a second absorptive polarizing film sheet s2 on a non-viewing side of the liquid-crystal display panel w, and then a reflective polarizing film sheet s3 to an exposed surface of the second absorptive polarizing film sheet s2 on the non-viewing side of the liquid-crystal display panel w.

As described hereinabove, in manufacturing steps of a liquid-crystal display device, a liquid-crystal display panel w is firstly conveyed to a first lamination station 101 in an orientation which a long side thereof being orthogonal to a conveying direction, and a first absorptive polarizing film sheet s1 with a length of a longitudinal interval corresponding to a short side of the liquid-crystal display panel w included in a first web of optical laminate f1 or a first web of optical laminate with slit lines f1' fed from a first roll R1 shown in FIG. 4(a) is conveyed to the first lamination station 101, and then laminating the first absorptive polarizing film sheet s1 to the non-viewing side of the liquid-crystal display panel w starts.

On the other hand, in manufacturing steps with the lamination unit 1, a liquid-crystal display panel w is firstly conveyed to a first lamination station 101 in an orientation which a short side thereof being orthogonal to a conveying direction. Then, a first web of optical laminate f1 or a first web of optical laminate with slit lines f1' is fed out from a first roll R1, and a first absorptive polarizing film sheet s1 with a length of a longitudinal interval corresponding to a long side of the liquid-crystal display panel w included in the first web is conveyed to the first lamination station 101, and laminating the first absorptive polarizing film sheet s1 to the viewing side of the liquid-crystal display panel w starts.

Needless to say, the first web of optical laminate f1 or the first web of optical laminate with slit lines f1' used for the lamination unit 1 corresponds to a second web of optical laminate f2 or a second web of optical laminate with slit lines f2' fed from a second roll R2 shown in FIG. 4(b). Thus, the first absorptive polarizing film sheet s1 corresponds to a second absorptive polarizing film sheet s2 shown in FIG. 4(b). Manufacturing steps with the lamination unit 1 is different from normal steps in that laminating a first absorptive polarizing film sheet s1 on a viewing side of a liquid-crystal display panel w, but there is no problem as a manufacturing step of a liquid-crystal display device as with the above described lamination unit 1. Thus, the lamination unit 1 may be positioned as a further lamination unit 1 for implementing the present invention. Operation of all of elements configuring the lamination unit 1 is controlled by a control unit 400, as the above described lamination unit 1.

In this lamination unit 1, a liquid-crystal display panel w is firstly conveyed to a first lamination station 101 in an orientation which a short side thereof being orthogonal to a conveying direction, and a first absorptive polarizing film sheet s1 is laminated to a viewing side of the liquid-crystal display panel w to form a first intermediate laminate 100. Then, the first intermediate laminate 100 is rotated by 90° to an orientation which a long side thereof being orthogonal to a conveying direction and conveyed to a second lamination station 201 where a second absorptive polarizing film sheet s2 is laminated to a non-viewing side of the liquid-crystal display panel w to form a second intermediate laminate 200. A first rotating means 42 is deployed in a first channel-to-channel transfer part 30 for firstly rotating the first intermediate laminate 100 by 90° when conveying to the second lamination station 201. A second rotating means 43 is deployed in upstream side with respect to conveying direction of a second intermediate laminate conveying line 302 for rotating the second intermediate laminate 200, when being conveyed to a third lamination station 301, from an orientation which a long side thereof being orthogonal to the conveying direction to an orientation which a short side thereof being orthogonal to the conveying direction. A peeling means 44 may further be provided in downstream side of the second rotating means for peeling a surface protection film from the second absorptive polarizing film sheet s2 laminated to the non-viewing side of the liquid-crystal display panel w. In the third lamination station 301, a reflective polarizing film sheet s3 is overlappingly laminated to an exposed surface of the second absorptive polarizing film sheet s2 on the non-viewing side of the liquid-crystal display panel w configuring the second intermediate laminate 200 to form a laminate product 300.

In this lamination unit 1, as is clear from FIG. 15 and FIG. 16, a first web feeding line 103 corresponds to a second web feeding line 203 in a second channel 20 of the above described lamination unit 1 and a second web feeding line 203 in a second channel 20 corresponds to a first web feeding line 103 in a first channel 10 of the above described lamination unit 1. Thus, this lamination unit 1 may continuously execute the three stages of laminating steps to a liquid-crystal display panel w without reversing the liquid-crystal display panel w upside down except that the liquid-crystal display panel w needs to be rotated twice.

In this lamination unit 1, a step of carrying a liquid-crystal display panel w into a panel conveying line 102 in an orientation which a short side thereof being orthogonal to a conveying direction and a viewing side thereof facing upward is included, a first absorptive polarizing film sheet s1 may be laminated to a surface of the viewing side of the liquid-crystal display panel w facing upward from topside thereof without reversing the liquid-crystal display panel w upside down except rotating it by 90° for twice, then a second absorptive polarizing film sheet s2 may be laminated to a surface on the non-viewing side of the liquid-crystal display panel w from underside thereof which is facing downward and a long side thereof being orthogonal to a conveying direction, then the liquid-crystal display panel w is rotated by 90° while facing downward, and a reflective polarizing film sheet s3 may be overlappingly laminated to an exposed surface of the second absorptive polarizing film sheet s2 from underside thereof on the non-viewing side of the liquid-crystal display panel w in an orientation which a short side thereof being orthogonal to the conveying direction.

In the lamination unit 1 shown in FIG. 5, FIG. 8, FIG. 11 and FIG. 14 as a lamination unit for implementing the present invention, laminating means 34, 44 peels a surface protection film laminated via an adhesive layer to at least a first or a second absorptive polarizing film sheet s1, s2 thereby to form an exposed surface on the first or the second absorptive polarizing film sheet s1, s2 laminated to a non-viewing side of the liquid-crystal display panel w, and it is preferable that the adhesive layer is configured with a releasing member having adhesive force greater than that between the surface protection film and the first or the second absorptive polarizing film sheet s1, s2 so that the peeling means 34, 44 may peel the surface protection film from the first or the second absorptive polarizing film sheet s1, s2, when a second intermediate laminate 200 is conveyed to a second intermediate conveying line 302 or a first intermediate laminate conveying line 202 in a state where the non-viewing side of the liquid-crystal display panel w facing downward.

Embodiment 3

Another embodiment of the present invention is a method for manufacturing a liquid-crystal display device continuously executing three stages of laminating steps comprising: feeding a first web of optical laminate f1 or a first web of optical laminate with slit lines f1' and laminating a first absorptive polarizing film sheet s1 to a surface on a non-viewing side of a liquid-crystal display panel w; feeding a third web of optical laminate f3 or a third web of optical laminate with slit lines f3' and overlappingly laminating a reflective polarizing film sheet s3 to an exposed surface of the first absorptive polarizing film sheet s1 laminated to the surface on the non-viewing side of the liquid-crystal display panel w, the exposed surface being opposite with respect to the -viewing side of a liquid-crystal display panel w; and feeding a second web of optical laminate f2 or a second web of optical laminate with slit lines f2' and laminating a second absorptive polarizing film sheet s2 to a surface on a viewing side of the liquid-crystal display panel w.

Figure 23:
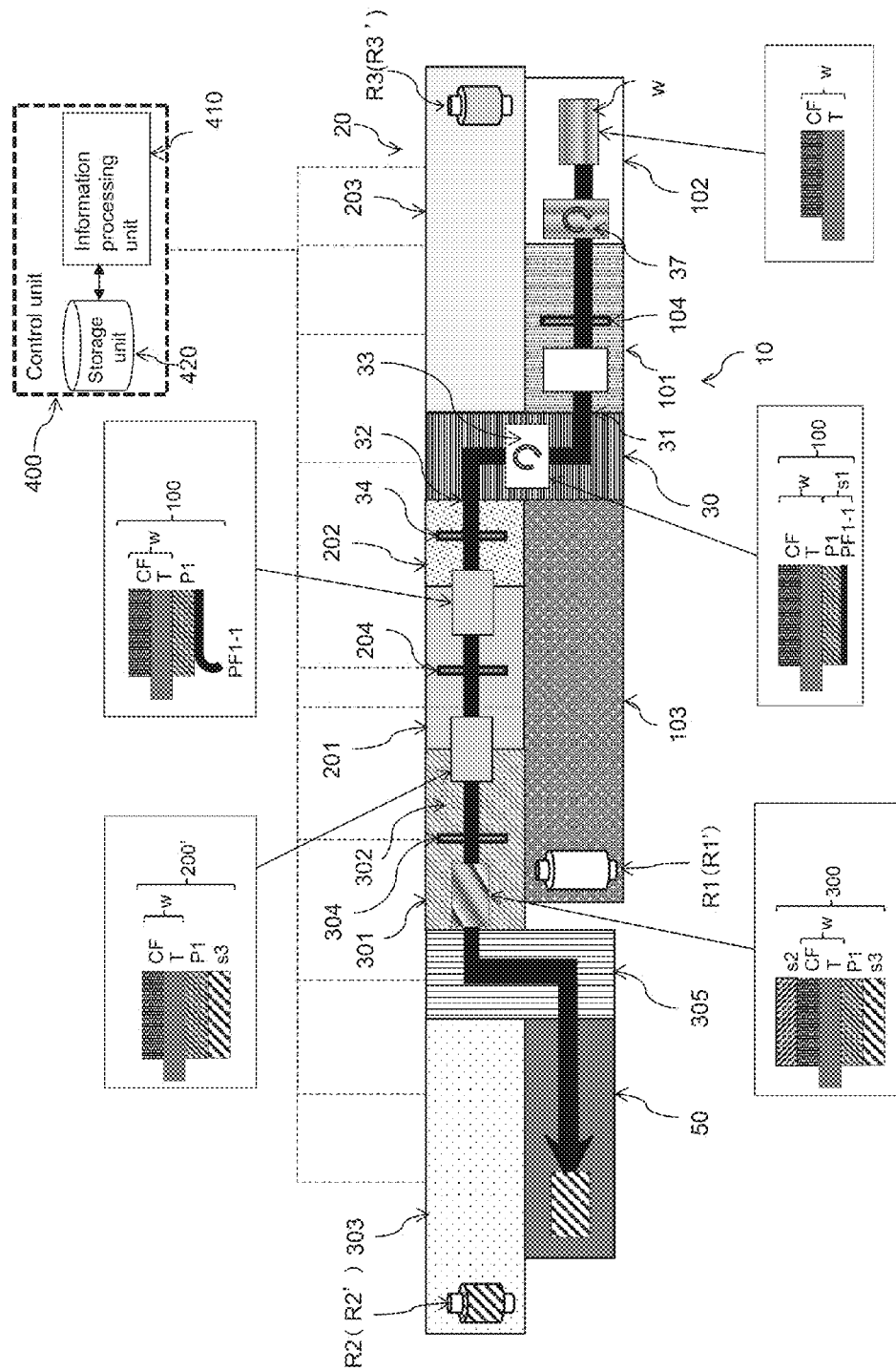
FIG. 23 is a plan view of yet another lamination unit used in one or other embodiment of the present invention.
Figure 24:
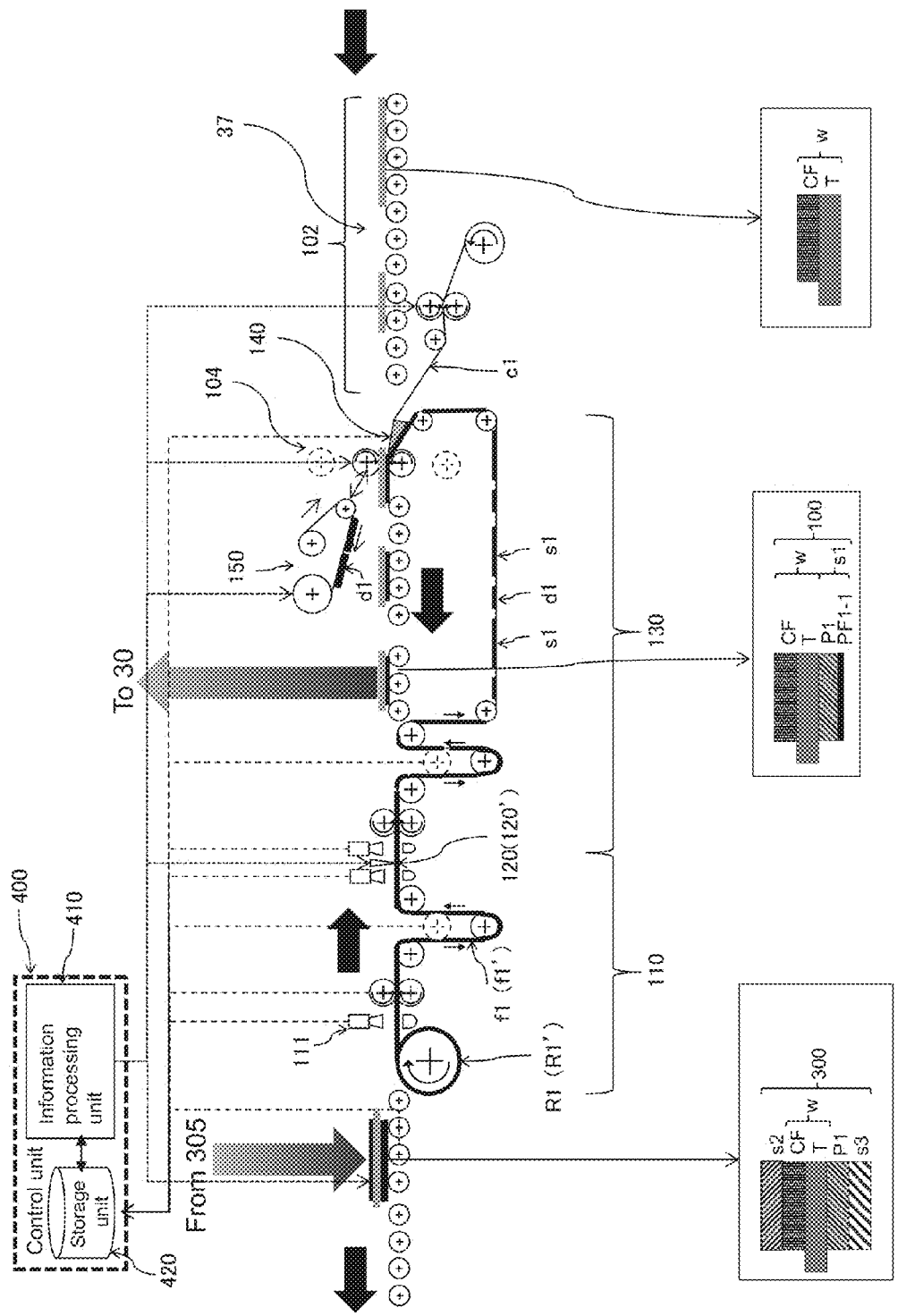
FIG. 24 shows a side view of a first channel of the lamination unit of FIG. 23.
Figure 25:
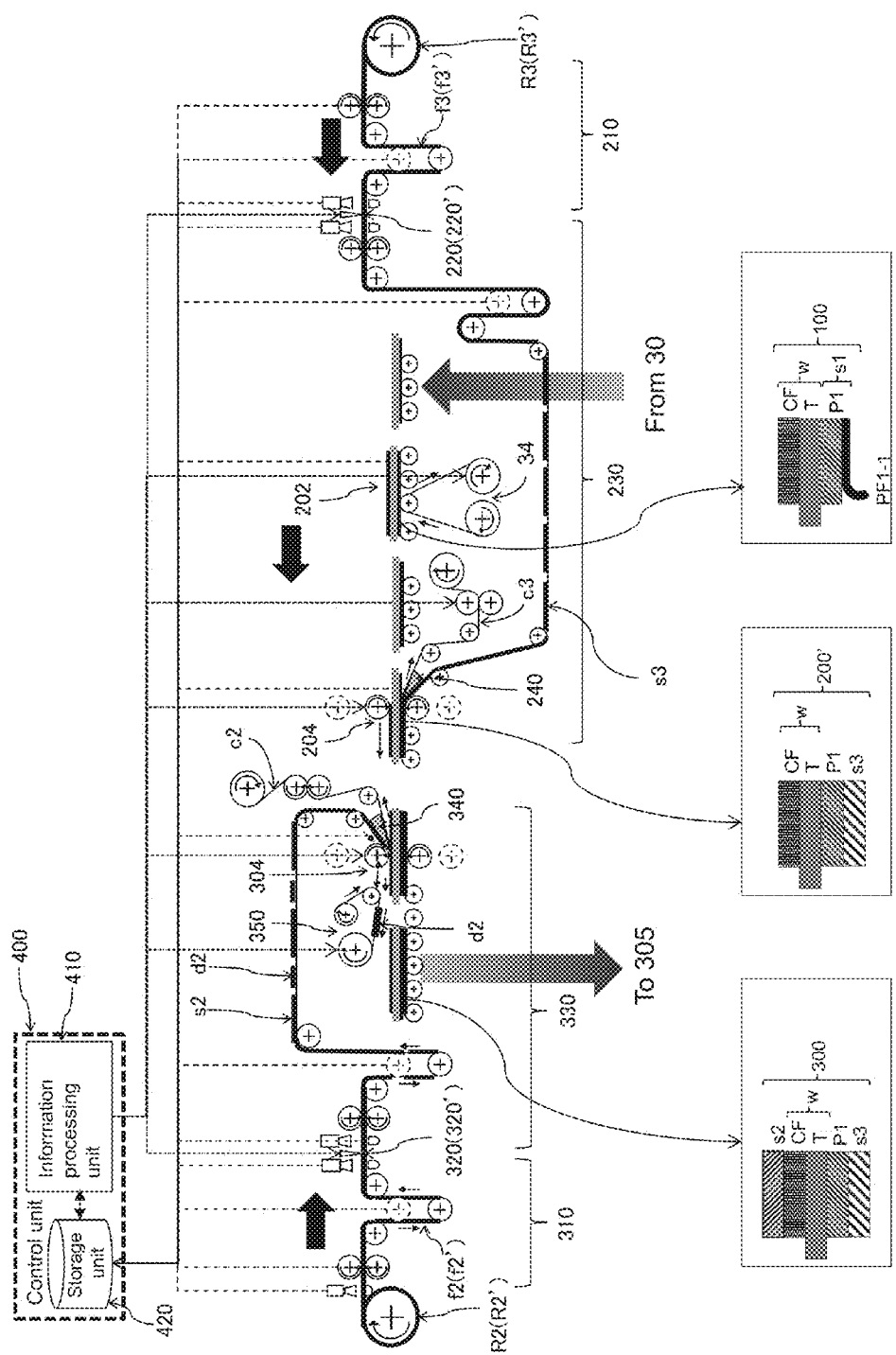
FIG. 25 shows a side view of a second channel of the lamination unit of FIG. 23.

FIG. 23 to FIG. 25 are a plan view showing a lamination unit 1 for implementing the present invention and side views of a first channel 10 and a second channel configuring the lamination unit 1.

Figure 26:
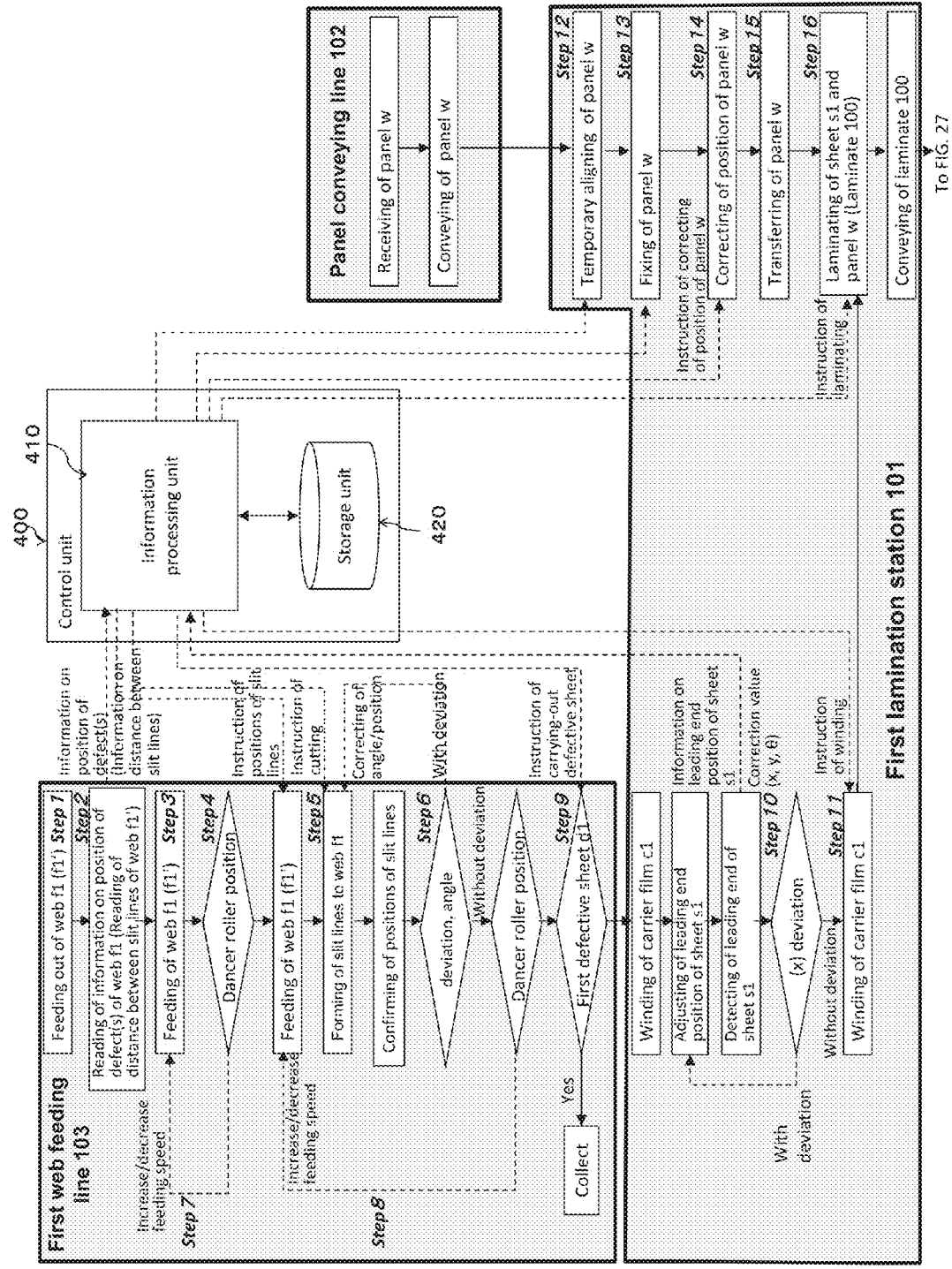
FIG. 26 shows a control flow of a step of separating first absorptive polarizing film sheets and a first defective sheet included in a first web of optical laminate or a first web of optical laminate with slit lines and a step of laminating separated first absorptive polarizing film sheets to a non-viewing side surface of liquid-crystal display panels in a lamination unit shown in FIG. 23.

FIG. 26 shows a control flow of a step of separating a first absorptive polarizing film sheet s1 included in a first web of optical laminate f1 or a first web of optical laminate with slit lines f1' to be laminated to a surface of a non-viewing side of a liquid-crystal display panel w and a first defective sheet d1 to be collected without laminating to the liquid-crystal display panel w, and a step of laminating the separated first absorptive polarizing film sheet s1 to the surface of the non-viewing side of the liquid-crystal display panel w to form a first intermediate laminate 100.

Figure 27:
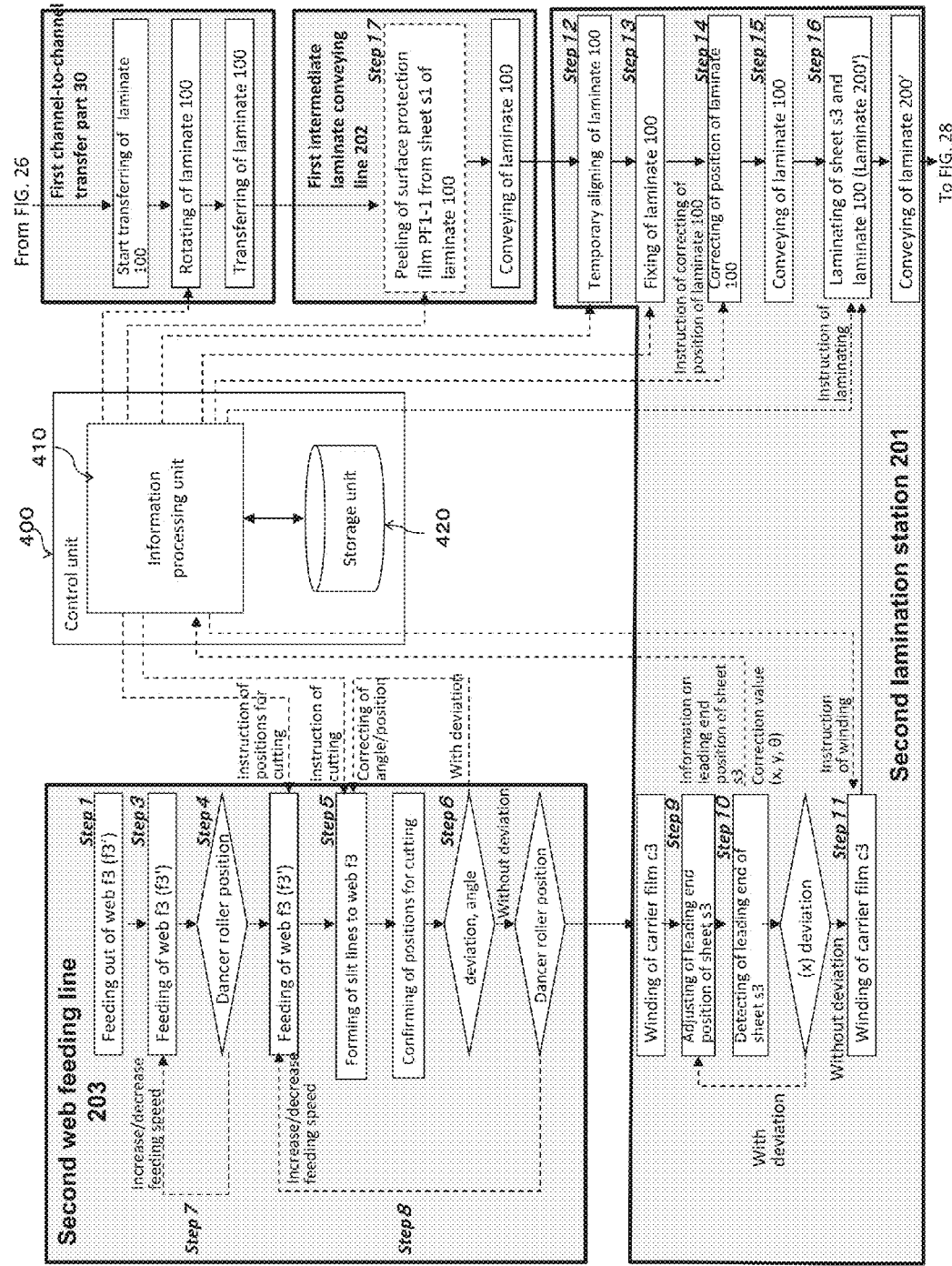
FIG. 27 shows a control flow of a step of laminating reflective polarizing film sheets included in a third web of optical laminate or a third web of optical laminate with slit lines to an exposed surface of first absorptive polarizing film sheets laminated to a non-viewing side of a liquid-crystal display panel in a lamination unit shown in FIG. 23.

FIG. 27 shows a control flow of, in the lamination unit 1, a step of overlappingly laminating a reflective polarizing film sheet s3 included in a third web optical laminate f3 or a third web of optical laminate with slit lines f3' to an exposed surface, opposite to a liquid-crystal display panel w, of a first absorptive polarizing film sheet s1 laminated to the non-viewing side of the liquid-crystal display panel w configuring the first intermediate laminate 100 to form a second intermediate laminate 200' and a step of peeling a surface protection film PF1-1 laminated via an adhesive layer to the first absorptive polarizing film sheet s1 in the first intermediate laminate 100 in a first intermediate laminate conveying line 202 to form an exposed surface of the first absorptive polarizing film sheet s1.

Figure 28:
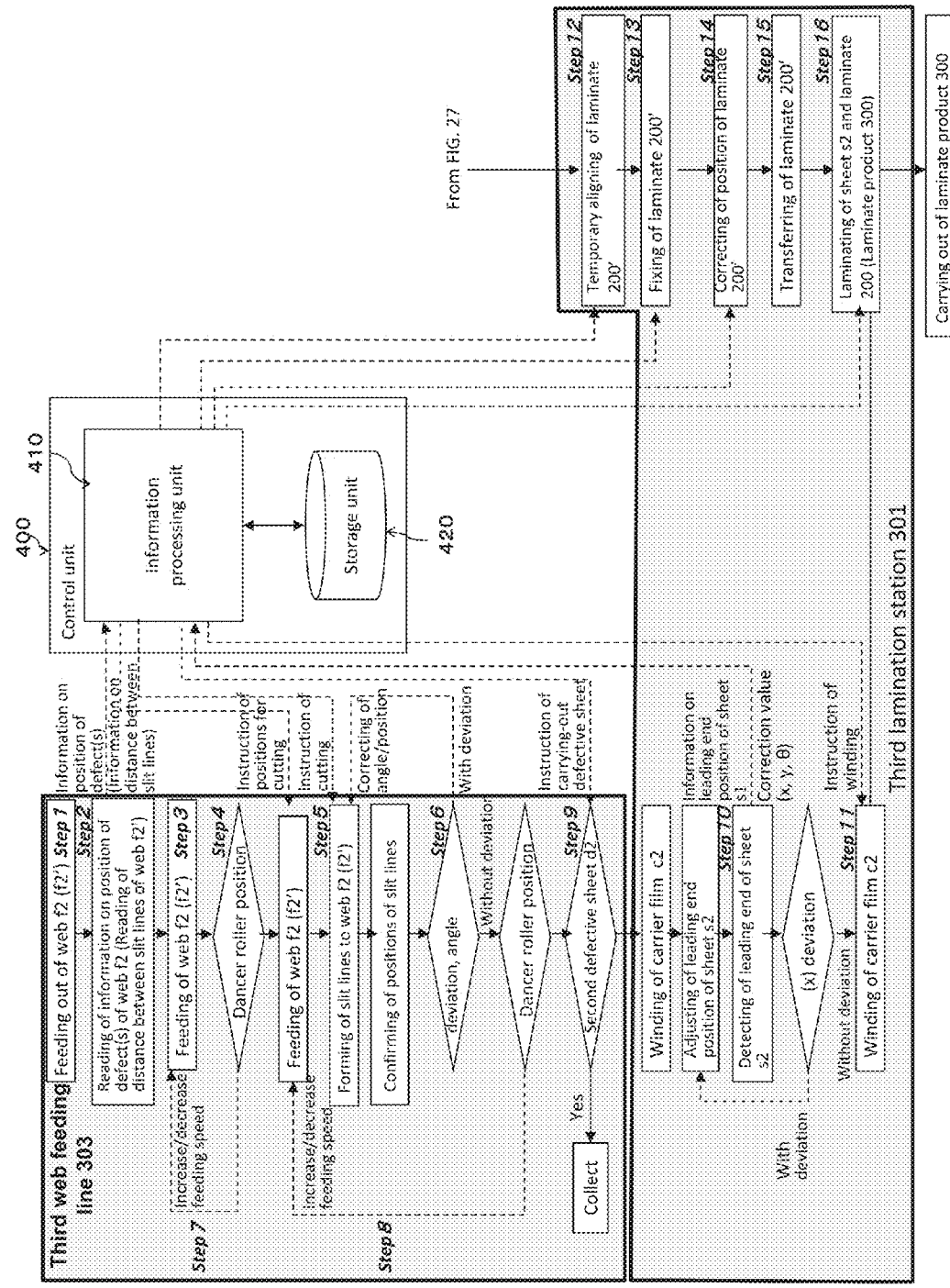
FIG. 28 shows a control flow of a step of separating second absorptive polarizing film sheets and a second defective sheet included in a second web of optical laminate or a second web of optical laminate with slit lines and a step of laminating separated second absorptive polarizing film sheets to a viewing side surface of liquid-crystal display panels in a lamination unit shown in FIG. 23.

FIG. 28 shows a control flow of, in the lamination unit 1, a step of separating a second absorptive polarizing film sheet s2 included in a second web of optical laminate f2 or a second web of optical laminate with slit lines f2' to be laminated to a surface of a viewing side of a liquid-crystal display panel w and a second defective sheet d2 to be collected without laminating to the liquid-crystal display panel w, and a step of laminating the separated second absorptive polarizing film sheet s2 to the surface of the viewing side of the liquid-crystal display panel w configuring the second intermediate laminate 200' to form a laminate product 300.

As shown in FIG. 26, in a step of separating a first absorptive polarizing film sheet s1 configuring a first web of optical laminate f1 and a first defective sheet d1, an inspected first web of optical laminate f1 given with information on position of a defect is fed out into a first web feeding line 103 in step 1. Then, each of information on position of a defect is read in step 2. Positions of slit lines for the first absorptive polarizing film sheets s1 and positions of slit lines for the first defective sheets d1 are instructed in step 5. Positions of slit lines are adjusted in step 6 to step 8. A first slit line formation mechanism 120 shown in FIG. 24 starts operation based on the instructions.

Each of the sheets of the first web of optical laminate f1 is judged to be a first absorptive polarizing film sheet s1 or a first defective sheet d1 in step 9, and when a sheet is judged to be a first defective sheet d1, a first removing mechanism 150 operates to peel the first defective sheet d1 from a first carrier film c1 and collects the peeled first defective sheet d1 without laminating to the liquid-crystal display panel w. On the other hand, when a sheet is judged to be a first absorptive polarizing film sheet s1 in step 9, the first web of optical laminate f1 is further fed and conveyed to the first lamination station 101.

The first absorptive polarizing film sheets s1 in a state supported on the first carrier film c1 are peeled from the first carrier film c1 by operating a first peeling mechanism 140 and the first carrier film c1 is accordingly wound in the first lamination station 101 in step 11. The peeled first absorptive polarizing film sheets s1 are position-adjusted with respective ones of liquid-crystal display panels w conveyed via a panel conveying line 102 to the first lamination station 101 and then laminated to a surface of a non-viewing side of each of the liquid-crystal display panels w from underside thereof to form first intermediate laminates 100 in step 16.

On the other hand, as shown in FIG. 26, in a step of separating a first absorptive polarizing film sheet s1 configuring a first web of optical laminate with slit lines f1' and a first defective sheet d1, a first web of optical laminate with slit lines f1' given with information on positions of slit lines and on distance between longitudinal intervals of adjacent slit lines is fed out into a first web feeding line 103 in step 1. Then, the information on distance of longitudinal interval between adjacent slit lines, i.e. distance corresponding to a short side of a liquid-crystal display panels w is read in step 2. Feeding length and speed of the first web of optical laminate with slit lines f1' are adjusted in step 3, step 4 and step 7. The slit line position-reading mechanism 120' shown in FIG. 24 operates based on instructions of the feeding length and speed.

Each of the sheets of the first web of optical laminate with slit lines f1' is judged to be a first absorptive polarizing film sheet s1 or a first defective sheet d1 in step 9, and when a sheet is judged to be a first defective sheet d1, a first removing mechanism 150 operates to peel the first defective sheet d1 from a first carrier film c1 and collects the peeled first defective sheet d1 without laminating to the liquid-crystal display panel w. On the other hand, when a sheet is judged to be a first absorptive polarizing film sheet s1 in step 9, the first web of optical laminate with slit lines f1' is further fed and conveyed to the first lamination station 101.

The first absorptive polarizing film sheets s1 in a state supported on the first carrier film c1 are peeled from the first carrier film c1 by operating a first peeling mechanism 140 and the first carrier film c1 is accordingly wound in the first lamination station 101 in step 11. The peeled first absorptive polarizing film sheets s1 are position-adjusted with respective ones of liquid-crystal display panels w conveyed via a panel conveying line 102 to the first lamination station 101 and then laminated to a surface of a non-viewing side of each of the liquid-crystal display panels w from underside thereof to form first intermediate laminates 100 in step 16.

As shown in FIG. 27, the first intermediate laminates 100 are rotated by 90° at a first channel-to-channel transfer part 30 and conveyed from the first lamination station 101 to a second lamination station 201. On the other hand, in a step of overlappingly laminating a reflective polarizing film sheet s3 to an exposed surface, opposite to a liquid-crystal display panel w, of a first absorptive polarizing film sheet s1 on a non-viewing side of a liquid-crystal display panel w configuring the first intermediate laminate 100, i.e. a step of forming a second intermediate laminate 200', a third web of optical laminate f3 is fed in a second web feeding line 203 in step 1. Then, feed length of the third web of optical laminate f3 is adjusted and positions of slit lines for reflective polarizing film sheets s3 are then instructed in step 3 and step 4. A second slit line formation mechanism 220 shown in FIG. 25 starts operation based on the instructions in step 5. The second slit line formation mechanism 220 is operated to confirm positions of slit lines formed in a third carrier film c3 and the third web of optical laminate f3 is conveyed to the second lamination station 201 in step 6 to step 8.

The reflective polarizing film sheets s3 are peeled from the third carrier film c3 in the second lamination station 201 in step 9 to step 11. The peeled reflective polarizing film sheets s3 are position-adjusted with respective ones of the first intermediate laminates 100 conveyed via the first intermediate laminate conveying line 202 to the second lamination station 201 and then overlappingly laminated to an exposed surface of respective ones of the first absorptive polarizing film sheets s1 on the non-viewing side of the liquid-crystal display panels w from underside thereof to form a second intermediate laminate 200' in step 16.

On the other hand, as shown in FIG. 27, in a step of overlappingly laminating a reflective polarizing film sheet s3 included in a third web of optical laminate with slit lines f3' to an exposed surface, opposite to a liquid-crystal display panel w, of a first absorptive polarizing film sheet s1 on a non-viewing side of the liquid-crystal display panel w configuring the first intermediate laminate 100, i.e. a step of forming a second intermediate laminate 200', a third web of optical laminate with slit lines f3' is fed in a second web feeding line 203 in step 1. Then, feed length and speed of the third web of optical laminate with slit lines f3' are adjusted and accordingly the third web of optical laminate with slit lines f3' is further fed and conveyed to the second lamination station 201 in step 3, step 4 and step 7. A second slit line formation mechanism 220' shown in FIG. 25 operates based on the instructions.

The reflective polarizing film sheets s3 in a state supported on the third carrier film c3 are peeled from the third carrier film c3 by operating a second peeling mechanism 240 and the third carrier film c3 is accordingly wound in the second lamination station 201 in step 11. The peeled reflective polarizing film sheets s3 are position-adjusted with respective ones of first intermediate laminates 100 conveyed via a first intermediate laminate conveying line 202 to the second lamination station 201 and then overlappingly laminated to an exposed surface of respective ones of the first absorptive polarizing film sheets s1 on the non-viewing side of the liquid-crystal display panels w from underside thereof to form a second intermediate laminate 200' in step 16.

At the second lamination station 201, the second intermediate laminate 200' is formed as that the first absorptive polarizing film sheet s1 and the reflective polarizing film sheet s3 are overlappingly laminated on the non-viewing side of the liquid-crystal display panel w, and has a different structure from the second intermediate laminate 200 formed as that the first and the second absorptive polarizing film sheet s1, s2 are laminated, respectively, to the non-viewing side and the viewing side of the liquid-crystal display panel w.

Accordingly, when using a first web of optical laminate f1 or a first web of optical laminate with slit lines f1' in which a first surface protection film is laminated via an adhesive layer to a first absorptive polarizing film sheet s1, before laminating a reflective polarizing film sheet s3 a first intermediate laminate 100 by a second laminating means 204 to form a second intermediate laminate 200' in a second lamination station 201, a surface protection film needs to be peeled from the first absorptive polarizing film sheet s1 integrally with the adhesive layer and a surface, opposite to a liquid-crystal display panel w, of the first absorptive polarizing film sheet s1 needs to be exposed. As shown in FIG. 25, it is preferable that a peeling means 34 therefor is appropriately deployed in a first intermediate laminate conveying line 202 on upstream side of the second laminating means 204 with respect to conveying direction.

The second intermediate laminate 200' in this aspect of the present invention is conveyed as it is to a third lamination station 301 shown in FIG. 25 or FIG. 28. In a step of separating a second absorptive polarizing film sheet s2 and a second defective sheet d2 configuring a second web of optical laminate f2, the inspected second web of optical laminate f2 given with information on position of a defect or defects is fed to a third web feeding line 303 in step 1. Then, similarly as in a step in the first web feeding line 103, information on position of a defect or defects is read in step 2. Positions of slit lines for the second absorptive polarizing film sheets s2 and positions of slit lines for the second defective sheets d2 are instructed in step 5. Positions of slit lines are adjusted in step 6 to step 8. A third slit line formation mechanism 320 shown in FIG. 25 starts operation based on the instructions.

Each of the sheets of the second web of optical laminate f2 is judged to be a second absorptive polarizing film sheet s2 or a second defective sheet d2 in step 9, and when a sheet is judged to be a second defective sheet d2, a second removing mechanism 350 operates to peel the second defective sheet d2 from a second carrier film c2 and collects the peeled second defective sheet d2 without laminating to a liquid-crystal display panel w. On the other hand, when a sheet is judged to be a second absorptive polarizing film sheet s2 in step 9, the second web of optical laminate f2 is further fed and conveyed to a third lamination station 301.

The second absorptive polarizing film sheets s2 in a state supported on the second carrier film c2 are peeled from the second carrier film c2 by operating a third peeling mechanism 340 and the second carrier film c2 is accordingly wound in a third lamination station 301 in step 11. The peeled second absorptive polarizing film sheets s2 are position-adjusted with respective ones of liquid-crystal display panels w conveyed to the third lamination station 301 and then laminated to a surface of a viewing side of respective ones of the liquid-crystal display panels w from topside thereof to form laminate products 300 in step 16.

On the other hand, in a step of separating a second absorptive polarizing film sheet s2 and a second defective sheet d2 configuring a second web of optical laminate with slit lines f2' shown in FIG. 25 or FIG. 28, the second web of optical laminate with slit lines f2' given with information on positions of slit lines and on distance of longitudinal intervals between adjacent slit lines is fed to a third web feeding line 303 in step 1. Then, information on distance of each of longitudinal intervals, i.e. distance corresponding to a short side of a liquid-crystal display panels w is read in step 2. Feeding length and speed of the second web of optical laminate with slit lines f2' are adjusted in step 3, step 4 and step 7. A second slit line formation mechanism 320' shown in FIG. 25 starts operation based on the instructions.

Each of the sheets of the second web of optical laminate with slit lines f2' is judged to be a second absorptive polarizing film sheet s2 or a second defective sheet d2 in step 9, and when a sheet is judged to be a second defective sheet d2, a second removing mechanism 350 operates to peel the second defective sheet d2 from a second carrier film c2 and collects the peeled second defective sheet d2 without laminating to a liquid-crystal display panel w. On the other hand, when a sheet is judged to be a second absorptive polarizing film sheet s2 in step 9, the second web of optical laminate with slit lines f2' is further fed and conveyed to a third lamination station 301.

The second absorptive polarizing film sheets s2 in a state supported on the second carrier film c2 are peeled from the second carrier film c2 by operating a third peeling mechanism 340 and the second carrier film c2 is accordingly wound in the third lamination station 301 in step 11. The peeled second absorptive polarizing film sheets s2 are position-adjusted with respective ones of liquid-crystal display panels w conveyed to the third lamination station 301 and then laminated to a surface of a viewing side of respective ones of the liquid-crystal display panels w from topside thereof to form laminate products 300 in step 16. In the lamination unit 1, it is preferable that a peeling means 34 is deployed in the first intermediate laminate conveying line 202 for processing a surface protection film laminated via an adhesive layer to a first absorptive polarizing film sheet s1.

Embodiment 4

Yet another embodiment of the present invention is a method for manufacturing a liquid-crystal display device continuously executing three stages of laminating steps comprising: feeding a first web of optical laminate f1 or a first web of optical laminate with slit lines f1' and laminating a first absorptive polarizing film sheet s1 to a surface on a non-viewing side of a liquid-crystal display panel w; then simultaneously feeding a second web of optical laminate f2 or a second web of optical laminate with slit lines f2' and laminating a second absorptive polarizing film sheet s2 to a surface on a viewing side of a liquid-crystal display panel w and feeding a third web of optical laminate f3 or a third web of optical laminate with slit lines f3' and overlappingly laminating a reflective polarizing film sheet s3 to an exposed surface of the first absorptive polarizing film sheet s1 laminated to the surface on the non-viewing side of the liquid-crystal display panel w.

Figure 29:
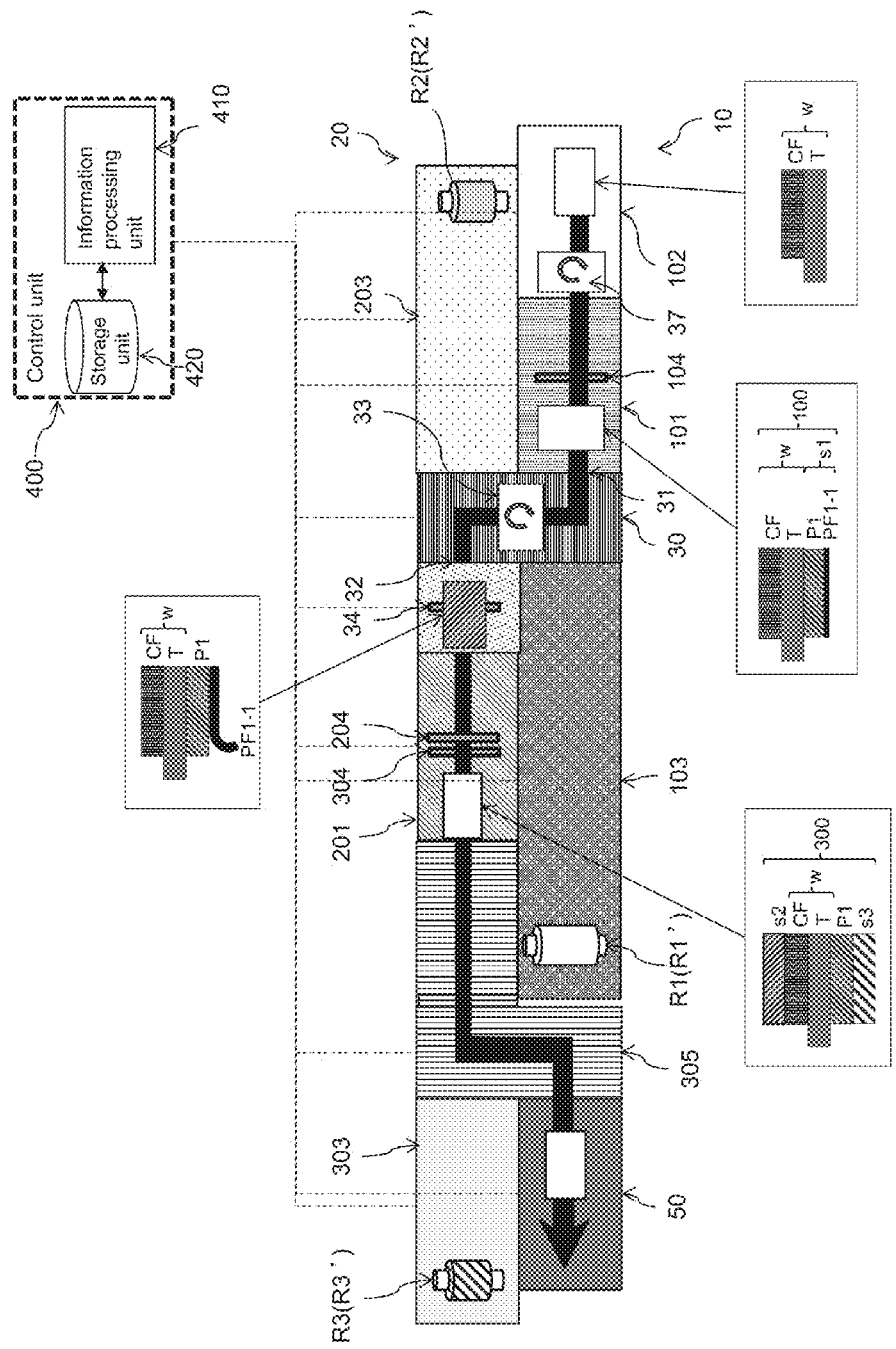
FIG. 29 is a plan view of another lamination unit used in one or other embodiment of the present invention.
Figure 30:
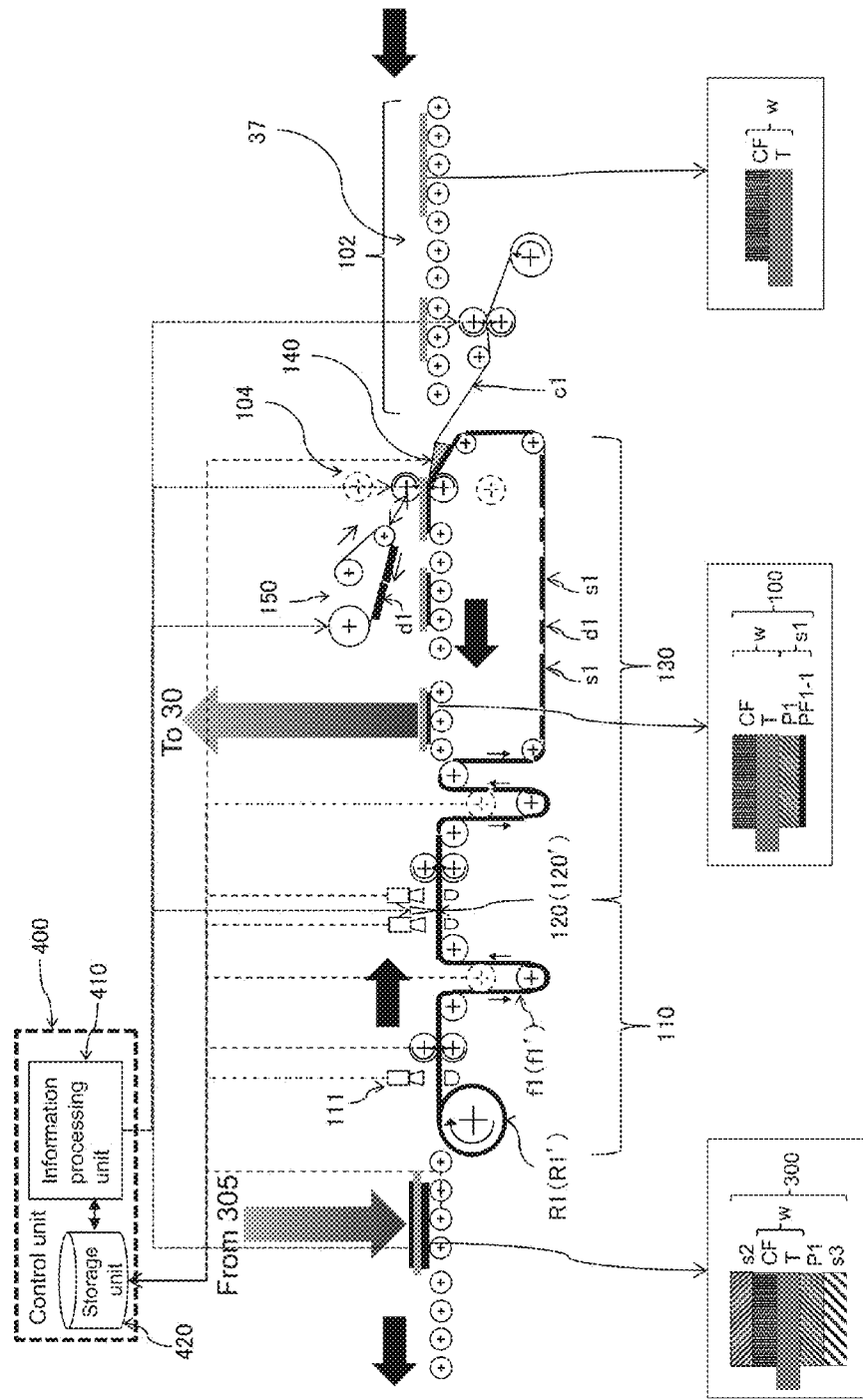
FIG. 30 shows a side view of a first channel of the lamination unit of FIG. 29.
Figure 31:
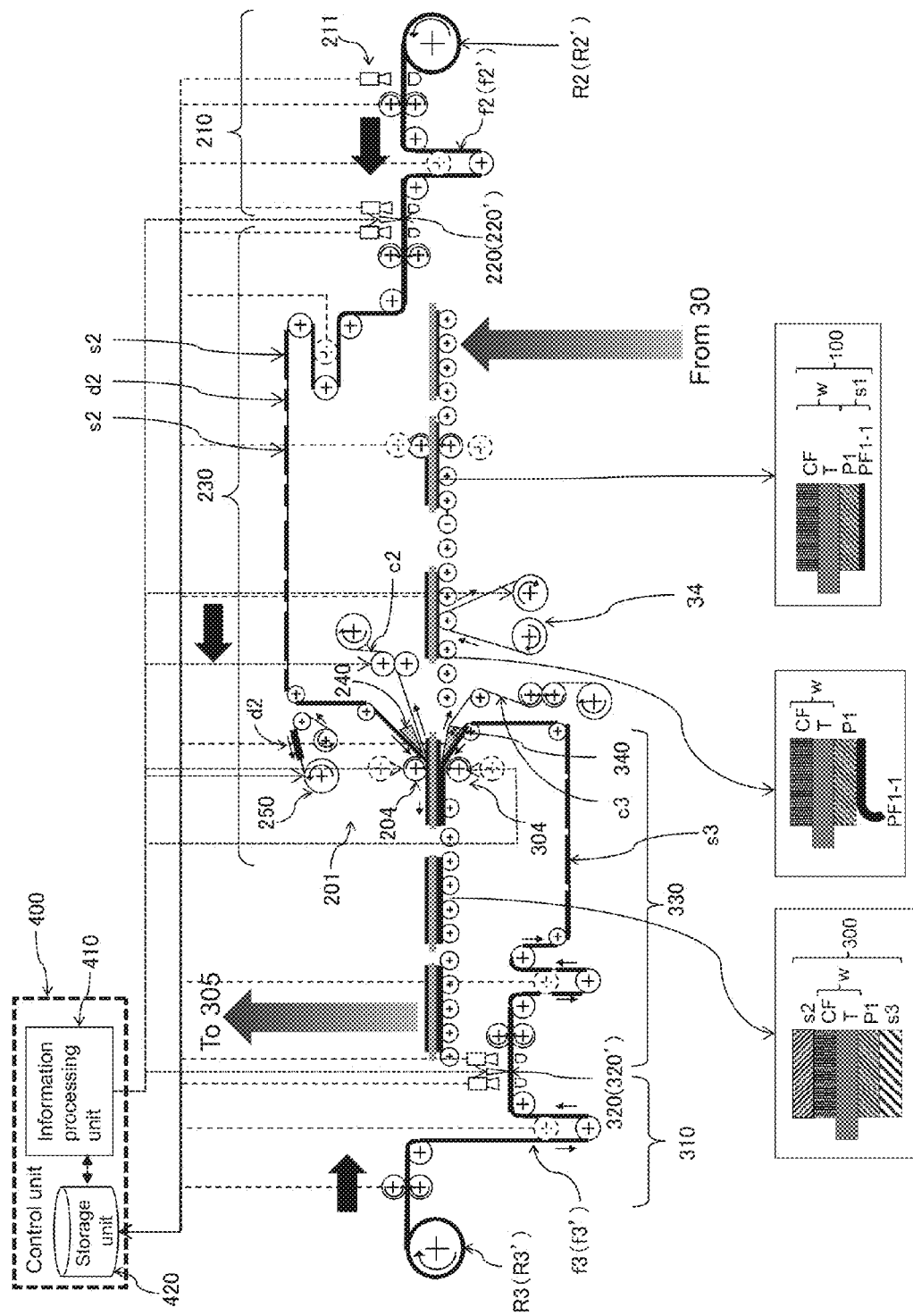
FIG. 31 shows a side view of a second channel of the lamination unit of FIG. 29.

FIG. 29 to FIG. 31 are a plan view showing a lamination unit 1 for implementing the present invention and side views of a first channel 10 and a second channel configuring the lamination unit 1.

Figure 32:
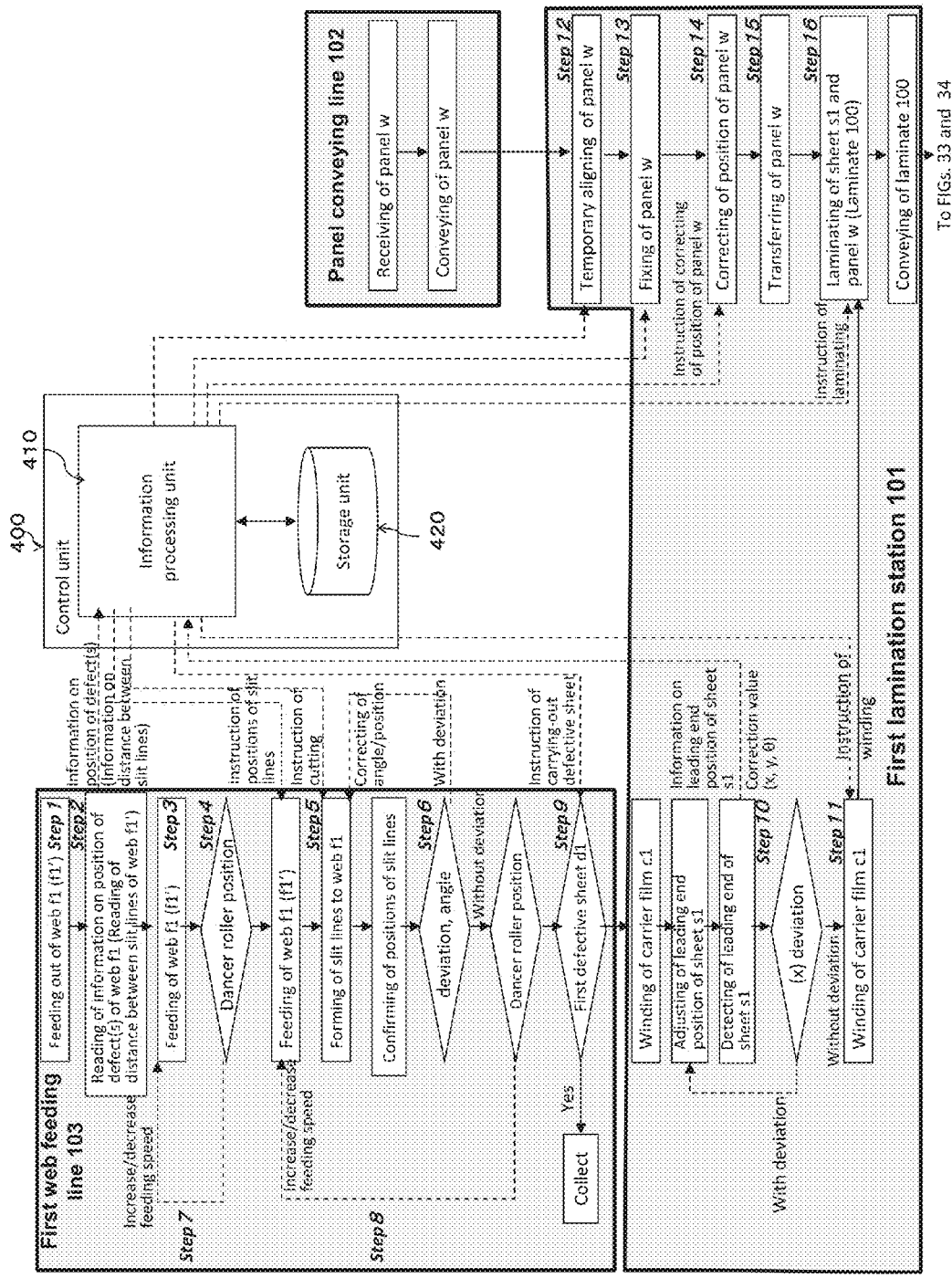
FIG. 32 shows a control flow of a step of separating first absorptive polarizing film sheets and a first defective sheet included in a first web of optical laminate or a first web of optical laminate with slit lines and a step of laminating separated first absorptive polarizing film sheets to a non-viewing side surface of liquid-crystal display panels in a lamination unit shown in FIG. 29.

FIG. 32 shows a control flow of a step of separating a first absorptive polarizing film sheet s1 included in a first web of optical laminate f1 or a first web of optical laminate with slit lines f1' to be laminated to a surface of a non-viewing side of a liquid-crystal display panel w and a first defective sheet d1 to be collected without laminating to the liquid-crystal display panel w, and a step of laminating the separated first absorptive polarizing film sheet s1 to the surface of the non-viewing side of the liquid-crystal display panel w to form a first intermediate laminate 100.

Figure 33:
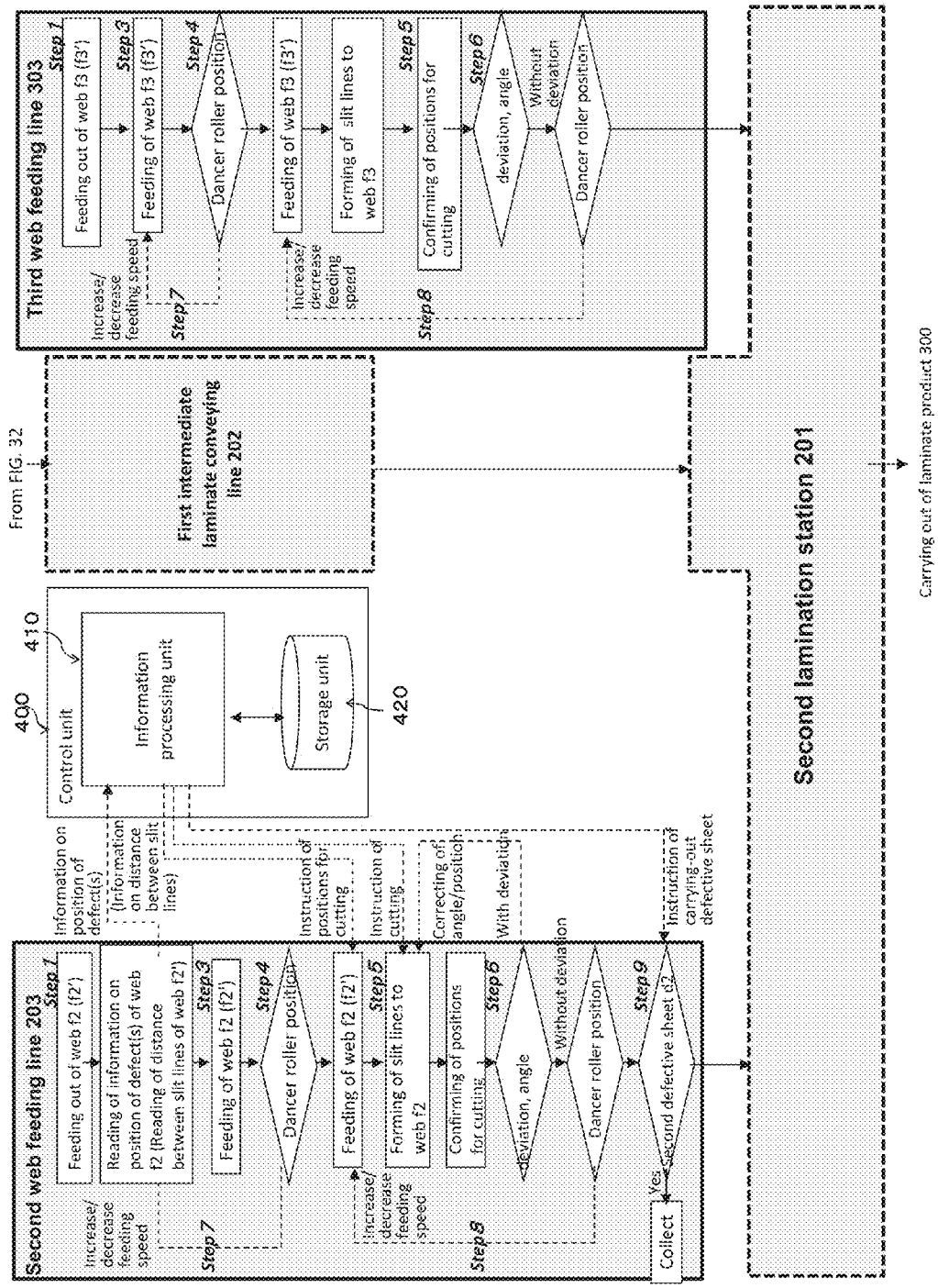
FIG. 33 shows a control flow of simultaneously performing a step of separating second absorptive polarizing film sheets and a second defective sheet included in a second web of optical laminate or a second web of optical laminate with slit lines to convey the second absorptive polarizing film sheets to a second lamination station and a step of conveying reflective polarizing film included in a third web of optical laminate or a third web of optical laminate with slit lines to the second lamination station in a lamination unit shown in FIG. 29.

FIG. 33 shows a control flow of, in the lamination unit 1, simultaneously performing a step of separating a second absorptive polarizing film sheet s2 included in a second web of optical laminate f2 or a second web of optical laminate with slit lines f2' to be laminated to a surface of a viewing side of a liquid-crystal display panel w and a second defective sheet d2 to be collected without laminating to the liquid-crystal display panel w, a step of conveying the separated second absorptive polarizing film sheet s2 to a second lamination station 201, and a step of conveying a a reflective polarizing film sheets s3 included in a third web optical laminate f3 or a third web of optical laminate with slit lines f3' to the second lamination station 201.

Figure 34:
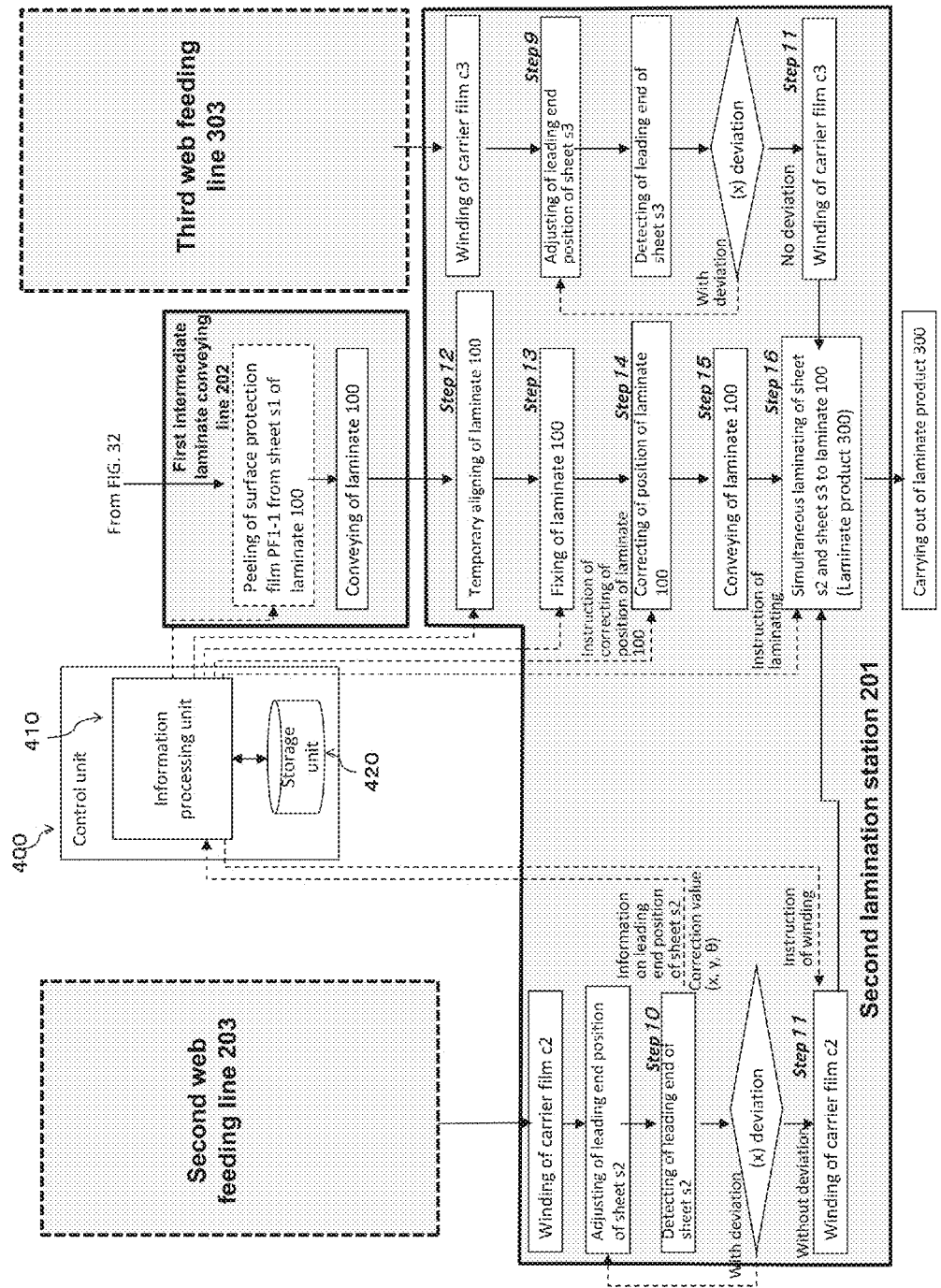
FIG. 34 shows a control flow of simultaneously performing a step of laminating separated second absorptive polarizing film sheets to a viewing side surface of liquid-crystal display panels and a step of laminating reflective polarizing film sheets included in a third web of optical laminate or a third web of optical laminate with slit lines to an exposed surface of first absorptive polarizing film sheets laminated to a non-viewing side of liquid-crystal display panels in a lamination unit shown in FIG. 29.

FIG. 34 shows a control flow of, in the second lamination station 201 in the lamination unit 1, simultaneously performing a step of laminating the separated second absorptive polarizing film sheet s2 to the surface of the viewing side of the liquid-crystal display panel w and a step f of overlappingly laminating the reflective polarizing film sheets s3 to an exposed surface of the first absorptive polarizing film sheet s1 on the non-viewing side of liquid-crystal display panel w.

As shown in FIG. 32, in a step of separating a first absorptive polarizing film sheet s1 configuring a first web of optical laminate f1 and a first defective sheet d1, an inspected first web of optical laminate f1 given with information on position of a defect is fed out into a first web feeding line 103 in step 1. Then, each of information on position of a defect is read in step 2. Positions of slit lines for the first absorptive polarizing film sheets s1 and positions of slit lines for the first defective sheets d1 are instructed in step 5. Positions of slit lines are adjusted in step 6 to step 8. A first slit line formation mechanism 120 shown in FIG. 30 starts operation based on the instructions.

Each of the sheets of the first web of optical laminate f1 is judged to be a first absorptive polarizing film sheet s1 or a first defective sheet d1 in step 9, and when a sheet is judged to be a first defective sheet d1, a first removing mechanism 150 operates to peel the first defective sheet d1 from a first carrier film c1 and collects the peeled first defective sheet d1 without laminating to the liquid-crystal display panel w. On the other hand, when a sheet is judged to be a first absorptive polarizing film sheet s1 in step 9, the first web of optical laminate f1 is further fed and conveyed to the first lamination station 101.

The first absorptive polarizing film sheets s1 in a state supported on the first carrier film c1 are peeled from the first carrier film c1 by operating a first peeling mechanism 140 and the first carrier film c1 is accordingly wound in the first lamination station 101 in step 11. The peeled first absorptive polarizing film sheets s1 are position-adjusted with respective ones of liquid-crystal display panels w conveyed via a panel conveying line 102 to the first lamination station 101 and then laminated to a surface of a non-viewing side of each of the liquid-crystal display panels w from underside thereof to form first intermediate laminates 100 in step 16.

On the other hand, as shown in FIG. 32, in a step of separating a first absorptive polarizing film sheet s1 configuring a first web of optical laminate with slit lines f1' and a first defective sheet d1, a first web of optical laminate with slit lines f1' given with information on positions of slit lines and on distance between longitudinal intervals of adjacent slit lines is fed out into a first web feeding line 103 in step 1. Then, the information on distance of longitudinal interval between adjacent slit lines, i.e. distance corresponding to a short side of a liquid-crystal display panels w is read in step 2. Feeding length and speed of the first web of optical laminate with slit lines f1' are adjusted in step 3, step 4 and step 7. The slit line position-reading mechanism 120' shown in FIG. 30 operates based on instructions of the feeding length and speed.

Each of the sheets of the first web of optical laminate with slit lines f1' is judged to be a first absorptive polarizing film sheet s1 or a first defective sheet d1 in step 9, and when a sheet is judged to be a first defective sheet d1, a first removing mechanism 150 operates to peel the first defective sheet d1 from a first carrier film c1 and collects the peeled first defective sheet d1 without laminating to the liquid-crystal display panel w. On the other hand, when a sheet is judged to be a first absorptive polarizing film sheet s1 in step 9, the first web of optical laminate with slit lines f1' is further fed and conveyed to the first lamination station 101.

The first absorptive polarizing film sheets s1 in a state supported on the first carrier film c1 are peeled from the first carrier film c1 by operating a first peeling mechanism 140 and the first carrier film c1 is accordingly wound in the first lamination station 101 in step 11. The peeled first absorptive polarizing film sheets s1 are position-adjusted with respective ones of liquid-crystal display panels w conveyed via a panel conveying line 102 to the first lamination station 101 and then laminated to a surface of a non-viewing side of each of the liquid-crystal display panels w from underside thereof to form first intermediate laminates 100 in step 16.

The first intermediate laminates 100 in this aspect of the present invention are rotated by 90° at a first channel-to-channel transfer part 30 shown in FIG. 29 and conveyed to a second lamination station 201. On the other hand, the second absorptive polarizing film sheet s2 to be laminated on a surface of viewing side of the liquid-crystal display panel w is conveyed to a second lamination station 201 in the following steps.

As shown in FIG. 3, in a step of separating a second absorptive polarizing film sheet s2 configuring a second web of optical laminate f2 and a second defective sheet d2, an inspected second web of optical laminate f2 given with information on position of a defect is fed out into a second web feeding line 203 in step 1. Then, each of information on position of a defect is read in step 2, as in the step in the first web feeding line 103. Positions of slit lines for the second absorptive polarizing film sheets s2 and positions of slit lines for the second defective sheets d2 are instructed in step 5. Positions of slit lines are adjusted in step 6 to step 8. A second slit line formation mechanism 220 shown in FIG. 31 starts operation based on the instructions.

Each of the sheets of the second web of optical laminate f2 is judged to be a second absorptive polarizing film sheet s2 or a second defective sheet d2 in step 9, and when a sheet is judged to be a second defective sheet d2, a second removing mechanism 250 operates to peel the second defective sheet d2 from a second carrier film c2 and collects the peeled second defective sheet d2 without laminating to a liquid-crystal display panel w. On the other hand, when a sheet is judged to be a second absorptive polarizing film sheet s2 in step 9, the second web of optical laminate f2 is further fed and conveyed to a third lamination station 301.

On the other hand, in a step of separating a second absorptive polarizing film sheet s2 and a second defective sheet d2 configuring a second web of optical laminate with slit lines f2' shown in FIG. 33, the second web of optical laminate with slit lines f2' given with information on positions of slit lines and on distance of longitudinal intervals between adjacent slit lines is fed to a second web feeding line 203 in step 1. Then, information on distance of each of longitudinal intervals, i.e. distance corresponding to a short side of a liquid-crystal display panels w is read in step 2. Feeding length and speed of the second web of optical laminate with slit lines f2' are adjusted in step 3, step 4 and step 7. A second slit line position-reading mechanism 220' shown in FIG. 31 starts operation based on the instructions.

Each of the sheets of the second web of optical laminate with slit lines f2' is judged to be a second absorptive polarizing film sheet s2 or a second defective sheet d2 in step 9, and when a sheet is judged to be a second defective sheet d2, a second removing mechanism 250 operates to peel the second defective sheet d2 from a second carrier film c2 and collects the peeled second defective sheet d2 without laminating to a liquid-crystal display panel w. On the other hand, when a sheet is judged to be a second absorptive polarizing film sheet s2 in step 9, the second web of optical laminate with slit lines f2' is further fed and conveyed to a second lamination station 201.

A reflective polarizing film sheet s3 to be laminated to an exposed surface, opposite to a liquid-crystal display panel w, of a first absorptive polarizing film sheet s1 on a non-viewing side of a liquid-crystal display panel w configuring a first intermediate laminate 100 is conveyed to a second lamination station 201 in synchronization with conveying a second absorptive polarizing film sheet s2 in the following steps.

As shown in FIG. 27, the first intermediate laminates 100 are rotated by 90° at a first channel-to-channel transfer part 30 and conveyed from the first lamination station 101 to the second lamination station 201. On the other hand, in a step of overlappingly laminating a reflective polarizing film sheet s3 to an exposed surface, opposite to a liquid-crystal display panel w, of a first absorptive polarizing film sheet s1 on a non-viewing side of a liquid-crystal display panel w configuring the first intermediate laminate 100, a third web of optical laminate f3 is fed in a third web feeding line 303 in step 1. Then, feed length of the third web of optical laminate f3 is adjusted and positions of slit lines for reflective polarizing film sheets s3 are then instructed in step 3 and step 4. A third slit line formation mechanism 320 shown in FIG. 31 starts operation based on the instructions in step 5. The third slit line formation mechanism 320 is operated to confirm positions of slit lines formed in a third carrier film c3 and the third web of optical laminate f3 is conveyed to the second lamination station 201 in step 6 to step 8.

On the other hand, as shown in FIG. 33, in a step of overlappingly laminating a reflective polarizing film sheet s3 included in a third web of optical laminate with slit lines f3' to an exposed surface, opposite to a liquid-crystal display panel w, of a first absorptive polarizing film sheet s1 on a non-viewing side of the liquid-crystal display panel w configuring the first intermediate laminate 100, a third web of optical laminate with slit lines f3' is fed in a third web feeding line 303 in step 1. Then, feed length and speed of the third web of optical laminate with slit lines f3' are adjusted and accordingly the third web of optical laminate with slit lines f3' is further fed and conveyed to the second lamination station 201 in step 3, step 4 and step 7. A third slit line position-reading mechanism 320' shown in FIG. 31 operates based on the instructions.

In the second lamination station 201 configuring the lamination unit 1, as shown in FIG. 31 and FIG. 34, a step of laminating the second absorptive polarizing film sheet s2 separated in the second web feeding line 203 is laminated to the surface of the viewing side of the liquid-crystal display panel w from topside thereof and a step of overlappingly laminating the reflective polarizing film sheet s3 fed from the third web feeding line 303 to an exposed surface of the first absorptive polarizing film sheet s1 on the non-viewing side of the liquid-crystal display panel w from underside thereof are simultaneously performed.

In particular, on one hand, in a step of laminating the second absorptive polarizing film sheets s2 in a state supported on the second carrier film c2 to the surface of the viewing side of the liquid-crystal display panel w, the second absorptive polarizing film sheets s2 are peeled from the second carrier film c2 by operating a second peeling mechanism 240 shown in FIG. 31 and the second carrier film c2 is accordingly wound in the second lamination station 201 in step 11. The peeled second absorptive polarizing film sheets s2 are position-adjusted with respective ones of liquid-crystal display panels w conveyed to the second lamination station 201 and then laminated to the surface of the viewing side of respective ones of the liquid-crystal display panels w from topside thereof in step 16.

Simultaneously, the reflective polarizing film sheets s3 in a state supported on a third carrier film c3 are peeled from the third carrier film c3 and the peeled reflective polarizing film sheets s3 are overlappingly laminated to an exposed surface of respective ones of the first absorptive polarizing film sheets s1 on the non-viewing side of the liquid-crystal display panels w from underside thereof.

As shown in FIG. 34, in the second lamination station 201, the peeling mechanism 340 shown in FIG. 31 is operated to peel the reflective polarizing film sheets s3 from the third carrier film c3 and to accordingly wind the third carrier film c3, and the peeled reflective polarizing film sheets s3 are overlapplingly laminated to a surface of respective ones of the first absorptive polarizing film sheets s1 on the non-viewing side of the liquid-crystal display panels w from underside thereof to complete laminate products 300.

On the other hand, in a step of laminating the second absorptive polarizing film sheets s2 in a state supported on the second carrier film c2 configuring the second web of optical laminate with slit lines f2' to the surface of the viewing side of the liquid-crystal display panel w, the second absorptive polarizing film sheets s2 are peeled from the second carrier film c2 by operating a second peeling mechanism 240 shown in FIG. 31 and the second carrier film c2 is accordingly wound in the second lamination station 201 in step 11. The peeled second absorptive polarizing film sheets s2 are position-adjusted with respective ones of liquid-crystal display panels w conveyed to the second lamination station 201 and then laminated to the surface of the viewing side of respective ones of the liquid-crystal display panels w from topside thereof in step 16.

Simultaneously, the reflective polarizing film sheets s3 in a state supported on the third carrier film c3 are peeled from a third carrier film c3 and the peeled reflective polarizing film sheets s3 are overlappingly laminated to an exposed surface of respective ones of the first absorptive polarizing film sheets s1 on the non-viewing side of the liquid-crystal display panels w from underside thereof to form the laminate products 300.

The second lamination station 201 configuring this lamination unit 1 also serves as the third lamination station 301 of the above described lamination unit 1. As shown in FIG. 31, a second web feeding line 203 is arranged in one end and a third web feeding line 303 is arranged in the other end of the second channel 20 including the second lamination station 201.

In this aspect of the present invention, the laminate products 300 are completed in the second lamination station 201 by, as shown in FIG. 31, simultaneously laminating the second absorptive polarizing film sheets s2 on the viewing side of the liquid-crystal display panels w from topside thereof with a second laminating means 204 and the reflective polarizing film sheets s3 to the surface of respective ones of the first absorptive polarizing film sheets s1 on the non-viewing side of the liquid-crystal display panels w from underside thereof with a third laminating means.

In the lamination unit 1, when using a first web of optical laminate f1 or a first web of optical laminate with slit lines f1' in which a first surface protection film is laminated via an adhesive layer to a first absorptive polarizing film sheet s1, before laminating a reflective polarizing film sheet s3 to a first intermediate laminate 100 by the second laminating means 204 in the second lamination station 201, a surface protection film needs to be peeled from the first absorptive polarizing film sheet s1 integrally with the adhesive layer and a surface, opposite to a liquid-crystal display panel w, of the first absorptive polarizing film sheet s1 needs to be exposed. As shown in FIG. 31, it is preferable that a peeling means 34 therefor is appropriately deployed in a first intermediate laminate conveying line 202 on upstream side of the second lamination station 201 with respect to conveying direction.

Embodiment 5

A further technical problem to be solved by the present invention is to provide a method for manufacturing a liquid-crystal display device in which an overlapping structure of a reflective polarizing film sheet s3 overlappingly laminated to a first absorptive polarizing film sheet s1 laminated to a non-viewing side of a liquid-crystal display panel w is appropriately formed so as an adhesive layer of the reflective polarizing film sheet s3 is not exposed due to irregularity of sizes of the reflective polarizing film sheet s3 and the first absorptive polarizing film sheet s1.

Another embodiment of the present invention provides a method for solving a technical problem which occurs in an overlapping structure of a reflective polarizing film sheet s3 and a first absorptive polarizing film sheet s1 formed on a non-viewing side of a liquid-crystal display panel w due to irregularity of roll width of each of a first web of optical laminate f1 and a third web of optical laminate f3 used as a pair or a set, when continuously executing three stages of laminating steps of: feeding a first web of optical laminate f1 and laminating a first absorptive polarizing film sheet s1 to a surface on a non-viewing side of a liquid-crystal display panel w; followed by feeding a second web of optical laminate f2 and laminating a second absorptive polarizing film sheet s2 to a surface on a viewing side of the liquid-crystal display panel w in an orientation in which transmission axes of the sheets s1, s2 are orthogonal to each other; while feeding a third web of optical laminate f3 and overlappingly laminating a reflective polarizing film sheet s3 to an exposed surface of the first absorptive polarizing film sheet s1 laminated to the surface on the non-viewing side of the liquid-crystal display panel w, the exposed surface being opposite with respect to the -viewing side of a liquid-crystal display panel w to form the overlapping structure of the reflective polarizing film sheet s3 and the first absorptive polarizing film sheet s1 on the non-viewing side of the liquid-crystal display panel w.

More in particular, for example, a first absorptive polarizing film sheet s1 for forming an overlapping structure is sized to have a width corresponding to a long side A of a liquid-crystal display panel w and a length corresponding to a short side B of the liquid-crystal display panel w. On the other hand, a reflective polarizing film sheet s3 is sized to have a width corresponding to the short side B of the liquid-crystal display panel w and a length corresponding to the long side A of the liquid-crystal display panel w. In a continuous step, the first absorptive polarizing film sheet s1 cut out from the first web of optical laminate f1 is laminated to the surface on the non-viewing side of the liquid-crystal display panel w being conveyed, then the liquid-crystal display panel w being conveyed is rotated by 90° and the reflective polarizing film sheet s3 cut out from the third web of optical laminate f3 is overlappingly laminated to the first absorptive polarizing film sheet s1 to form the overlapping structure on the non-viewing side of the liquid-crystal display panel w configuring a liquid-crystal display device. Longitudinal length in conveying direction of the first absorptive polarizing film sheet s1 cut out from the first web of optical laminate f1 or the reflective polarizing film sheet s3 cut out from the third web of optical laminate f3 may be determined by controlling each distance between adjacent slit lines formed in each of the first web of optical laminate f1 and the third web of optical laminate f3. However, a width-wise size with respect to the conveying direction of the first absorptive polarizing film sheet s1 or the reflective polarizing film sheet s3 may not be controlled in the lamination unit 1 due to irregular width of each of premanufactured rolls of the first web of optical laminate f1 and the third web of optical laminate f3. Thus, when a size of a reflective polarizing film sheet s3 is larger than that of a first absorptive polarizing film sheet s1, an adhesive layer of the reflective polarizing film sheet s3 is exposed to a non-viewing side of a liquid-crystal display panel w to cause a problem to performance of a liquid-crystal display device.

Thus, another embodiment of the present invention is to provide a method for manufacturing a liquid-crystal display device, the method comprising: using a first web of optical laminate f1 and a third web of optical laminate f3 as a pair or a set with different widths; measuring width of each of the first web of optical laminate f1 and the third web of optical laminate f3 fed out, respectively, from a first roll R1 and a third roll R3 mounted in a first channel and a second channel of a lamination unit 1 and storing each of measured widths in a storage unit 420 as a width a1 and a width b1; and controlling a distance between adjacent slit lines formed in the first web of optical laminate f1 and the third web of optical laminate f3 such that the measured width a1 of the first web of optical laminate f1 to be a length a1 of the third web of optical laminate f3 in conveying direction and the measured width b1 of the third web of optical laminate f3 to be a length b1 of the first web of optical laminate f1 in conveying direction. The above will be described based on FIG. 35 to FIG. 40 in the following.

Figure 35:
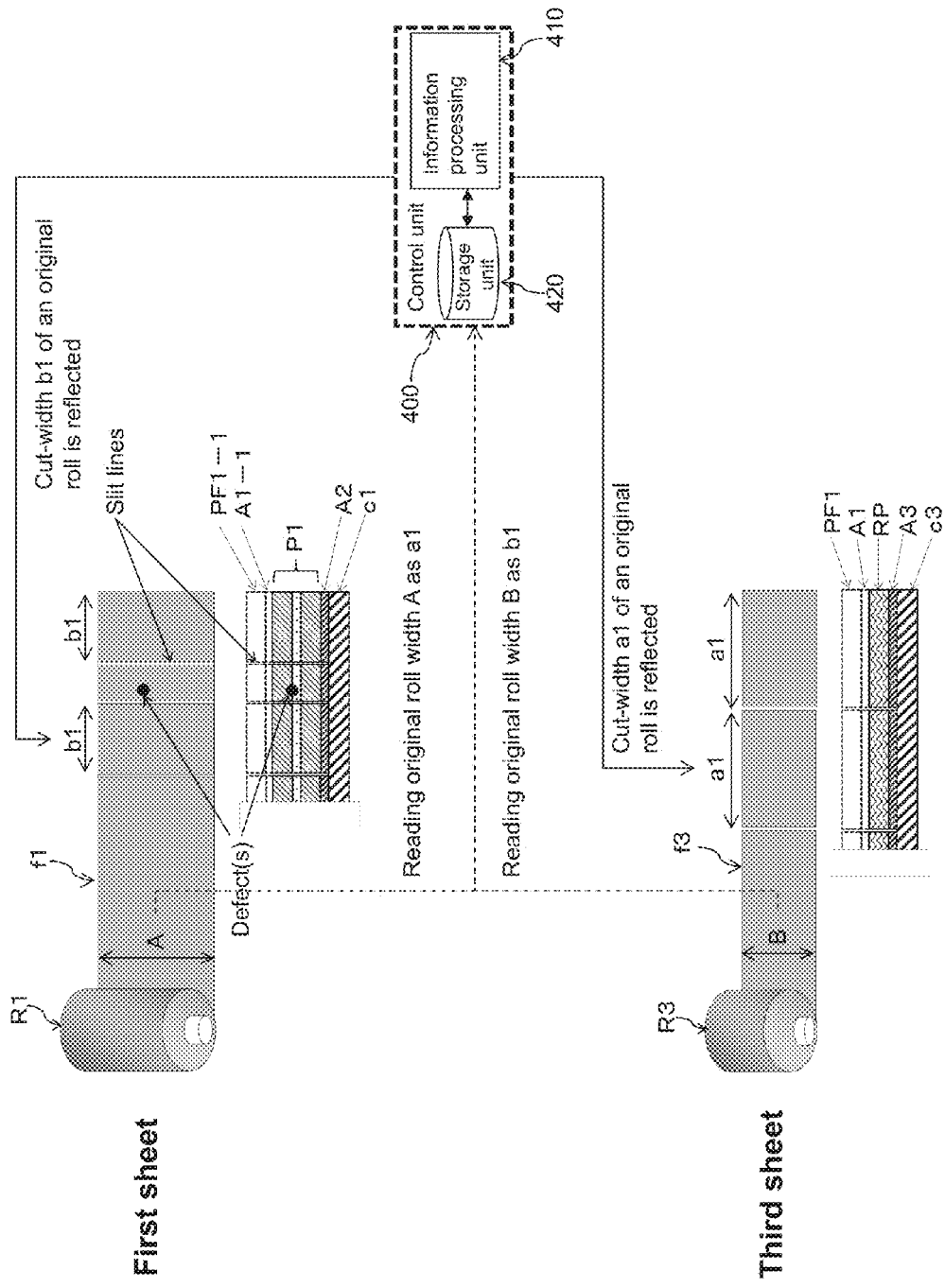
FIG. 35 is a schematic view showing a part of a control flow of performing a step of forming respective ones of identically- or analogously-shaped first absorptive polarizing film sheets and reflective polarizing film sheets by controlling lengths of adjacent slit lines formed in widthwise direction of a first web of optical laminate and a third web of optical laminate fed respectively from a first roll and a third roll which have different widths from each other in a step of forming a superimposed structure on a non-viewing side of a liquid-crystal display panel by sequentially laminating first absorptive polarizing film sheets and reflective polarizing film sheets in a lamination unit used in one or other embodiment of the present invention.
Figure 36:
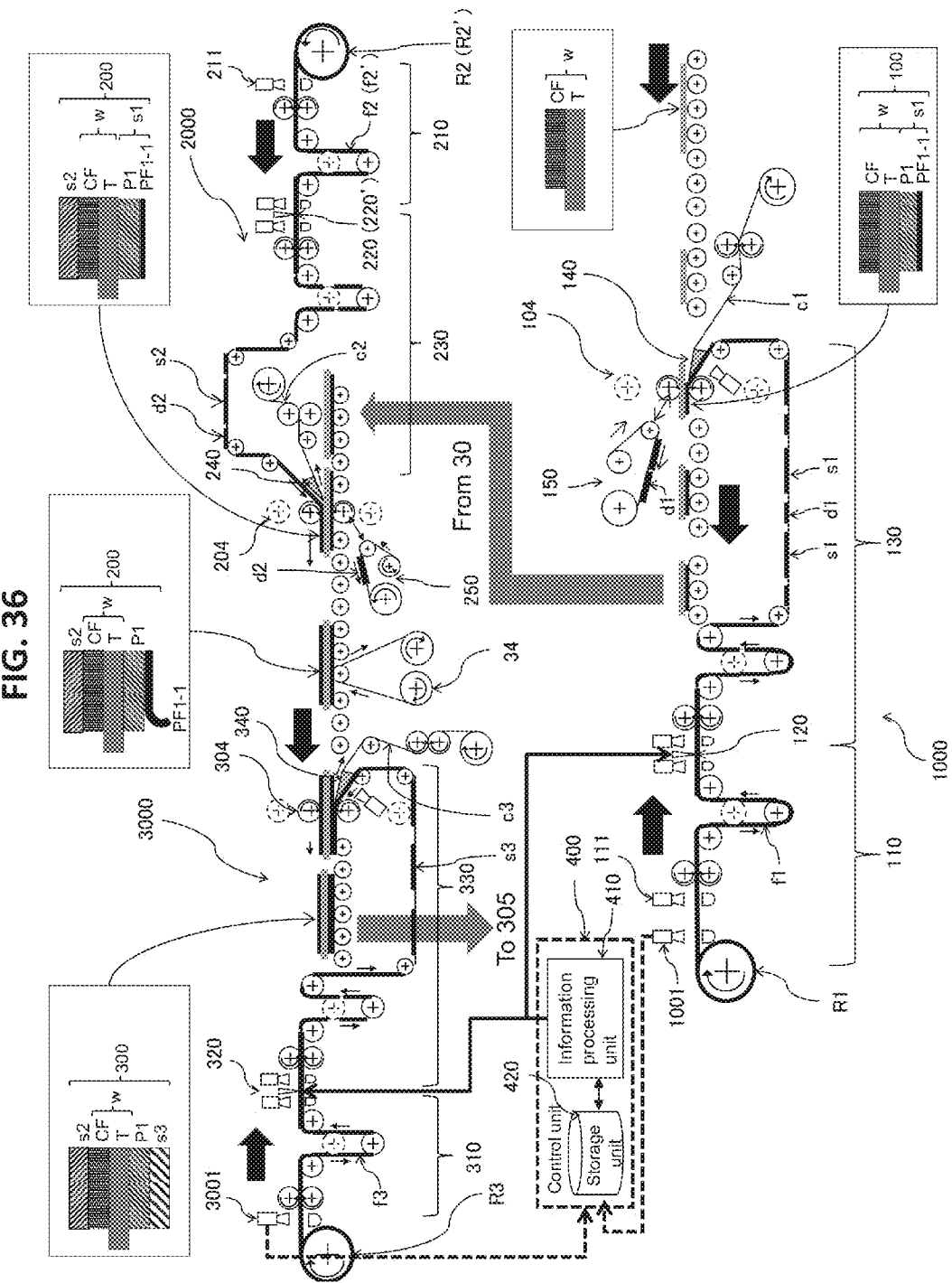
FIG. 36 is a side view of each of steps including a step of lamination to a liquid-crystal display panel in a first channel configuring a first conveying line 1000 for forming a first intermediate laminate and a second channel including a second conveying line 2000 for forming a second intermediate laminate and a third conveying line 3000 for completing a laminated product.

As shown in FIG. 35 and FIG. 36, a first roll R1 of a first optical laminate f1, the roll being mounted in a first conveying line 1000 of a lamination unit 1, having a width corresponding to a long side A of a liquid-crystal display panel w, continuously extending in a longitudinal direction and to which a first absorptive polarizing film P1 with a transmission axis orthogonal to the longitudinal direction is laminated via an adhesive layer at least to a first carrier film c1, and, a third roll R3 of a third web of optical laminate f3, the roll being mounted in a third conveying line 3000 of the lamination unit 1, having a width corresponding to a short side B of the liquid-crystal display panel w, continuously extending in the longitudinal direction and to which a reflective polarizing film RP with a transmission axis in the longitudinal direction is laminated via an adhesive layer at least to a third carrier film c3, are prepared in this embodiment. As will be described later, a second web of optical laminate f2 (f2') used in Embodiment 1 may be used as a second roll with a width corresponding to a short side B of the liquid-crystal display panel w, which is to be mounted in a second conveying line 2000 of the lamination unit 1.

As shown in FIG. 35 to FIG. 38, the embodiment comprises a storing step of: feeding a first web of optical laminate f1 from a first roll R1 mounted in a first conveying line 1000 and measuring a width thereof to store the measured width in a storage unit 420 as a width a1; and feeding a third web of optical laminate f3 from a third roll R3 mounted in a third conveying line 3000 and measuring a width thereof to store the measured width in a storage unit 420 as a width b1.

Figure 37:
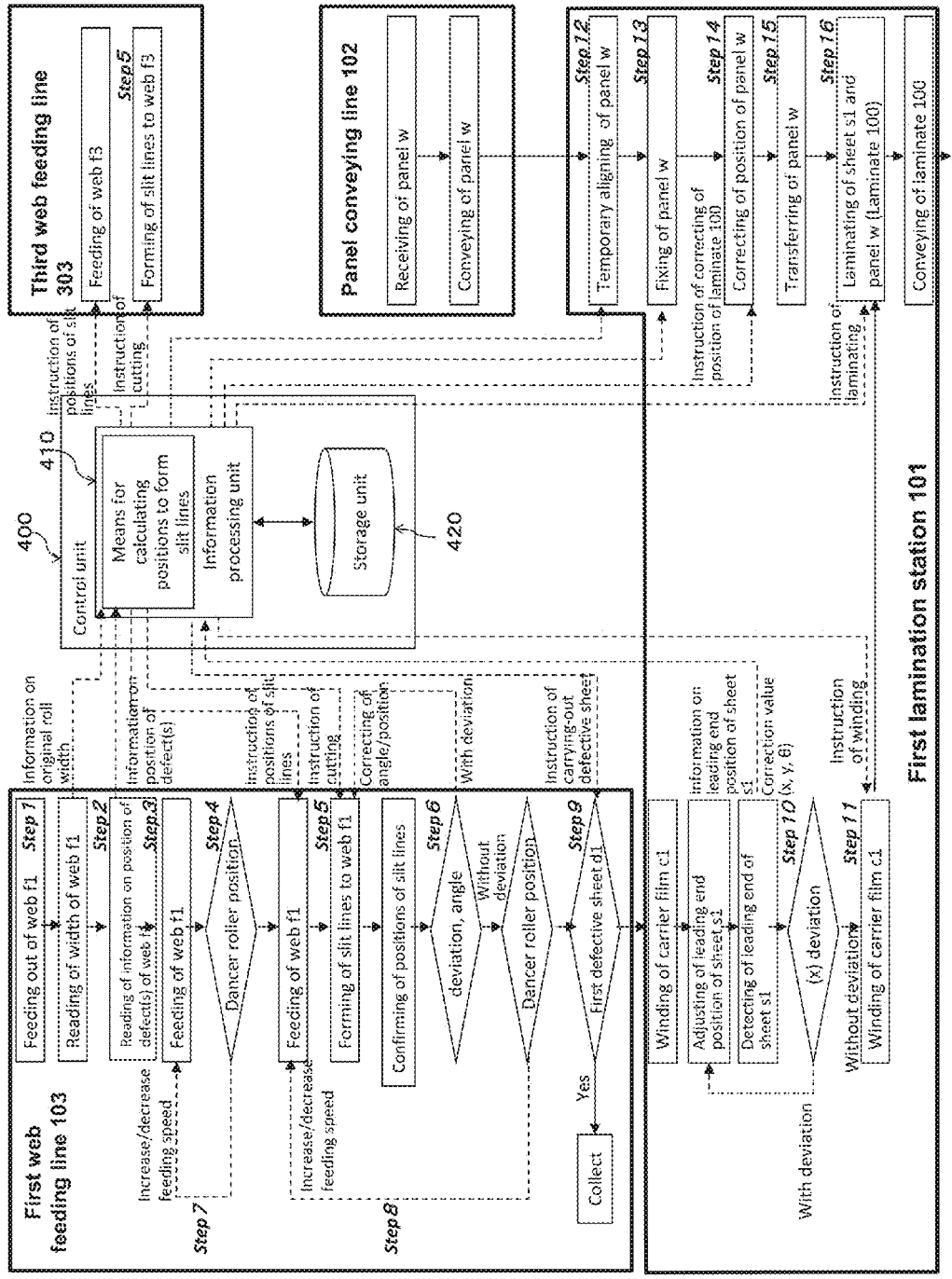
FIG. 37 is a flow diagram of controlling each of steps configuring a first conveying line 1000 in a first channel of a lamination unit shown in FIG. 36.

As shown in FIG. 36 and FIG. 37, the embodiment further comprises a first laminating step in a first conveying line 1000, more particularly, the first laminating step comprising: forming slit lines in a first web of optical laminate f1 fed from a first roll R1 from a surface opposite to a first carrier film c1 to a depth reaching to a surface of the first carrier film c1 to form thereon a first laminate PL1 comprising at least a first absorptive polarizing film sheet s1 including an adhesive layer, the first laminate PL1 being formed between respective ones of the adjacent slit lines in the longitudinal direction and having a length pre-sized as not less than the measured width b1; peeling the first laminate PL1 from first carrier film c1; and laminating the first laminate PL1 comprising the first absorptive polarizing film sheet s1 via an exposed adhesive layer to a surface on a non-viewing side of the liquid-crystal display panel w.

A size not less than the measured width b1 is a size which a longitudinal length thereof is same as or greater than the measured width b1 of the third roll R3. Thus, the first absorptive polarizing film sheet s1 including an adhesive layer takes a shape of longitudinally rectangle having a size which a width thereof orthogonal to the longitudinal direction is the measured width a1 of the first roll R1 and a length thereof in the longitudinal direction is equal to or greater than the measured width b1 of the third roll R3.

Figure 38:
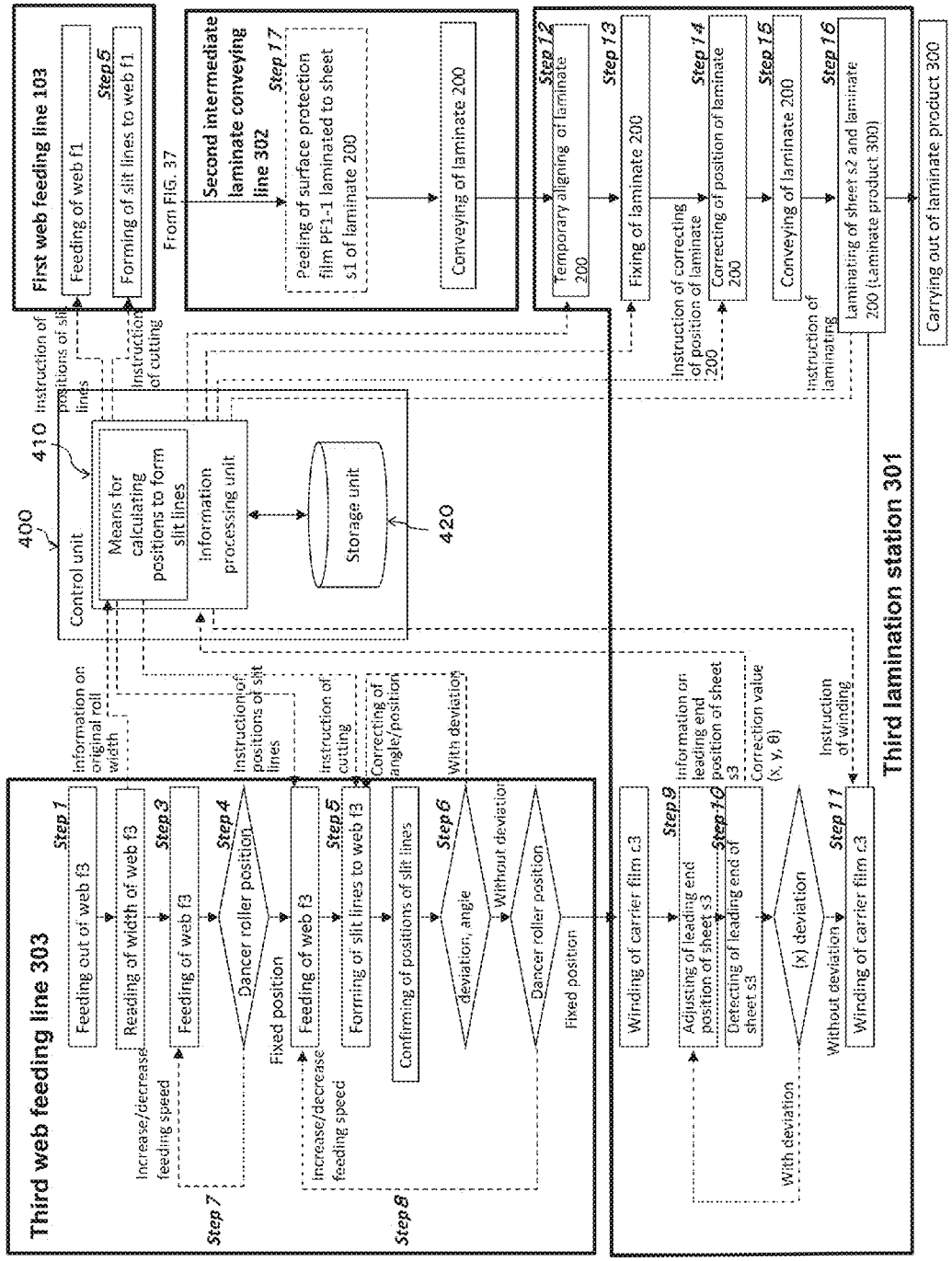
FIG. 38 is a flow of controlling each of steps configuring a third conveying line 3000 in a second channel of a lamination unit shown in FIG. 36.

As shown in FIG. 36 and FIG. 38, the embodiment yet further comprises a third laminating step in a third conveying line 3000, more particularly, the third laminating step comprising: forming slit lines in a third web of optical laminate f3 fed from a third roll R3 from a surface opposite to a third carrier film c3 to a depth reaching to a surface of the third carrier film c3 to form thereon a third laminate RL comprising at least a reflective polarizing film sheet s3 including an adhesive layer, the third laminate RL being formed between respective ones of the adjacent slit lines in the longitudinal direction and having a length pre-sized as no greater than the measured width a1; peeling the third laminate RL from the third carrier film c3; and laminating the third laminate RL comprising the reflective polarizing film sheet s3 via an exposed adhesive layer to a surface, opposite to the liquid-crystal display panel w, of the first absorptive polarizing film sheet s1 laminated on the non-viewing side of the liquid-crystal display panel w such that transmission axes of the reflective polarizing film sheet s3 and the first absorptive polarizing film sheet s1 are parallel to each other.

A size which is not greater than the measured width a1 is a size which a longitudinal length thereof is same as or greater than the measured width a1 of the first roll R1. Thus, the reflective polarizing film sheet s3 including an adhesive layer takes a shape of transversely rectangle having a size of which a width thereof orthogonal to the longitudinal direction is the measured width b1 of the third roll R3 and a length thereof in the longitudinal direction is equal to or less than the measured width a1 of the first roll R1.

An overlapping structure formed on a non-viewing side of a liquid-crystal display panel w according to the present embodiment is structured as that a rectangular reflective polarizing film sheet s3 with a size which a long side thereof is smaller than a1 ($\leq$a1) and a short side thereof being equal to b1 is overlapplingly laminated via an adhesive layer to a rectangular reflective polarizing film sheet s3 with a size which a long side thereof being equal to a1 and a short side being greater than b1 ($\geq$b1). It is clear that, as long as a vertical center line and a horizontal center line match on the non-viewing side of the liquid-crystal display panel w, it is possible to form an overlapping structure so that an adhesive layer of the reflective polarizing film sheet s3 is not exposed off from the first absorptive polarizing film sheet s1.

As one embodiment of the present invention, the first laminating step may comprise a peeling step comprising: preparing a first roll R1 of a first web of optical laminate f1 having at least a first surface protection film PF1 laminated via an adhesive layer to a surface opposite to a first carrier film c1 of a first absorptive polarizing film P1; forming a first laminate PL1 between respective ones of longitudinally adjacent slit lines on the first carrier film c1 of the first web of optical laminate f1 being fed in a first conveying line 1000; peeling the first laminate PL1 from the first carrier film c1; and, when the first laminate PL1 is laminated via an exposed adhesive layer to a surface on the non-viewing side of the liquid-crystal display panel w, peeling from the first laminate PL1 the first surface protection film sheet including the adhesive layer integrally formed with the first absorptive polarizing film sheet s1.

As another embodiment of the present invention, the third laminating step may be a step comprising: preparing a third roll R3 of a third web of optical laminate f3 having at least a third surface protection film PF3 laminated via an adhesive layer to a surface opposite to a third carrier film c3 of a reflective polarizing film RP; forming a third laminate PL3 between respective ones of longitudinally adjacent slit lines on the third carrier film c3 of the third web of optical laminate f3 being fed in a third conveying line 3000; peeling the third laminate PL3 from the third carrier film c3; and laminating the third laminate PL3 comprising the third surface protection film PF3 including an adhesive layer and integrally formed with a reflective polarizing film sheet s3 via the adhesive layer to an exposed surface of the first absorptive polarizing film sheet s1.

As yet another embodiment of the present invention, the first laminating step may comprise a defective sheet removing step comprising: detecting in advance a defect or defects inherent in a first absorptive polarizing film P1 including an adhesive layer and configuring a first web of optical laminate f1; while forming a first laminate PL1 on a first carrier film c3 by forming slit lines from a surface opposite to the first carrier film c1 in the first web of optical laminate f1 fed from the first roll R1 to a depth reaching to the surface of the first carrier film c1, if a defect d is present in the first absorptive polarizing film P1 including an adhesive layer and configuring a first web of optical laminate f1, forming a slit line on upstream side of the defect or defects at a position with a predetermined distance from the defect or defects and determining a sheet formed between the formed slit line and a slit line on immediately downstream side of the formed slit line as a first defective sheet; and removing the defective sheet d1 from the first conveying line 1000 of the lamination unit 1 without laminating to a liquid-crystal display panel w.

In Embodiment 5, a first web of optical laminate f1 comprising a first absorptive polarizing film PL1 without slit lines shown in FIG. 1 and a third web of optical laminate f3 comprising a reflective polarizing film RP are continuously fed out, respectively, from a first roll R1 and a third roll R3 for use in a lamination unit 1 shown in FIG. 5, a first laminate PL1 and a third laminate PL3 are formed, respectively, on a first carrier film c1 and a third carrier film c3 in a first conveying line 1000 and a third conveying line 3000, the first laminate PL1 is laminated to a non-viewing side of a liquid-crystal display panel w being conveyed, the third laminate PL3 is laminated such that a reflective polarizing film sheet s3 overlaps to an exposed surface of a first absorptive polarizing film sheet s1 included in the first laminate PL1 while a second web of optical laminate f2 (f2') is continuously fed from a second roll R2 of a same form as used in Embodiment 1, a second laminate PL2 formed on a second carrier film c2 is laminated to a viewing side of the liquid-crystal display panel w being conveyed in a corresponding second conveying line 2000 to form a second intermediate laminate to finally complete a laminate product. FIG. 5 and FIG. 36 show detail of the above steps.

One variation of Embodiment 5 is characterized in that a first web of optical laminate f1 and a third web of optical laminate f3 having at least different widths are used as a pair or a set so that an overlapping structure of a reflective polarizing film sheet s3 and a first absorptive polarizing film sheet s1 on the non-viewing side of the liquid-crystal display panel w is appropriate. Thus, a size of the second laminate PL2 comprising a second absorptive polarizing film sheet s2 to be laminated to a viewing side of the liquid-crystal display panel w may be controlled by a distance between adjacent slit lines formed on a second web of optical laminate f2 comprising a second absorptive polarizing film PL2 without slit lines shown in FIG. 1 in the second conveying line as in the third conveying line. However, since the viewing side of the liquid-crystal display panel w does not need any overlapping structure like on the non-viewing side, the second laminate PL2 may be formed based on a size of a liquid-crystal display panel w i.e. a long side A and a short side B of a liquid-crystal display panel w.

A lamination unit 1 for implementing Embodiment 5 comprises a first channel 10 and a second channel 20 which are adjacent, parallel and straight, as shown in FIG. 5 and FIG. 36. The first channel 10 configures a first conveying line 1000 and comprises: a first lamination station 101 consisting of a carry-in table with a predetermined width provided at a location with a predetermined distance from one end of the first channel 10, a first laminating means 104 and a carry-out table; a panel conveying line 102 with a carry-in part with a same width as the carry-in table configured to convey a liquid-crystal display panel w in the first lamination station 101; and a first web feeding line 103, arranged on an opposite side of the first lamination station 101 with respect to the panel conveying line 102, for feeding a first web of optical laminate f1 comprising a first absorptive polarizing film P1 to the first lamination station 101.

As shown in FIG. 36, a rectangular-shaped liquid-crystal display panel w carried into the panel conveying line 102 is conveyed as a short side thereof being orthogonal to a conveying direction and a non-viewing side thereof facing downward. When a liquid-crystal display panel w is conveying with its short side orthogonal to a conveying direction, it is preferable to rotate the liquid-crystal display panel w by 90° with a rotating means to carry into the panel conveying line 102. A first web feeding line 103 comprises a first web feeding mechanism 110 and a first slit line formation mechanism 120. The first web feeding mechanism 110 operates to feed a first web of optical laminate f1 comprising a first absorptive polarizing film sheet s1 to be laminated to a non-viewing side of a liquid-crystal display panel w and a first carrier film c1 from a first roll R1 of the first web of optical laminate f1, and further operates to activate a first measuring unit 1001 to measure a width of the first web of optical laminate f1 being fed and to store the measured width to a storage unit 420 as a width a1. The width a1 of the first roll R1 may be measured and stored in the storage unit 420 in advance. In this case, the first measuring unit 1001 is not deployed in the first web feeding mechanism 110.

The first slit line formation mechanism 120 operates to form adjacent slit lines in a conveying direction on a first carrier film c1 at an interval preset as a size not less than a width b1 stored in the storage unit 420 to form a first laminate PL1 at least comprising a first absorptive polarizing film sheet s1 including an adhesive layer, in which the width b1 is a measured width of a third web of optical laminate f3 fed from a third roll R3 mounted on a third conveying line 3000.

As in the lamination unit 1 of Embodiment 1, the first web feeding line 103 comprises a first conveying mechanism 130 and a first peeling mechanism 140 on downstream side in a conveying direction of the first slit line formation mechanism 120. The first conveying mechanism 130 conveys a first absorptive polarizing film sheet P1 supported on a first carrier film c1 to a first lamination station 101. A first removing mechanism 150 which operates in coordination with the first peeling mechanism 140 for peeling the first absorptive polarizing film sheet s1 from the first carrier film c1 may be deployed in the first lamination station 101. The first removing mechanism 150 operates to remove a defective sheet d1 supported on the first carrier film c1 without laminating to a liquid-crystal display panel w. The first web feeding line 103 comprises, but not limited to, a first web feeding mechanism 110 for feeding a first web of optical laminate f1 from a first roll R1 as well as for operating a first measuring unit 1001, a first slit line formation mechanism 120, a first conveying mechanism 130 and a first peeling mechanism 140 arranged along a straight channel. Needless to say, when a width of the first roll R1 is measured in advance, a first measuring unit 1001 is not deployed in the first web feeding mechanism 110.

The first absorptive polarizing film sheet s1 is peeled from the first carrier film c1 and then laminated to a surface on the non-viewing side of the liquid-crystal display panel w by the first laminating means 104 in the first lamination station 101 to form a first intermediate laminate 100. The first intermediate laminate 100 is configured as the first absorptive polarizing film sheet s1 laminated to the non-viewing side of the liquid-crystal display panel w which a thin-film transistor T arranged thereon. The first intermediate laminate 100 is conveyed to a second lamination station 201. A channel for conveying the first intermediate laminate 100 from the first lamination station 101 to the second lamination station 201 is formed in a first channel-to-channel transfer part 30 as shown in FIG. 5.

As in Embodiment 1, a first channel-to-channel transfer part 30 is arranged such that it receives the first intermediate laminate 100 at the first lamination station 101 and transfers it toward a second channel 20 to pass to a carry-in table of the second lamination station 201. The second channel 20 configures a second conveying line 2000. As shown in FIG. 36, in the second lamination station 201 configuring the second conveying line 2000, a second laminate PL2 comprising a second absorptive polarizing film sheet s2 formed on a second carrier film c2 is laminated via an adhesive layer to a viewing side of a liquid-crystal display panel w configuring the first intermediate laminate 100 to form a second intermediate laminate 200, as in Embodiment 1. The second intermediate laminate 200 is configured as that the second absorptive polarizing film sheet s2 is laminated to the viewing side of the liquid-crystal display panel w which a color filter substrate CF is arranged thereon. Thus, an absorption axis of the first absorptive polarizing film sheet s1 and an absorption axis of the second absorptive polarizing film sheet s2 are arranged as orthogonal to each other. Details of each step performed in the second conveying line 2000 are not described as they are identical to those in Embodiment 1.

The second channel 20 further configures a third conveying line 3000. A third lamination station 301, a second intermediate conveying line 302 including a peeling means 34 and a third laminating means 304 are arranged In the third conveying line 3000. As shown in FIG. 36 and FIG. 38, since the absorption axis of the first absorptive polarizing film sheet s1 and the absorption axis of the second absorptive polarizing film sheet s2, laminated to respective surface of the liquid-crystal display panel w configuring the second intermediate laminate 200, are arranged as orthogonal to each other, it is preferable that a rotating means 33 for rotating the orientation of the first intermediate laminate 100 by 90° is arranged in a line for conveying the first intermediate laminate 100 from the first lamination station 101 via the first channel-to-channel transfer part 30 to the second lamination station 201. The second intermediate laminate 200 is preferably conveyed via the second intermediate conveying line 302 to the third lamination station 301 in the third conveying line 3000. In the third lamination station 301, a reflective polarizing film sheet s3 cut out from a third web of optical laminate f3 is laminated to a surface, opposite to the liquid-crystal display panel w, of the first absorptive polarizing film sheet s1 laminated to the liquid-crystal display panel w configuring the second intermediate laminate 200.

It is preferable that a surface, opposite to the liquid-crystal display panel w, of the first absorptive polarizing film sheet s1 laminated to the non-viewing side of the liquid-crystal display panel w is protected by a first surface protection film. When the first absorptive polarizing film sheet s1 has such configuration, the first surface protection film is peeled from the first absorptive polarizing film sheet s1 together with the adhesive layer by the peeling means 34 before the reflective polarizing film sheet s3 is laminated thereon. This allows for continuously laminating the reflective polarizing film sheets s3 to respective ones of the second intermediate laminate 200 in the third conveying line 3000.

The third conveying line 3000 comprises a third lamination station 301. The second intermediate laminate 200 and the reflective polarizing film sheet s3 are laminated to each other by the third laminating means 304 in the third lamination station 301 and thereby a laminate product 300 is completed. The third conveying line 3000 further comprises a second intermediate conveying line 302 for conveying the second intermediate laminate 200 to the third lamination station 301 and a third web feeding line 303 configured to feed the third web of optical laminate f3 to the third lamination station 301 in a direction opposite to the second lamination station 201 with respect to the third lamination station 301.

The third web feeding line 303 comprises a third web feeding mechanism 310 and a third slit line formation mechanism 320. As shown in FIG. 36 and FIG. 38, the third web feeding mechanism 310 operates to feed the third web of optical laminate f3 from a third roll R3 of the third web of optical laminate f3 comprising the reflective polarizing film sheets s3 and the third carrier film c3, to activate a third measuring unit 3001 to measure a width of the third web of optical laminate f3 being fed and to store the measured width as a width b1 to a storage unit 420. The third web feeding mechanism 310 also feeds the third web of optical laminate f3 from the third roll R3. The third measuring unit 3001 is not deployed in the third web feeding mechanism 310 when the width of the third roll R3 is measured in advance, as was the case with the first measuring unit 1001.

The third slit line forming mechanism 320 operates to form a third laminate PL3 at least comprising a reflective polarizing film sheet s3 including an adhesive layer by forming adjacent slit lines on a third carrier film c3 of the third web of optical laminate f3 being fed, in the conveying direction thereof, at an interval preset to a size not exceeding a width a1 stored in the storage unit 420, the width a1 is a measured width of the first web of optical laminate f1 fed from the first roll R1 mounted to the first conveying line 1000.

On downstream side in web feeding direction of the third slit line formation mechanism 320, a third conveying mechanism 330 for conveying the third web of optical laminate f3 having the third carrier film c3 to the third lamination station 301 and a third peeling mechanism 340 for peeling the reflective polarizing film sheet s3 configuring the formed third laminate PL3 from the third carrier film c3 in the third lamination station 301 are deployed. Since the reflective polarizing film sheet s3 is laminated to the non-viewing side of the liquid-crystal display panel w which a thin-film transistor substrate T is arranged thereon, it is preferable to linearly arrange, but not limited to, a third web feeding mechanism 310 for feeding the third web of optical laminate f3 from the third roll R3, a third slit line formation mechanism 320, a third conveying mechanism 330 and a second peeling mechanism 340, along a second channel 20 in the third web feeding line 303 configuring the third conveying line 3000.

The reflective polarizing film sheet s3 is peeled from the third carrier film c3 and then overlappingly laminated by the third laminating means 304 to an exposed surface of the first absorptive polarizing film sheet s1 laminated to the non-viewing side of the liquid-crystal display panel w configuring the second intermediate laminate 200 in the third lamination station 301, and thereby, the laminate product 300 is completed. In the laminate product 300, the first absorptive polarizing film sheet s1 and the reflective polarizing film sheet s3 are overlappingly laminated to the non-viewing side of the liquid-crystal display panel w, such that the transmission axes of the first absorptive polarizing film sheet s1 and the reflective polarizing film sheet s3 are parallel to each other.

As in Embodiment 1, the laminate product 300 formed in the third lamination station 301 is carried out from the lamination unit 1 via a product carry-out line 304 as shown in FIG. 5.

Figure 39:
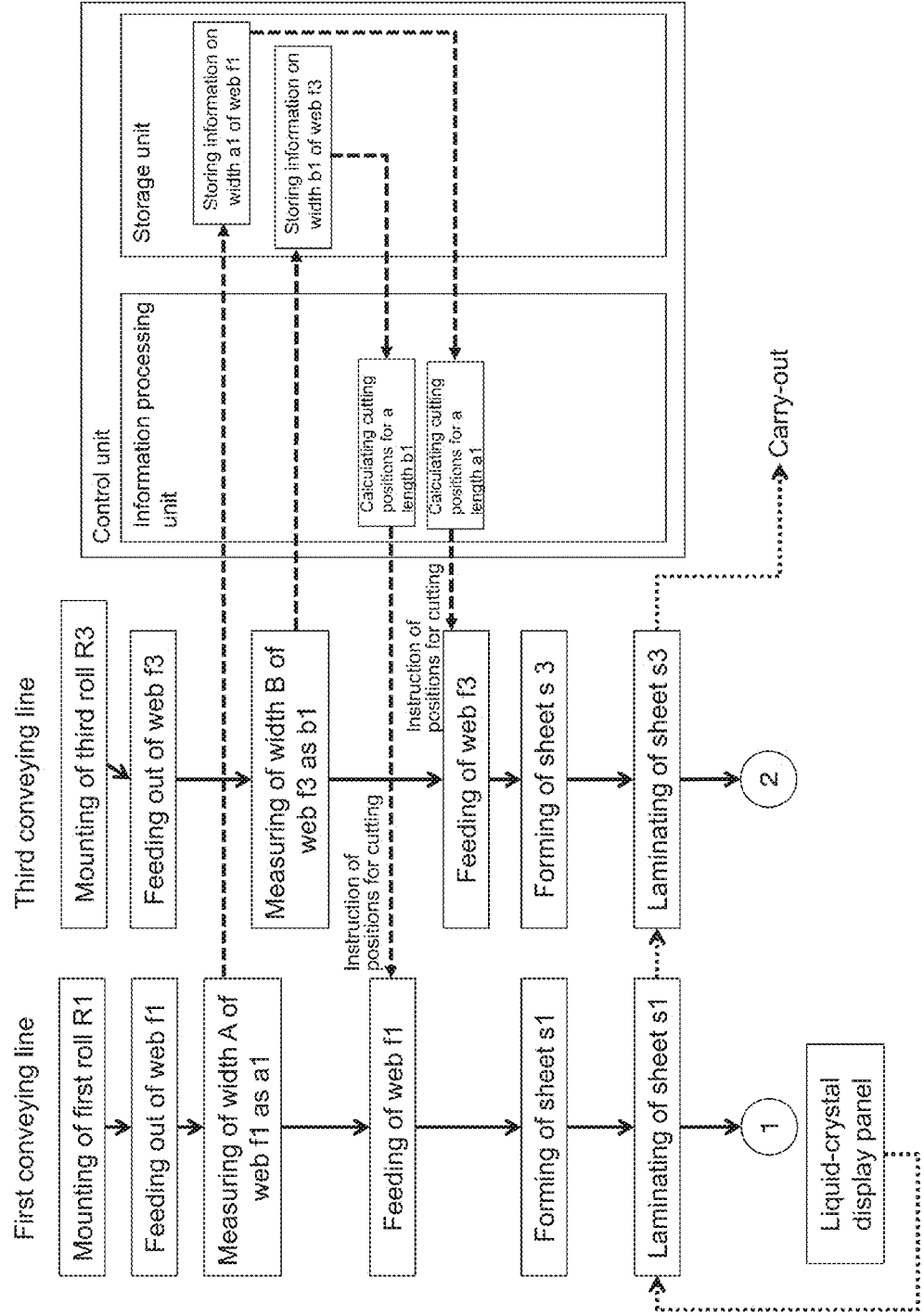
FIG. 39 is a flow of controlling each of steps shown in FIG. 37 and FIG. 38 for forming a superimposed structure of first absorptive polarizing film sheets and reflective polarizing film sheets on a non-viewing side of a liquid-crystal display panel when the liquid-crystal display panel is conveyed from a first conveying line 1000 which a first roll is mounted thereto in a first channel through a conveying line of a first intermediate laminate to a second conveying line 2000 and a third conveying line 3000 in a second channel which a second roll and a third roll are mounted at both ends thereof in a lamination unit used in one or other embodiment of the present invention.

FIG. 39 shows a flow for controlling each of steps for forming an overlapping structure of the first absorptive polarizing film sheet s1 and the reflective polarizing film sheet s3 on the non-viewing side of the liquid-crystal display panel w when the liquid-crystal display panel w is conveyed from the first conveying line 1000 which the first roll R1 is mounted thereto to the third conveying line 3000 which the third roll R1 is mounted thereto in the lamination unit 1 shown in FIG. 37 and FIG. 38. As shown in FIG. 39, a first laminate PL1 comprising a first absorptive polarizing film sheet s1 cut out from a first web of optical laminate f1 at a measured width b1 of a third web of optical laminate f3 is laminated to a surface on a non-viewing side of a liquid-crystal display panel w conveyed from a first conveying line 1000, and a third laminate PL3 comprising a reflective polarizing film sheet s3 cut out from the third web of optical laminate f3 at a measured width a1 of the first web of optical laminate f1 is laminated to an exposed surface of the first absorptive polarizing film sheet s1 laminated to the non-viewing side of the liquid-crystal display panel w of the second intermediate laminate 200 conveyed via a second conveying line 2000 to a third conveying line 3000, and thereby, an overlapping structure consisting at least of the first absorptive polarizing film sheet s1 and the reflective polarizing film sheet s3 may be formed on a surface of the non-viewing side of the liquid-crystal display panel w. As is clear from FIG. 39, when the lamination unit 1 starts operation, it is preferable that a width of the third web of optical laminate f3 is measured with a third measuring unit 3001, the first laminate PL1 is cut from the first web of optical laminate f1 based on the measured width b1 of the third web of optical laminate f3, before start laminating to a first one of liquid-crystal display panel w. When widths of the first roll R1 and the third roll R3 are measured in advance, the first measuring unit 1001 and the third measuring unit 3001 need not to be used.

FIG. 40 shows a flow for controlling each of steps of calculating a number of sheets of the first laminate PL1 which can be formed on the remaining first roll R1 before changing which is connected to a new first roll R10 after changing and of reflecting a measured width a2 of the first web of optical laminate of the changed first roll R10 onto forming a third laminate PL3 of a third roll R3, when a pair or a set of a first roll R1 and a third roll R3 in use are not simultaneously changed, e.g. when only the first roll R1 of the first conveying line is changed in the lamination unit 1 shown in FIG. 39. More particularly, the first roll R1 and the third roll R3 used for the lamination unit 1 are normally not changed simultaneously. Thus, by controlling as described in the above, the lamination unit 1 may calculate a number of sheets of the first laminate PL1 which can be formed on the remaining first web of optical laminate f1 of the first roll R1 before changing which is connected to a new web of optical laminate f10 fed out from the first roll R10 after changing to reflect the calculated number of sheets onto forming of a third laminate PL3 in the third web of optical laminate f3 fed out from the third roll R3 mounted in the third conveying line when, for example, only the first roll R1 mounted to the first conveying line of the lamination unit 1 is changed, and then reflect the measured width a2 of the first web of optical laminate f10 of the changed first roll R10 onto forming the third laminate PL3 in the third web of optical laminate f3, when laminating the number of sheets of the first laminate PL1 of the first roll R1 before changing which remains in the lamination unit 1.

Although the present invention has been described for preferable embodiments, those skilled in the art may understand that various modifications may be made and elements may be replaced with equivalents without departing the scope of the present invention. Therefore, the present invention should not be limited to specific embodiments disclosed as the best mode of embodiments considered for implementing the present invention, and it is intended that the present invention encompasses all embodiments which belong to claims.

EXPLANATION OF NUMERICAL CHARACTERS

LC, w: Liquid-crystal display panel
L: Liquid-crystal layer
CF: Color filter substrate
T: Thin-film transistor substrate
PL1: Optical film laminate on non-viewing side (polarizing laminate)
PL1-1: Laminate
PL1-2: Laminate
PL2: Optical film laminate on viewing side (polarizing laminate)
P1: Absorptive polarizing film on non-viewing side
P2: Absorptive polarizing film on viewing side
RP: Reflective polarizing film
PF1: Surface protection film on non-viewing side
PF1-1: Surface protection film of laminate PL1-1
PF2: Surface protection film on viewing side
f1, f2, f3: First, second, third web of optical laminate
f1', f2', f3': First, second, third web of optical laminate with slit lines
s1, s2: First, second absorptive polarizing film sheet
s3: Reflective polarizing film sheet
d1, d2: First, second defective sheet
c1, c2, c3: First, second, third carrier film
1: Lamination unit for implementing present invention
10: First channel
20: Second channel
30: First channel-to-channel transfer part
31: Receiving side end
32: Passing side end
33: Rotating means
34: Peeling means
35, 36: First, second reversing means
37: Rotating means
38, 39, 40, 41: First, second, third, fourth reversing means
42, 43: First, second rotating means
44: Peeling means
50: Carry-out channel
100: First intermediate laminate
101: First lamination station
102: Panel conveying line
103: First web feeding line
104: First laminating means
110: First web feeding mechanism
1001: First measuring unit
111: First defect inspection mechanism
120: First slit line formation mechanism
120': First slit line position-reading mechanism
130: First conveying mechanism
140: First peeling mechanism
150: First removing mechanism
1000: First conveying line
200, 200': Second intermediate laminate
201: Second lamination station
202: First intermediate laminate conveying line
203: Second web feeding line
204: Second laminating means
210: Second web feeding mechanism
211: Second defect inspection mechanism
220: Second slit line formation mechanism
220': Second slit line position-reading mechanism
230: Second conveying mechanism
240: Second peeling mechanism
250: Second removing mechanism
2000: Second conveying line
300: Laminate product
301: Third lamination station
302: Second intermediate conveying line
303: Third web feeding line
304: Third laminating means
305: Product carry-out line
310: Third web feeding mechanism
3001: Third measuring unit
320: Third slit line formation mechanism
320': Third slit line position-reading mechanism
330: Third conveying mechanism
340: Third peeling mechanism
3000: Third conveying line
400: Control unit
410: Information processing unit
420: Storage unit

The invention claimed is:

1. A method for manufacturing a liquid-crystal display device in which at least an absorptive polarizing film is arranged on a viewing side of a rectangular liquid-crystal display panel and at least an absorptive polarizing film and a reflective polarizing film are arranged on a non-viewing side thereof, the liquid-crystal display panel having a long side and a short side and of VA mode or IPS mode, the method comprising:
preparing:
a first roll of a first web of optical laminate comprising a web of first absorptive polarizing film with a width corresponding to one of the long side or the short side of the liquid-crystal display panel, a transmission axis in a direction orthogonal to a first longitudinal direction, and a first carrier film laminated via a first adhesive layer to the first absorptive polarizing film;
a second roll of a second web of optical laminate comprising a web of second absorptive polarizing film with a width corresponding to the other one of the long side or the short side of the liquid-crystal display panel, a transmission axis in a direction orthogonal to a second longitudinal direction, and a second carrier film laminated via a second adhesive layer to the second absorptive polarizing film; and
a third roll of a third web of optical laminate comprising a web of reflective polarizing film with a width corresponding to the other one of the long side or the short side of the liquid-crystal display panel, a transmission axis in a third longitudinal direction, and a third carrier film laminated via a third adhesive layer to the reflective polarizing film;
a first laminating step, comprising:
forming, in the first web of optical laminate fed out from the first roll, slit lines in a direction orthogonal to the first longitudinal direction to a depth at least reaching to a surface of the first adhesive layer from a surface opposite to the first carrier film at a first longitudinal interval corresponding to the other one of the long side or the short side, thereby forming a first absorptive polarizing film sheet of a size corresponding to the first longitudinal interval between respective ones of the slit lines adjacent in the first longitudinal direction of the first web of optical laminate;

peeling the first absorptive polarizing film sheet from the first carrier film; and sequentially laminating the first absorptive polarizing film sheet to a surface of a non-viewing side of the liquid-crystal display panel via the first adhesive layer exposed by peeling from the first carrier film;

a second laminating step, comprising:

forming, in the third web of optical laminate fed out from the third roll, slit lines in a direction orthogonal to the third longitudinal direction to a depth at least reaching to a surface of the third adhesive layer from a surface opposite to the third carrier film at a second longitudinal interval corresponding to the one of the long side or the short side, thereby forming a reflective polarizing film sheet of a size corresponding to the second longitudinal interval between respective ones of the slit lines adjacent in the third longitudinal direction of the third web of optical laminate;

peeling the reflective polarizing film sheet from the third carrier film; and sequentially laminating the reflective polarizing film sheet to a surface of the first absorptive polarizing film sheet laminated in the first laminating step via the third adhesive layer exposed by peeling from the third carrier film; and a third laminating step, comprising:

forming, in the second web of optical laminate fed out from the second roll, slit lines in a direction orthogonal to the second longitudinal direction to a depth at least reaching to a surface of the second adhesive layer from a surface opposite to the second carrier film at the second longitudinal interval corresponding to the one of the long side or the short side, thereby forming a second absorptive polarizing film sheet of a size corresponding to the second longitudinal interval between respective ones of the slit lines adjacent in the second longitudinal direction of the second web of optical laminate;

peeling the second absorptive polarizing film sheet from the second carrier film; and sequentially laminating the second absorptive polarizing film sheet to a surface of a viewing side of the liquid-crystal display panel via the second adhesive layer exposed by peeling from the second carrier film.

2. The method of claim 1, wherein a surface protection film is at least laminated via a fourth adhesive layer to a surface of the first absorptive polarizing film on a side of the first absorptive polarizing film opposite the first carrier film in the prepared first web of optical laminate, and the second laminating step further comprises:

peeling the surface protection film from the first absorptive polarizing film sheet formed between adjacent slit lines in the first web of optical laminate and laminated to the non-viewing side of the liquid-crystal display panel in the first laminating step.

3. The method of claim 1, wherein the first laminating step further comprises:

positioning the first absorptive polarizing film sheet and the liquid-crystal display panel on a surface on the non-viewing side of the liquid-crystal display panel such that the long side of the liquid-crystal display panel and a long side of the first absorptive polarizing film sheet, and the short side of the liquid-crystal display panel and a short side of the first absorptive polarizing film sheet match, respectively, in a top to bottom direction;

the second laminating step further comprises:

positioning the reflective polarizing film sheet and the liquid-crystal display panel on a surface of the first absorptive polarizing film sheet laminated in the first laminating step such that the long side of the liquid-crystal display panel and a long side of the reflective polarizing film sheet, and the short side of the liquid-crystal display panel and a short side of the reflective polarizing film sheet match, respectively, in the top to bottom direction; and the third laminating step further comprises:

positioning the second absorptive polarizing film sheet and the liquid-crystal display panel on a surface on the viewing side of the liquid-crystal display panel such that the long side of the liquid-crystal display panel and a long side of the second absorptive polarizing film sheet, and the short side of the liquid-crystal display panel and a short side of the second absorptive polarizing film sheet match, respectively, in the top to bottom direction.

4. The method of claim 3, further comprising:

rotating the liquid-crystal display panel 90 degrees from a feeding direction of the first absorptive film sheet from the first laminating step before the second laminating step.

5. The method of claim 4, further comprising:

flipping the liquid-crystal display panel from a first orientation to a second orientation before the third laminating step.

6. The method of claim 1, wherein a defect in the first absorptive polarizing film, the first adhesive layer, the second absorptive polarizing film or the second adhesive layer, and included in the prepared first web of optical laminate or the second web of optical laminate, is detected in advance, the first laminating step further comprises:

forming the slit lines at the first longitudinal interval in the first web of optical laminate on an upstream side of the defect in a conveying direction of the first web of optical laminate at a position spaced from the defect by at least a first predetermined distance;

identifying a sheet formed between a slit line of the slit lines separated by the first longitudinal interval nearest the defect, and a slit line immediately downstream of said slit line of the slit lines separated by the first longitudinal interval nearest the defect, as a first defective sheet; and removing the first defective sheet without laminating the first defective sheet to the non-viewing side of the liquid-crystal display panel;

the third laminating step further comprises:

forming the slit lines at the second longitudinal interval in the second web of optical laminate on an upstream side of the defect in a conveying direction of the second web of optical laminate at a position spaced from the defect by at least a second predetermined distance;

identifying a sheet formed between a slit line of the slit lines separated by the second longitudinal interval nearest the defect, and a slit line immediately downstream of said slit line of the slit lines separated by the second longitudinal interval nearest the defect, as a second defective sheet; and
removing the second defective sheet without laminating the second defective sheet to the viewing side of the liquid-crystal display panel.

7. The method of claim 1, further comprising:
positioning a surface of the non-viewing side of the liquid-crystal display panel face down; and
laminating the first absorptive polarizing film sheet and the reflective polarizing film sheet from beneath the surface of the non-viewing side of the liquid-crystal display panel.

8. The method of claim 7, further comprising:
flipping the liquid-crystal display panel such that the viewing side of the liquid-crystal display panel is positioned face down; and
laminating the second absorptive polarizing film sheet from beneath the surface of the viewing side of the liquid-crystal display panel.

9. The method as defined in claim 1, further comprising:
positioning a surface of the non-viewing side of the liquid-crystal display panel face down; and
laminating the first absorptive polarizing film sheet from beneath the surface of the non-viewing side of the liquid-crystal display panel.

10. The method of claim 9, further comprising:
flipping the liquid-crystal display panel upside down such that the viewing side of the liquid-crystal display panel is positioned face down;
laminating the second absorptive polarizing film sheet from beneath the surface of the viewing side of the liquid-crystal display panel; and
laminating the reflective polarizing film sheet from above the surface of the non-viewing side of the liquid-crystal display panel.

11. The method of claim 10, further comprising:
rotating the liquid-crystal display panel 90 degrees from a feeding direction of the first absorptive polarizing film sheet.

12. The method of claim 1, further comprising:
positioning a surface of the non-viewing side of the liquid-crystal display panel face up; and
laminating the first absorptive polarizing film sheet from above the surface of the non-viewing side of the liquid-crystal display panel.

13. The method of claim 12, further comprising:
flipping the liquid-crystal display panel upside down such that the viewing side of the liquid-crystal display panel is positioned face up;
laminating the second absorptive polarizing film sheet from above the surface of the viewing side of the liquid-crystal display panel; and
laminating the reflective polarizing film sheet from beneath the surface of the non-viewing side of the liquid-crystal display panel.

14. The method of claim 13, further comprising:
rotating the liquid-crystal display panel 90 degrees from a feeding direction of the first absorptive polarizing film sheet.

15. A method for manufacturing a liquid-crystal display device in which at least an absorptive polarizing film is arranged on a viewing side of a rectangular liquid-crystal display panel and at least an absorptive polarizing film and a reflective polarizing film are arranged on a non-viewing side thereof, the liquid-crystal display panel having a long side and a short side and of VA mode or IPS mode, the method comprising:

preparing:
a first roll of a first web of optical laminate comprising a web of first absorptive polarizing film with a width corresponding to one of the long side or the short side of the liquid-crystal display panel, a transmission axis in a direction orthogonal to a first longitudinal direction, and a first carrier film laminated via a first adhesive layer to the first absorptive polarizing film, the first absorptive polarizing film being cut into first absorptive polarizing film sheets by slits formed in the first web of optical laminate to a depth at least reaching to a surface of the first adhesive layer from a surface of the first optical laminate opposite to the first carrier film at a first longitudinal interval corresponding to the other one of the long side or the short side in a direction orthogonal to the first longitudinal direction;
a second roll of a second web of optical laminate comprising a web of second absorptive polarizing film with a width corresponding to the other one of the long side or the short side of the liquid-crystal display panel, a transmission axis in a direction orthogonal to a second longitudinal direction, and a second carrier film laminated via a second adhesive layer to the second absorptive polarizing film, the second absorptive polarizing film being cut into second absorptive polarizing film sheets by slits formed in the second web of optical laminate to a depth at least reaching to a surface of the second adhesive layer from a surface of the second optical laminate opposite to the second carrier film at a second longitudinal interval corresponding to the one of the long side or the short side in a direction orthogonal to the second longitudinal direction; and
a third roll of a third web of optical laminate comprising a web of reflective polarizing film with a width corresponding to the other one of the long side or the short side of the liquid-crystal display panel, a transmission axis in a third longitudinal direction and a third carrier film laminated via a third adhesive layer to the reflective polarizing film, the reflective polarizing film being cut into reflective polarizing film sheets by slits formed in the third web of optical laminate to a depth at least reaching to a surface of the third adhesive layer from a surface of the third optical laminate opposite to the third carrier film at the second longitudinal interval corresponding to the one of the long side or the short side in a direction orthogonal to the third longitudinal direction;
a first laminating step, comprising:
peeling the first absorptive polarizing film sheets from the first carrier film; and
sequentially laminating the first absorptive polarizing film sheets such that at least one of the first absorptive polarizing film sheets is laminated to a surface on the non-viewing side of the liquid-crystal display panel via the first adhesive layer exposed by peeling from the first carrier film;
a second laminating step, comprising:
peeling the reflective polarizing film sheets from the third carrier film; and
sequentially laminating the reflective polarizing film sheets such that at least one of the reflective film sheets is laminated to a surface of the first absorptive polarizing film sheet laminated in the first laminating step via the third adhesive layer exposed by peeling from the third carrier film; and a third laminating step, comprising:
   peeling the second absorptive polarizing film sheets from the second carrier film; and
   sequentially laminating the second absorptive polarizing film sheets such that at least one of the second absorptive polarizing film sheets is laminated to a surface on the viewing side of the liquid-crystal display panel via the second adhesive layer exposed by peeling from the second carrier film.

16. The method of claim 15, wherein
a surface protection film is at least laminated via a fourth adhesive layer to a surface of the first absorptive polarizing film on a side of the first absorptive polarizing film opposite the first carrier film in the prepared first web of optical laminate, and
the second laminating step further comprises:
   peeling the surface protection film from the at least one first absorptive polarizing film sheet laminated to the non-viewing side of the liquid-crystal display panel in the first laminating step.

17. The method of claim 15, wherein
the first laminating step further comprises:
   positioning the at least one first absorptive polarizing film sheet and the liquid-crystal display panel on a surface on the non-viewing side of the liquid-crystal display panel such that the long side of the liquid-crystal display panel and a long side of the at least one first absorptive polarizing film sheet, and the short side of the liquid-crystal display panel and a short side of the at least one first absorptive polarizing film sheet match, respectively, in a top to bottom direction;
the second laminating step further comprises:
   positioning the at least one reflective polarizing film sheet and the liquid-crystal display panel on a surface of the at least one first absorptive polarizing film sheet laminated in the first laminating step such that the long side of the liquid-crystal display panel and a long side of the at least one reflective polarizing film sheet, and the short side of the liquid-crystal display panel and a short side of the at least one reflective polarizing film sheet match, respectively, in the top to bottom direction; and
the third laminating step further comprises:
   positioning the at least one second absorptive polarizing film sheet and the liquid-crystal display panel on a surface on the viewing side of the liquid-crystal display panel such that the long side of the liquid-crystal display panel and a long side of the at least one second absorptive polarizing film sheet, and the short side of the liquid-crystal display panel and a short side of the at least one second absorptive polarizing film sheet match, respectively, in the top to bottom direction.

18. The method as defined in claim 15, wherein
a defect in the first absorptive polarizing film, the first adhesive layer, the second absorptive polarizing film sheet or the second adhesive layer, and included in the prepared first web of optical laminate or the second web of optical laminate, is detected in advance,
the prepared the first web of optical laminate or the second web of optical laminate further comprise at least one additional slit in the first absorptive polarizing film or the second absorptive polarizing film, forming a first defective sheet in the first web of optical laminate and/or a second defective sheet in the second web of optical laminate between the at least one additional slit and another slit in the first absorptive polarizing film or the second absorptive polarizing film, the at least one additional slit being formed on an upstream side of the defect in a conveying direction at a position spaced from the defect by at least a predetermined distance, and the another slit being immediately downstream of that at least one additional slit;
the first laminating step further comprises:
   removing the first defective sheet without laminating to the non-viewing side of the liquid-crystal display panel; and
the third laminating step further comprises:
   removing the second defective sheet without laminating to the viewing side of the liquid-crystal display panel.

19. The method of claim 17, further comprising:
rotating the liquid-crystal display panel 90 degrees from a feeding direction of the first absorptive film sheet in the first laminating step before the second laminating step.

20. The method of claim 19, further comprising:
flipping the liquid-crystal display panel from a first orientation to a second orientation before the third laminating step.

* * * * *